US012570777B2

(12) United States Patent
Sadeghi et al.

(10) Patent No.: US 12,570,777 B2
(45) **Date of Patent: *Mar. 10, 2026**

(54) NONLINEAR RHEOLOGY OF ETHYLENE INTERPOLYMER COMPOSITIONS

(71) Applicant: NOVA CHEMICALS (INTERNATIONAL) S.A., Fribourg (CH)

(72) Inventors: Soheil Sadeghi, Calgary (CA); Fazle Sibtain, Calgary (CA); Zengrong Zhang, Calgary (CA); Niousha Kazemi, Calgary (CA); Monika Kleczek, Calgary (CA); Vinod Konaganti, Calgary (CA); Bronwyn Gillon, Calgary (CA); Shivendra Goyal, Calgary (CA); Sepideh Kasiri, Calgary (CA); Stephen Salomons, Calgary (CA); Kenneth Taylor, Sarnia (CA); Mehdi Keshtkar, Calgary (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 723 days.

This patent is subject to a terminal disclaimer.

(21) Appl. No.: 17/913,803

(22) PCT Filed: Mar. 24, 2021

(86) PCT No.: PCT/IB2021/052436

§ 371 (c)(1),
(2) Date: Sep. 22, 2022

(87) PCT Pub. No.: WO2021/191814

PCT Pub. Date: Sep. 30, 2021

(65) Prior Publication Data

US 2024/0228681 A1 Jul. 11, 2024

Related U.S. Application Data

(60) Provisional application No. 62/994,986, filed on Mar. 26, 2020.

(51) Int. Cl.

| | |
|---|---|
| ***C08F 210/16*** | (2006.01) |
| ***C08F 2/06*** | (2006.01) |
| ***C08F 4/6592*** | (2006.01) |
| ***C08J 5/18*** | (2006.01) |

(52) U.S. Cl.

CPC .............. *C08F 210/16* (2013.01); *C08F 2/06* (2013.01); *C08F 4/65927* (2013.01); *C08J 5/18* (2013.01); *C08J 2323/08* (2013.01)

(58) Field of Classification Search

CPC ..... C08L 23/0815; C08J 2323/08; C08J 5/18; C08F 2500/28; C08F 2500/29; C08F 210/16; C08F 4/65927

See application file for complete search history.

(56) References Cited

U.S. PATENT DOCUMENTS

| | | | |
|---|---|---|---|
| 4,105,609 A | 8/1978 | Machon et al. | |
| 4,379,882 A | 4/1983 | Miyata | |
| 4,731,438 A | 3/1988 | Bernier | |
| 4,803,259 A | 2/1989 | Zboril et al. | |
| 5,206,075 A | 4/1993 | Hodgson, Jr. | |
| 6,180,730 B1 | 1/2001 | Sibtain et al. | |
| 8,846,188 B2 | 9/2014 | Fantinel et al. | |
| 10,442,920 B2 * | 10/2019 | Zhang .................. | C08F 210/16 |
| 10,995,166 B2 | 5/2021 | Kazemi et al. | |
| 11,312,845 B2 | 4/2022 | Sadeghi et al. | |

(Continued)

FOREIGN PATENT DOCUMENTS

| | | |
|---|---|---|
| WO | WO-2010/075111 A2 | 7/2010 |
| WO | WO-2019/092524 A1 | 5/2019 |

OTHER PUBLICATIONS

Ahirwal et al., "Large amplitude oscillatory shear and uniaxial extensional rheology of blends from linear and long-chain branched polyethylene and polypropylene", Journal of Rheology, vol. 58, No. 3, 2014, pp. 635-658.

(Continued)

*Primary Examiner* — Gregory Listvoyb

(74) *Attorney, Agent, or Firm* — Thomas J. Styslinger

(57) ABSTRACT

This disclosure relates to ethylene interpolymer compositions, films prepared therefrom and a nonlinear rheology method capable of determining presence of long-chain branched structures in these ethylene interpolymer compositions. Ethylene interpolymer compositions disclosed herein specifically relates to ethylene interpolymer products having: a dimensionless nonlinear rheology network parameter, $\Delta_{int.}$, greater than or equal to 0.01, satisfying $0.01\times(Z-48)^{0.78}\leq\Delta_{int.}\leq0.01\times(Z-60)^{0.78}$ inequality wherein Z is a normalized molecular weight defined by (I) where Mw and Me are the weight average and entanglement molecular weights; and a residual catalytic metal of from ≥0.03 to ≤5 ppm of hafnium. The disclosed ethylene interpolymer products have a melt index from about 0.3 to about 500 dg/minute, a density from about 0.855 to about 0.975 g/cc, a polydispersity, $M_w/M_n$, from about 1.7 to about 25 and a Composition Distribution Breadth Index ($CDBI_{50}$) from about 1% to about 98%.

10 Claims, 11 Drawing Sheets

(56) References Cited

U.S. PATENT DOCUMENTS

| | | | | |
|---|---|---|---|---|
| 11,584,845 | B2 | 2/2023 | Sadeghi et al. | |
| 2018/0305531 | A1* | 10/2018 | Zhang | C08J 5/18 |

OTHER PUBLICATIONS

ASTM D1003-13—Standard Test Method for Haze and Luminous Transmittance of Transparent Plastics—Copyright ASTM International—Current edition approved Nov. 15, 2013. Published Nov. 2013. Originally approved in 1949. Last previous edition approved in 2011 as D1003-11 (pp. 1-7).

ASTM D1238-13—Standard Test Method for Melt Flow Rates of Thermoplastics by Extrusion Plastometer—Copyright ASTM International—Current edition approved Aug. 1, 2013. Published Aug. 2013. Originally approved in 1965. Last previous edition approved in 2010 as D1238-10 (pp. 1-16).

ASTM D1525-07—Standard Test Method for Vicat Softening Temperature of Plastics—Copyright ASTM International—Current edition approved Mar. 1, 2007. Published Mar. 2007. Originally approved in 1958. Last previous edition approved in 2006 as D1525-06 (pp. 1-9).

ASTM D1709-09—Standard Test Method for Impact Resistance of Plastic Film by the Free-Falling Dart Method—Copyright ASTM International—Current edition approved May 1, 2009. Published Jun. 2009. Originally approved in 1959. Last previous edition approved in 2008 as D1709-08 (pp. 1-9).

ASTM D1922-09—Standard Test Method for Propagation Tear Resistance of Plastic Film and Thin Sheeting by Pendulum Method—Copyright ASTM International—Current edition approved May 1, 2009. Published Jun. 2009. Originally approved in 1961. Last previous edition approved in 2008 as D1922-08 (pp. 1-7).

ASTM D2457-13—Standard Test Method for Specular Gloss of Plastic Films and Solid Plastics—Copyright ASTM International—Current edition approved Apr. 1, 2013. Published Apr. 2013. Originally approved in 1965. Last previous edition approved in 2008 as D2457-08 (pp. 1-6).

ASTM D2582-09—Standard Test Method for Puncture-Propagation Tear Resistance of Plastic Film and Thin Sheeting Copyright ASTM International—Current edition approved May 1, 2009. Published Jun. 2009. Originally approved in 1967. Last previous edition approved in 2008 as D2582-08 (pp. 1-5).

ASTM D3124-98—Standard Test Methods for Vinylidene Unsaturation in Polyethylene by Infrared Spectrophotometry—Copyright ASTM International—Current edition approved Feb. 1, 2011. Published Mar. 2011. Originally approved in 1972. Last previous edition approved in 2003 as D3124-98 (pp. 1-4).

Astm D4703-16—Standard Test Method for Compression Molding Thermoplastic Materials into Test Specimens, Plaques, or Sheets—Copyright ASTM International—Current edition approved Apr. 1, 2016. Published Apr. 2016. Originally approved in 1991. Last previous edition approved in 2010 as D4703-10 (pp. 1-16).

ASTM D5748-95—Standard Test Method for Protrusion Puncture Resistance of Stretch Wrap Film—Copyright ASTM International—Current edition approved Apr. 1, 2012. Published May 2012. Originally approved in 1995. Last previous edition approved in 2007 as D5748-95 (pp. 1-4).

ASTM D6248-98—Standard Test Methods for Vinyl and Trans Unsaturation in Polyethylene by Infrared Spectrophotometry—Copyright ASTM International—Current edition approved May 1, 2012. Published Jul. 2012. Originally approved in 1998. Last previous edition approved in 2004 as D6248-98 (pp. 1-3).

ASTM D6474-12—Standard Test Method for Determining Molecular Weight Distribution and Molecular Weight Averages of Polyolefins by High Temperature Gel Permeation Chromatography—Current edition approved Dec. 15, 2012. Published Dec. 2012. Originally approved in 1999. Last previous edition approved in 2006 as D6474-99 (pp. 1-6).

ASTM D648-07—Standard Test Method for Deflection Temperature of Plastics Under Flexural Load in the Edgewise Position—Current edition approved Mar. 1, 2007. Published Mar. 2007. Originally approved in 1941. Last previous edition approved in 2006 as D648-06 (pp. 1-14).

ASTM D6645-01—Standard Test Method for Methyl (Comonomer) Content in Polyethylene by Infrared Spectrophotometry—Copyright ASTM International—Current edition approved Jan. 1, 2010. Published Jan. 2010. Originally approved in 2001. Last previous edition approved in 2001 as D6645-01 (pp. 1-4).

ASTM D790-10—Standard Test Method for Flexural Properties of Unreinforced and Reinforced Plastics and Electrical Insulating Materials—Copyright ASTM International—Current edition approved Apr. 1, 2010. Published Apr. 2010. Originally approved in 1970. Last previous edition approved in 2007 as D790-07 (pp. 1-11).

ASTM D792-13—Standard Test Methods for Density and Specific Gravity (Relative Density) of Plastics by Displacement—Copyright ASTM International—Current edition approved Nov. 1, 2013. Published Nov. 2013. Originally approved in 1944. Last previous edition approved in 2008 as D792-08 (pp. 1-6).

ASTM D882-12—Standard Test Method for Tensile Properties of thin Plastic Sheeting—Copyright ASTM International Current edition approved Aug. 1, 2012. Published Sep. 2012. Originally approved in 1946. Last previous edition approved in 2010 as D882-10 (pp. 1-11).

Bird et al., "Dynamics of Polymer Liquids. vol. 1: Fluid Mechanics", Wiley-Interscience Publications, 1987, pp. 169-175.

Burhin et al., "Characterisation of Long Chain Branching (LCB) in Polyolefins and Elastomers Using Large Amplitude Oscillatory Shear (LAOS) and Fourier Transform Rheology Using Harmonics of the Stress Signal", Proceedings of the ASME Fluids Engineering Division, 2002, pp. 183-191.

Chen et al., "Method for obtaining tube model parameters for commercial ethene/a-olefin copolymers", Journal of Rheology, vol. 54, 2010, pp. 393-406.

Cheng et al., Studies on polyethylene pellets modified by low dose radiation prior to part formation, Nuclear Instruments & Methods in Physics Research. Section B: Beam Interactions With Materials and Atoms, Elsevier BV, NL, vol. 236, No. 1-4, 2005, pp. 130-136.

Deslauriers et al., Quantifying short chain branching microstructures in ethylene 1-olefin copolymers using size exclusion chromatography and Fourier transform infrared spectroscopy (SEC-FTIR), Polymer 43, 2002, pp. 159-170.

Doerpinghaus et al., "Separating the effects of sparse long-chain branching on rheology from those due to molecular weight in polyethylenes", Journal of Rheology, vol. 47, 2003, pp. 717-736.

Ewoldt et al., "New measures for characterizing nonlinear viscoelasticity in large amplitude oscillatory shear", Journal of Rheology, vol. 52, 2008, pp. 1427-1458.

Fetters et al., "Connection between Polymer Molecular Weight, Density, Chain Dimensions, and Melt Viscoelastic Properties", Macromolecules, vol. 27, No. 17, 1994, pp. 4639-4647.

Hyun et al., "A review of nonlinear oscillatory shear tests: Analysis and application of large amplitude oscillatory shear (LAOS)", Progress in Polymer Science, vol. 36, No. 12, 2011, pp. 1697-1753.

Janzen et al., "Diagnosing long-chain branching in polyethylenes", Journal of Molecular Structure, vol. 485, 1999, pp. 569-583.

Markovitz et al., "Superposition in Rheology", J. Polym. Sci., Polymer Symposium Series 50, 1975, pp. 431-456.

Read et al., "Linking Models of Polymerization and Dynamics to Predict Branched Polymer Structure and Flow", Science, vol. 333, 2011, pp. 1871-1874.

Shroff et al., "Long-Chain-Branching Index for Essentially Linear Polyethylenes", Macromolecules, vol. 32, 1999, pp. 8454-8464.

Soo Cho et al., "A geometrical interpretation of large amplitude oscillatory shear response", Journal of Rheology, vol. 49, 2005, pp. 747-758.

Soo Cho et al., "Scaling relations in nonlinear viscoelastic behavior of aqueous PEO solutions under large amplitude oscillatory shear flow", Journal of Rheology, vol. 54, 2010, pp. 27-63.

Wasserman et al., "Prediction of Linear Viscoelastic Response for Entangled Polyolefin Melts from Molecular Weight Distribution", Polymer Eng. Sci., vol. 36, 1996, pp. 852-861.

(56) References Cited

OTHER PUBLICATIONS

Wild et al., "Determination of Branching Distributions in Polyethylene and Ethylene Copolymers", J. Polym. Sci., Part B, Polym. Phys., vol. 20, 1982, pp. 441-455.
Yasuda et al., "Investigation of the Analogies Between Viscometric and Linear Viscoelastic Properties", PhD Thesis, MIT Cambridge, Feb. 1979, 219 pgs.
International Search Report & Written Opinion of the International Searching Authority issued in PCT Application No. PCT/IB/2021/052436 on Jan. 7, 2022.

* cited by examiner

NONLINEAR RHEOLOGY OF ETHYLENE INTERPOLYMER COMPOSITIONS

CROSS-REFERENCE TO RELATED APPLICATIONS

This application is a U.S. National Phase Application under 35 U.S.C. § 371 of International Application No. PCT/IB2021/052436, filed Mar. 24, 2021, which claims priority to and the benefit of U.S. Provisional Application No. 62/994,986, filed Mar. 26, 2020, both of which are hereby incorporated by reference in their entireties.

BACKGROUND ART

Solution polymerization processes are typically carried out at temperatures that are above the melting point of the ethylene homopolymer or copolymer produced. In a typical solution polymerization process, catalyst components, solvent, monomers and hydrogen are fed under pressure to one or more reactors.

For ethylene polymerization, or ethylene copolymerization, reactor temperatures can range from 80° C. to 300° C. while pressures generally range from 3 MPag to 45 MPag. The ethylene homopolymer or copolymer produced remains dissolved in the solvent under reactor conditions. The residence time of the solvent in the reactor is relatively short, for example, from 1 second to 20 minutes. The solution process can be operated under a wide range of process conditions that allow the production of a wide variety of ethylene polymers. Post reactor, the polymerization reaction is quenched to prevent further polymerization, by adding a catalyst deactivator. Optionally, the deactivated solution may be passivated by adding an acid scavenger. The deactivated solution, or optionally the passivated solution, is then forwarded to polymer recovery where the ethylene homopolymer or copolymer is separated from process solvent, unreacted residual ethylene and unreacted optional α-olefin (s).

In solution polymerization there is a need for improved processes that produce ethylene interpolymers at higher production rates, i.e. the pounds of ethylene interpolymer produced per hour is increased. Higher production rates increase the profitability of the solution polymerization plant. The catalyst formulations and solution polymerization processes disclosed herein satisfy this need.

In solution polymerization there is also a need to increase the molecular weight of the ethylene interpolymer produced at a given reactor temperature. Given a specific catalyst formulation, it is well known to those of ordinary experience that polymer molecular weight increases as reactor temperature decreases. However, decreasing reactor temperature can be problematic when the viscosity of the solution becomes too high. As a result, in solution polymerization there is a need for catalyst formulations that produce high molecular weight ethylene interpolymers at high reactor temperatures (or lower reactor viscosities). The catalyst formulations and solution polymerization processes disclosed herein satisfy this need.

In the solution polymerization process, there is also a need for catalyst formulations that are very efficient at incorporating one or more α-olefins into a propagating macromolecular chain. In other words, at a given [α-olefin/ethylene] weight ratio in a solution polymerization reactor, there is a need for catalyst formulations that produce lower density ethylene/α-olefin copolymers. Expressed alternatively, there is a need for catalyst formulations that produce an ethylene/α-olefin copolymer, having a specific density, at a lower [α-olefin/ethylene] weight ratio in the reactor feed. Such catalyst formulations efficiently utilize the available α-olefin and reduce the amount of α-olefin in solution process recycle streams.

The catalyst formulations and solution process disclosed herein, produce unique ethylene interpolymer products that have desirable properties in a variety of end-use applications. One non-limiting end-use application includes packaging films containing the disclosed ethylene interpolymer products. Non-limiting examples of desirable film properties include improved optical properties, lower seal initiation temperature and improved hot tack performance. Films prepared from the ethylene interpolymer products, disclosed herein, have improved properties. Moreover, a highly sensitive nonlinear rheology method, disclosed herein, is capable of detecting the presence of LCB species in ethylene/alpha-olefin interpolymers using subtle differences in the kinetics of entanglements dissociation induced by LCB presence.

SUMMARY OF INVENTION

One embodiment of this disclosure uses the strain-dependence of intracycle shear-thickening behavior, referred to as 'intracycle nonlinear function', or 'INF' hereafter, to determine presence of LCB structures in ethylene interpolymers according to the following steps. In the first step, a sample of an ethylene interpolymer in melt-state is subjected to an oscillating strain-wave at a fixed angular frequency and temperature with a step-wise increasing strain-amplitude from a lower limit strain-amplitude to an upper limit strain-amplitude to obtain a stress-wave response and corresponding viscous Lissajous-Bowditch loop (i.e. stress versus strain-rate loops) at each strain-amplitude level. In the second step, the Intracycle nonlinear function, INF, is determined experimentally using the instantaneous dynamic viscosities at maximum strain-rate ($\eta'_L$) and at minimum strain-rate ($\eta'_M$) in the viscous Lissajous-Bowditch loop at each strain-amplitude level using $$INF = \frac{\eta'_L - \eta'_M}{\eta'_L}$$

(INF is dimensionless) by a rheology data processing software (e.g. Anton Paar RheoCompass). Further, in the third step, the INF obtained for the ethylene interpolymer product of interest is compared with a reference INF predicted for a linear (non-long-chain branched) ethylene interpolymer product having a polydispersity equivalent to the said ethylene interpolymer product. Polydispersity of a given ethylene interpolymer product can be characterized using any combination of moments of molecular weight distribution, i.e., number-average molecular weight, weight-average molecular weight, z-average molecular weight, (z+1)-average molecular weight, etc. In an embodiment of this invention, the ratio of z-average molecular weight divided by weight-average molecular weight was preferably used as a measure of polydispersity. In the fourth step, presence of LCB in the ethylene interpolymer product of interest is detected according to a positive deviation from the predicted reference INF.

Another embodiment of this disclosure is an ethylene interpolymer product comprising at least one ethylene interpolymer, where the ethylene interpolymer product has: a dimensionless nonlinear rheology network parameter, $\Delta_{int}$, greater than or equal to 0.01 and satisfying the inequality $[0.01\times(Z-48)^{0.78}\leq\Delta_{int}\leq 0.01\times(Z-60)^{0.78}]$ wherein Z is a normalized molecular weight defined by $$Z = \frac{M_w}{M_e}$$

where $M_W$ and $M_e$ are the SEC weight average molecular weight and molecular weight between entanglements of said ethylene interpolymer, respectively, and a residual catalytic metal of from ≥0.03 to ≤5 ppm of hafnium. The ethylene interpolymer product may have a melt index ($I_2$) from 0.3 to 500 dg/minute, a density from 0.855 to 0.975 g/cc and from 0 to 25 mole percent of one or more α-olefins. Suitable α-olefins include one or more $C_3$ to $C_{10}$α-olefins. Embodiments of the ethylene interpolymer product have a polydispersity, $M_w/M_n$ from 1.7 to 25, where $M_w$ and $M_n$ are the weight and number average molecular weights, respectively, as determined by conventional size exclusion chromatography (SEC). Embodiments of ethylene interpolymer products have a $CDBI_{50}$ from 1% to 98%, where $CDBI_{50}$ is measured using CTREF.

Disclosed herein is the manufacture of said ethylene interpolymer products using a continuous solution polymerization process employing at least one homogeneous catalyst formulation. One embodiment of a suitable homogeneous catalyst formulation is a bridged metallocene catalyst formulation comprising a component A defined by Formula (I)

(I)

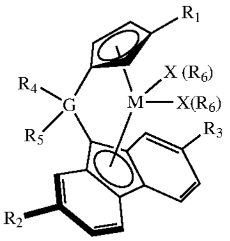

where M is a metal selected from titanium, hafnium and zirconium; G is the element carbon, silicon, germanium, tin or lead; X represents a halogen atom, $R_6$ groups are independently selected from a hydrogen atom, a $C_{1-20}$ hydrocarbyl radical, a $C_{1-20}$ alkoxy radical or a $C_{6-10}$ aryl oxide radical, these radicals may be linear, branched or cyclic or further substituted with halogen atoms, $C_{1-10}$ alkyl radicals, $C_{1-10}$ alkoxy radicals, $C_{6-10}$ aryl or aryloxy radicals; $R_1$ represents a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms; $R_2$ and $R_3$ are independently selected from a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms, and; $R_4$ and $R_5$ are independently selected from a hydrogen atom, a $C_{1-20}$ hydrocarbyl radical, a $C_{1-20}$ alkoxy radical a $C_{6-10}$ aryl oxide radical, or alkylsilyl radicals containing at least one silicon atom and $C_{3-30}$ carbon atoms.

Disclosed herein is an improved continuous solution polymerization process where the improved process comprises: polymerizing ethylene and optionally at least one α-olefin, in a process solvent, in one or more reactors using a bridged metallocene catalyst to form the ethylene interpolymer product; where the improved process has an increased production rate, PRI, defined by the following formula;

$$PR^I = 100\times\frac{PR^A - PR^C}{PR^C} \geq 10\%$$

where $PR^A$ is the production rate of the improved process and $PR^C$ is a comparative production rate of a comparative continuous solution polymerization process where the bridged metallocene catalyst formulation has been replaced with an unbridged single site catalyst formulation.

Additional embodiments include a bridged metallocene catalyst formulation comprising: an alumoxane co-catalyst (component M); a boron ionic activator (component B), and, optionally, a hindered phenol (component P). Non-limiting examples of components M, B and P include: methylalumoxane (MMAO-7), trityl tetrakis (pentafluoro-phenyl) borate and 2,6-di-tert-butyl-4-ethylphenol, respectively.

The improved process further comprises: a process solvent comprising one or more $C_5$ to $C_{12}$ alkanes and one or more reactors operating at temperatures from 80° C. to 300° C. and pressures from 3 MPag to 45 MPag. Embodiments may include reactor conditions such that the process solvent in one or more reactors has an average reactor residence time from 10 seconds to 720 seconds. Further embodiments may include reactor conditions such that the catalyst inlet temperature employed in one or more reactors may vary from 20° C. to 180° C.

Other embodiments include an improved continuous solution polymerization process where an ethylene interpolymer product is formed by polymerizing ethylene, and optionally at least one α-olefin, in a process solvent, in one or more reactors, using a bridged metallocene catalyst formulation and the improved process is characterized by (a) and/or (b):

(a) the ethylene interpolymer product has at least a 10% improved (higher) weight average molecular weight, $M_W$, as defined by the following formula $$\%\ \text{Improved}\ M_w = 100\times\frac{(M_w^A - M_w^C)}{M_w^C} \geq 10\%$$

where $M_w^A$ is a weight average molecular weight of the ethylene interpolymer product produced using the improved process and $M_w^C$ is a comparative weight average molecular weight of a comparative ethylene interpolymer product; where the comparative ethylene interpolymer product is produced in a comparative process by replacing the bridged metallocene catalyst formulation with an unbridged single site catalyst formulation;

(b) an [α-olefin/ethylene] weight ratio, employed in the improved process, is reduced (improved) by at least 70% as defined by the following formula:

$$\%\ \text{Reduced}\left[\frac{\alpha-\text{olefin}}{\text{ethylene}}\right] = 100\times\left\{\frac{\left(\frac{\alpha-\text{olefin}}{\text{ethylene}}\right)^A - \left(\frac{\alpha-\text{olefin}}{\text{ethylene}}\right)^C}{\left(\frac{\alpha-\text{olefin}}{\text{ethylene}}\right)^C}\right\} \leq -70\%\ \text{where}\ \left(\frac{\alpha-\text{olefin}}{\text{ethylene}}\right)^A$$

represents the weight of the α-olefin added to the improved ethylene process divided by the weight of ethylene added to the improved process, where the ethylene interpolymer product having a target density is produced by a bridged metallocene catalyst formulation, and;

$$\left(\frac{\alpha - \text{olefin}}{\text{ethylene}}\right)^C$$

represents a comparative weight ratio required to produce a comparative ethylene interpolymer product having the target density, where the comparative ethylene interpolymer product is synthesized in a comparative process by replacing the bridged metallocene catalyst formulation with an unbridged single site catalyst formulation.

Embodiments of the ethylene interpolymer product may comprise a first ethylene interpolymer. Other embodiments of the ethylene interpolymer product may comprise a first ethylene interpolymer and a third ethylene interpolymer. Other embodiments of the ethylene interpolymer product may comprise a first ethylene interpolymer and a second ethylene interpolymer. Other embodiments of the ethylene interpolymer product may comprise a first ethylene interpolymer, a second ethylene interpolymer and a third ethylene interpolymer.

The first ethylene interpolymer has a melt index from 0.01 to 200 dg/minute and a density from 0.855 g/cc to 0.975 g/cc; the first ethylene interpolymer may comprise for 5 to 100 wt. % of the ethylene interpolymer product. The second ethylene interpolymer may comprise from 0 to 95 wt. % of the ethylene interpolymer product, has melt index from 0.3 to 1000 dg/minute and a density from 0.855 g/cc to 0.975 g/cc. The third ethylene interpolymer may comprise from 0 to 30 wt. % of the ethylene interpolymer product, has a melt index from 0.4 to 2000 dg/minute and a density from 0.855 g/cc to 0.975 g/cc. Weight percent, wt. %, is the weight of the first, the second or the optional third ethylene interpolymer, individually, divided by the total weight of the ethylene interpolymer product, melt index is measured according to ASTM D1238 (2.16 kg load and 190° C.) and density is measured according to ASTM D792.

In further embodiments, the upper limit on the $CDBI_{50}$ of the first and second ethylene interpolymers may be 98%, in other cases 95% and in still other cases 90%; and the lower limit on the $CDBI_{50}$ of the first and second ethylene interpolymers may be 70%, in other cases 75% and in still other cases 80%. The upper limit on the $CDBI_{50}$ of the third ethylene interpolymer may be 98%, in other cases 95% and in still other cases 90%; and the lower limit on the $CDBI_{50}$ of the third ethylene interpolymer may be 35%, in other cases 40% and in still other cases 45%.

In other embodiments, the upper limit on the $M_w/M_n$ of the first and second ethylene interpolymers may be 2.4, in other cases 2.3 and in still other cases 2.2; and the lower limit on the $M_w/M_n$ the first and second ethylene interpolymers may be 1.7, in other cases 1.8 and in still other cases 1.9. The upper limit on the $M_w/M_n$ of the third ethylene interpolymer may be 5.0, in other cases 4.8 and in still other cases 4.5; and the lower limit on the $M_w/M_n$ of the optional third ethylene interpolymer may be 1.7, in other cases 1.8 and in still other cases 1.9.

In this disclosure the amount of long chain branching in ethylene interpolymers was characterized by the dimensionless nonlinear rheology network parameter '$\Delta_{int}$'. In some embodiments the upper limit on the $\Delta_{int}$ of the first and second ethylene interpolymers may be 0.09, in other cases 0.07 and in still other cases 0.05 (dimensionless); and the lower limit on the $\Delta_{int.}$ of the first and second ethylene interpolymers is greater than or equal to 0.01 (dimensionless). The upper limit on the $\Delta_{int.}$ of the third ethylene interpolymer may be 0.09, in other cases 0.07 and in still other cases 0.05 (dimensionless); and the lower limit on the $\Delta_{int.}$ of the third ethylene interpolymers may be greater than or equal to 0.01, in other cases greater than 0.015, and in still other cases greater than 0.02 (dimensionless).

In this disclosure, the Unsaturation Ratio 'UR' was used to characterize the degree of unsaturation in ethylene interpolymers. In some embodiments the upper limit on the UR of the first and second ethylene interpolymers may be 0.06, in other cases 0.04 and in still other cases 0.02 (dimensionless), and the lower limit on the UR of the first and second ethylene interpolymers may be −0.40, in other cases −0.30 and in still other cases −0.20 (dimensionless). The upper limit on the UR of the third ethylene interpolymer may be 0.06, in other cases 0.04 and in still other cases 0.02 (dimensionless); and the lower limit on UR of the third ethylene interpolymer may be −1.0, in other cases −0.95 and in still other cases −0.9.

In this disclosure the amount of residual catalytic metal in ethylene interpolymers was characterized by Neutron Activation Analysis 'NAA'. The upper limit on the ppm of metal $A^{R1}$ in the first ethylene interpolymer may be 5.0 ppm, in other cases 4.0 ppm and in still other cases 3.0 ppm, and the lower limit on the ppm of metal $A^{R1}$ in the first ethylene interpolymer may be 0.03 ppm, in other cases 0.09 ppm and in still other cases 0.15 ppm. The upper limit on the ppm of metal $A^{R2}$ in the second ethylene interpolymer may be 5.0 ppm, in other cases 4.0 ppm and in still other cases 3.0 ppm; while the lower limit on the ppm of metal $A^{R2}$ in the second ethylene interpolymer may be 0.03 ppm, in other cases 0.09 ppm and in still other cases 0.15 ppm. The catalyst residue in the third ethylene interpolymer reflected the catalyst employed in its manufacture. If a bridged metallocene catalyst formulation was used, the upper limit on the ppm of metal $A^{R3}$ in the third ethylene interpolymer may be 5.0 ppm, in other cases 4.0 ppm and in still other cases 3.0 ppm; and the lower limit on the ppm of metal $A^{R3}$ in the third ethylene interpolymer may be 0.03 ppm, in other cases 0.09 ppm and in still other cases 0.15 ppm. If an unbridged single site catalyst formulation was used, the upper limit on the ppm of metal $C^{R3}$ in the third ethylene interpolymer may be 3.0 ppm, in other cases 2.0 ppm and in still other cases 1.5 ppm and the lower limit on the ppm of metal $C^{R3}$ in the third ethylene interpolymer may be 0.03 ppm, in other cases 0.09 ppm and in still other cases 0.15 ppm. In the case of a homogeneous catalyst formulation containing a bulky ligand-metal complex that is not a member of the genera defined by Formula (I) or (II), the upper limit on the ppm of metal $B^{R3}$ in the third ethylene interpolymer may be 5.0 ppm, in other cases 4.0 ppm and in still other cases 3.0 ppm; and the lower limit on the ppm of metal $B^{R3}$ in the third ethylene interpolymer may be 0.03 ppm, in other cases 0.09 ppm and in still other cases 0.15 ppm. If a heterogeneous catalyst formulation was used, the upper limit on the ppm of metal $Z^{R3}$ in the third ethylene interpolymer may be 12 ppm, in other cases 10 ppm and in still other cases 8 ppm; and the lower limit on the ppm of metal $Z^{R3}$ in the third ethylene interpolymer may be 0.5 ppm, in other cases 1 ppm and in still other cases 3 ppm.

Non-limiting embodiments of manufactured articles include a film comprising at least one layer, where the layer comprises at least one of the ethylene interpolymer products disclosed herein; where the ethylene interpolymer product has 1) a dimensionless nonlinear rheology integrated network parameter, $\Delta_{int.}$, greater than or equal to 0.01 and satisfying the inequality $[0.01\times(Z-48)^{0.78}\leq\Delta_{int}\leq 0.01\times(Z-60)^{0.78}]$ wherein Z is a normalized molecular weight defined by $$Z = \frac{M_w}{M_e}$$

where $M_W$ and $M_e$ are the weight average and entanglement molecular weights; and 2) a residual catalytic metal of from 0.03 to ≤5 ppm of hafnium. In other embodiments the film has a film gloss at 45° that is from 10% to 30% higher relative to a comparative film and/or the film has a film haze that is from 30% to 50% lower compared to a comparative film; where the comparative film has the same composition except the ethylene interpolymer product synthesized with a bridged metallocene catalyst formulation is replaced with a comparative ethylene interpolymer product synthesized with an unbridged single site catalyst formulation.

Additional film embodiments include films where the at least one layer further comprises at least one second polymer; where the second polymer may be one or more ethylene polymers, one or more propylene polymers or a mixture of ethylene polymers and propylene polymers. Further embodiments include films having a total thickness from 0.5 mil to 10 mil. Other embodiments include multilayer films that have from 2 to 11 layers, where at least one layer comprises at least one ethylene interpolymer product.

BRIEF DESCRIPTION OF DRAWINGS

The following Figures are presented for the purpose of illustrating selected embodiments of this disclosure. It being understood that embodiments in this disclosure are not limited by these figures; for example, the precise number of vessels shown in FIGS. 6 and 7, or the arrangement of vessels is not limiting.

The area enclosed by the solid lines depicts the region defined by the inequality $[0.01\times(Z-48)^{0.78}\leq\Delta_{int.}\leq 0.01\times(Z-60)^{0.78}]$.

Figure 6:
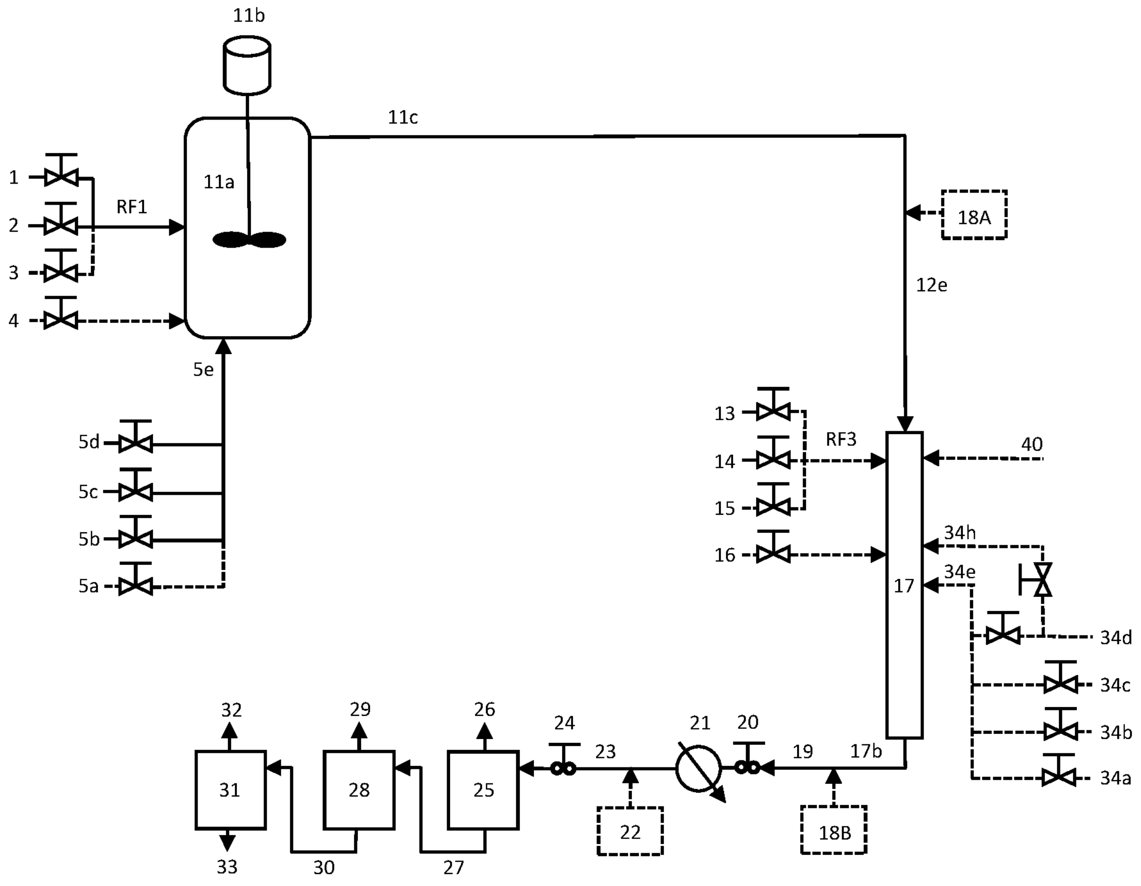

FIG. 6 illustrates embodiments of a continuous solution polymerization process employing one CSTR reactor (vessel 11*a*) and one tubular reactor (vessel 17).

Figure 7:
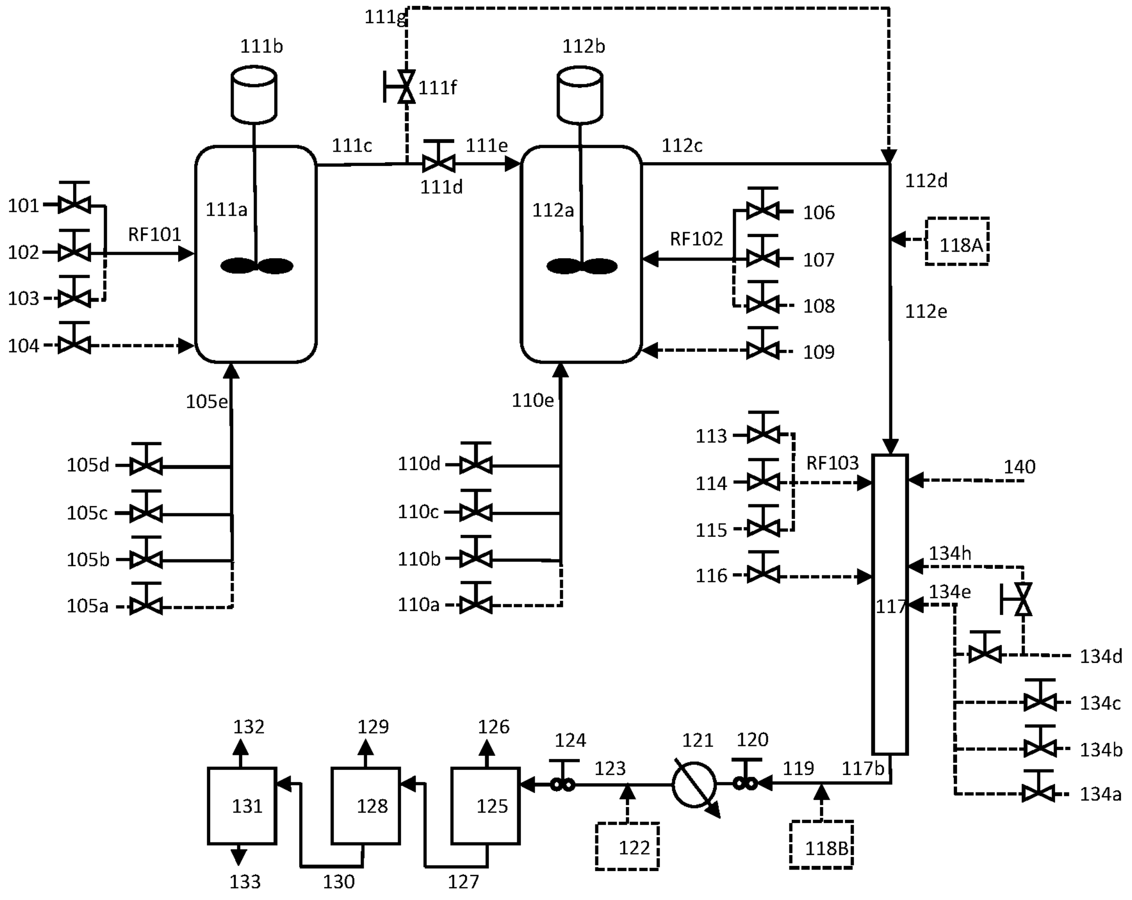

FIG. 7 illustrates embodiments of a continuous solution polymerization process employing two CSTR reactors (vessels 111*a* and 112*a*) and one tubular reactor (vessel 117). The two CSTR may be operated in series or parallel modes.

Figure 8:
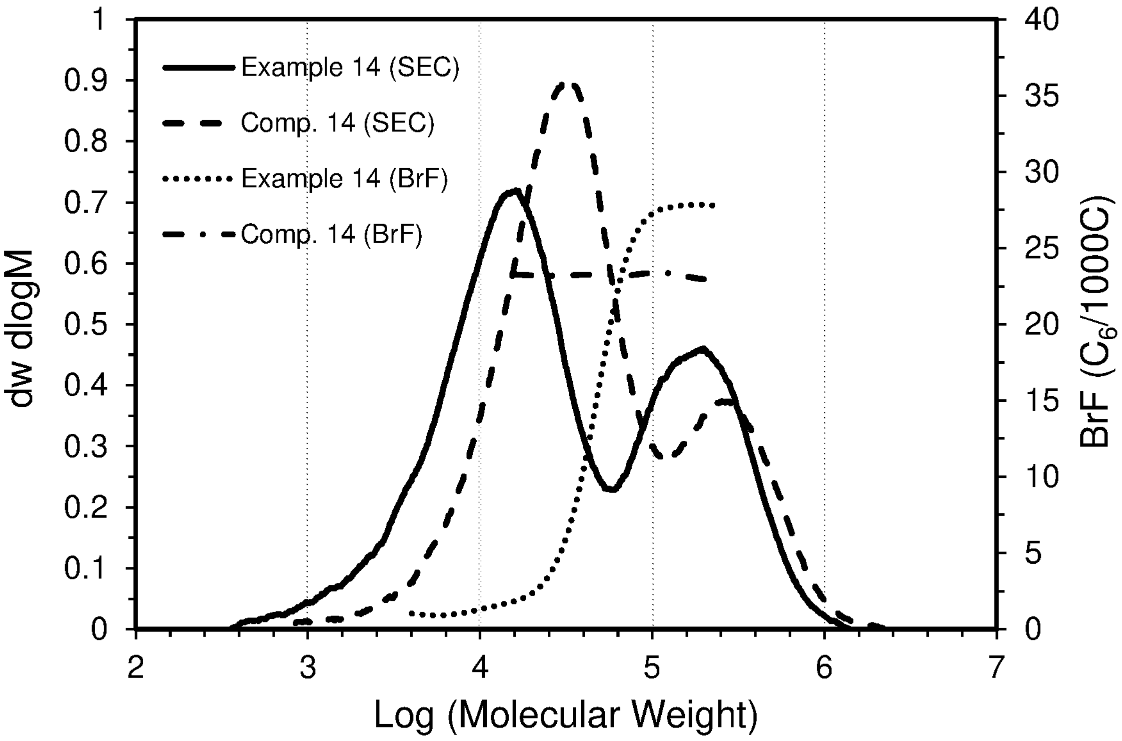

FIG. 8 SEC determined molecular weight distribution and GPC-FTIR determined branch content (BrF, $C_6$/1000 C) in Example 14 and Comparative 14.

Figure 9:
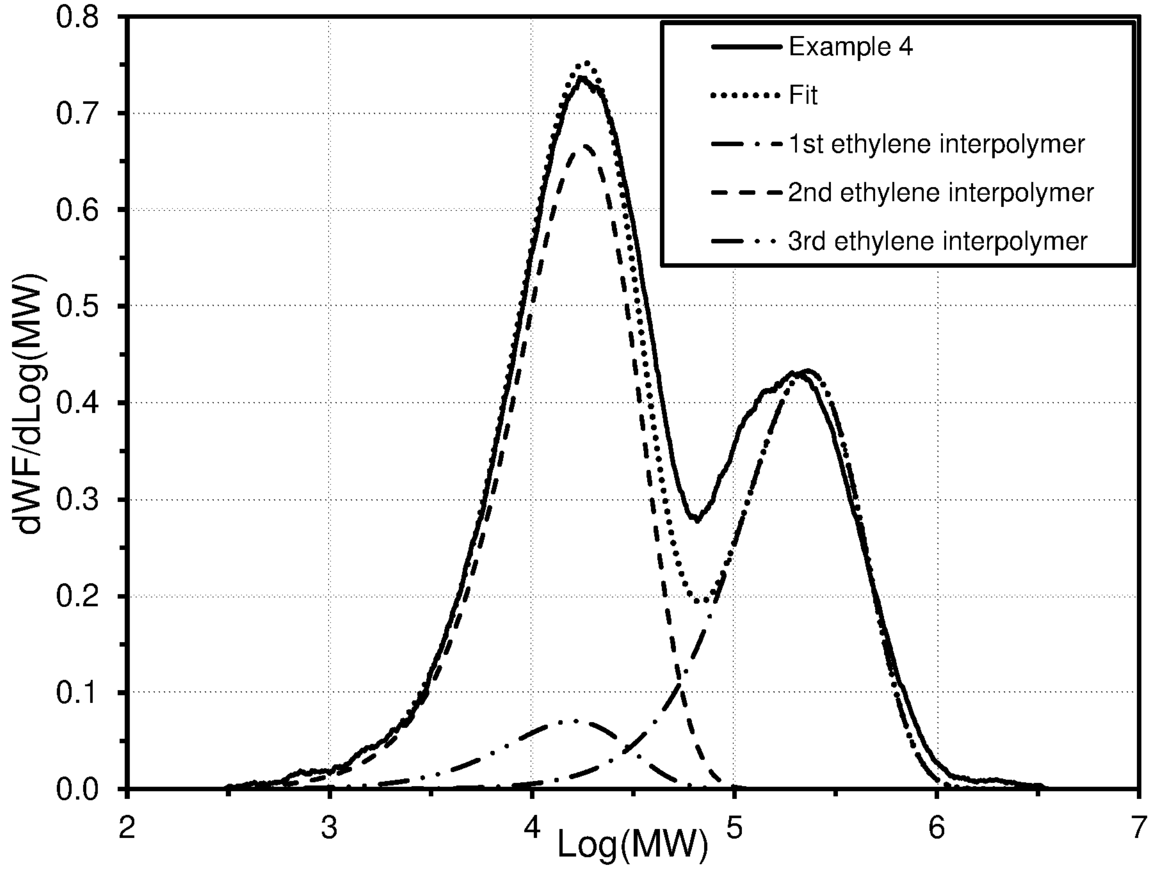

FIG. 9 deconvolution of ethylene interpolymer product Example 4 into a first, second and third ethylene interpolymer.

Figure 10:
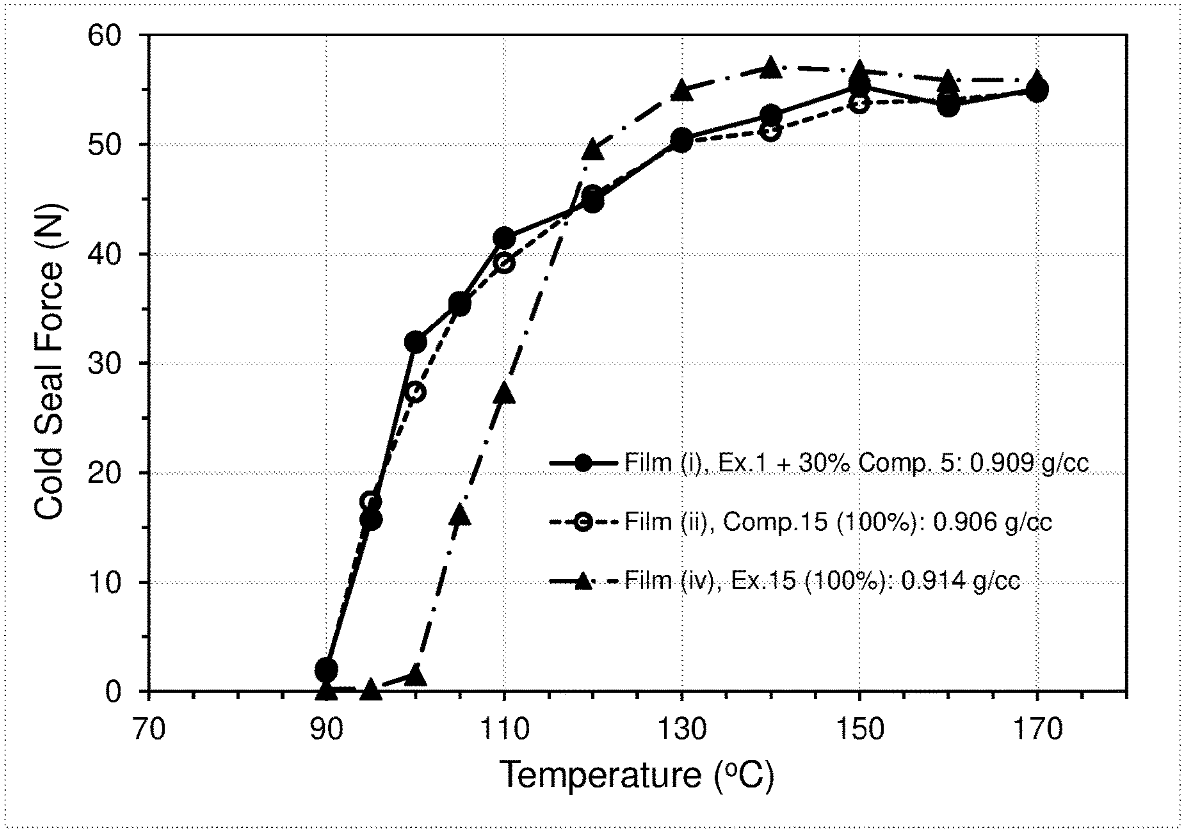

FIG. 10 multilayer film cold seal force (Newtons, N) as a function of sealing temperature.

Figure 11:
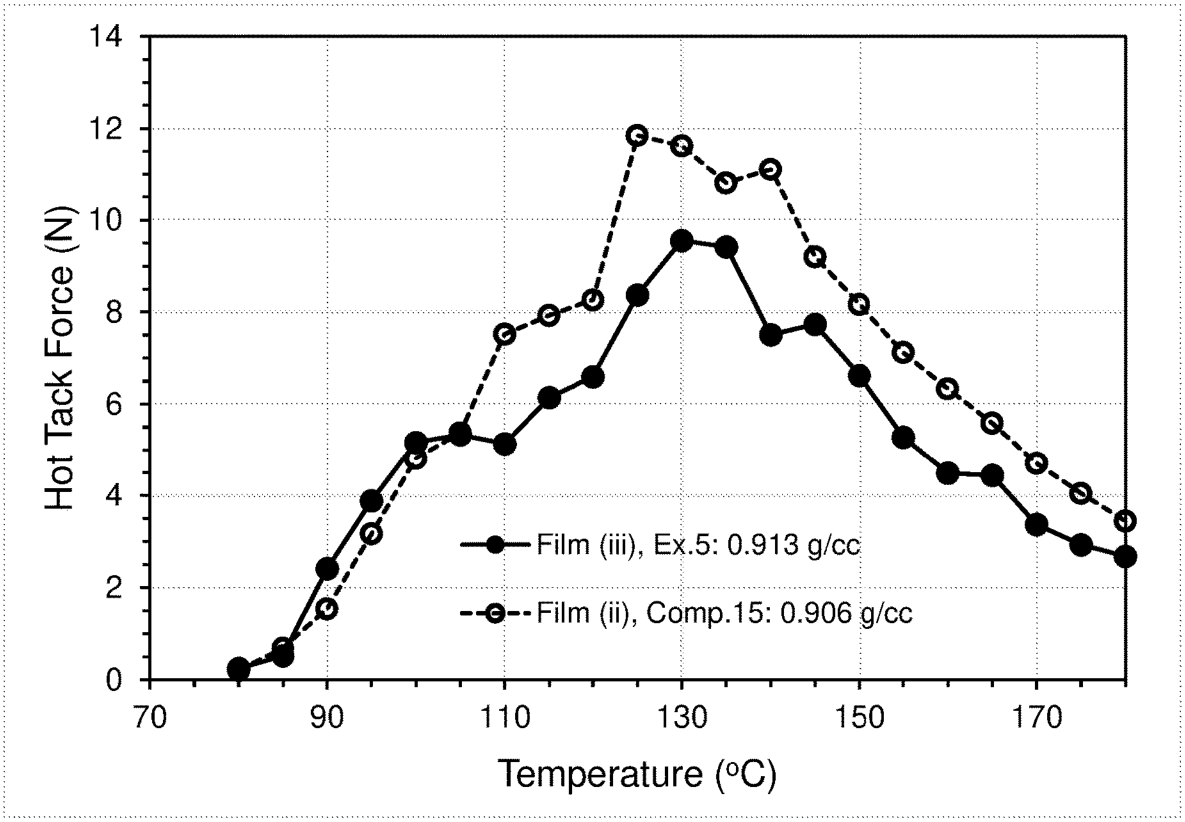

FIG. 11 multilayer film hot tack force (Newtons, N) as a function of sealing temperature.

DEFINITION OF TERMS

Other than in the examples or where otherwise indicated, all numbers or expressions referring to quantities of ingredients, extrusion conditions, etc., used in the specification and claims are to be understood as modified in all instances by the term 'about'. Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain; an equivalent term is "linear α-olefin".

As used herein, the term "ethylene polymer", refers to macromolecules produced from ethylene and optionally one or more additional monomers; regardless of the specific catalyst or specific process used to make the ethylene polymer. In the polyethylene art, the one or more additional monomers are frequently called "comonomer(s)" and often include α-olefins. The term "homopolymer" refers to a polymer that contains only one type of monomer.

Common ethylene polymers include high density polyethylene (HDPE), medium density polyethylene (MDPE), linear low-density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

The term "ethylene interpolymer" refers to a subset of polymers within the "ethylene polymer" group that excludes polymers produced in high pressure polymerization processes; non-limiting examples of polymer produced in high pressure processes include LDPE and EVA (the latter is a copolymer of ethylene and vinyl acetate).

The term "heterogeneous ethylene interpolymers" refers to a subset of polymers in the ethylene interpolymer group that are produced using a heterogeneous catalyst formulation; non-limiting examples of which include Ziegler-Natta or chromium catalysts.

The term "homogeneous ethylene interpolymer" refers to a subset of polymers in the ethylene interpolymer group that are produced using homogeneous catalyst formulations. Typically, homogeneous ethylene interpolymers have narrow molecular weight distributions, for example Size Exclusion Chromatography (SEC) $M_w/M_n$ values of less than 2.8; $M_w$ and $M_n$ refer to weight and number average molecular weights, respectively. In contrast, the $M_w/M_n$ of heterogeneous ethylene interpolymers are typically greater than the $M_w/M_n$ of homogeneous ethylene interpolymers. In general, homogeneous ethylene interpolymers also have a narrow comonomer distribution, i.e. each macromolecule within the molecular weight distribution has a similar comonomer content. Frequently, the composition distribution breadth index "CDBI" is used to quantify how the comonomer is distributed within an ethylene interpolymer, as well as to differentiate ethylene interpolymers produced with different catalysts or processes. The "$CDBI_{50}$" is defined as the percent of ethylene interpolymer whose composition is within 50% of the median comonomer composition; this definition is consistent with that described in U.S. Pat. No. 5,206,075 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., 1982, 20, pp 441-455. Typically, the $CDBI_{50}$ of homogeneous ethylene interpolymers are greater than about 70%. In contrast, the $CDBI_{50}$ of α-olefin containing heterogeneous ethylene interpolymers are generally lower than the $CDBI_{50}$ of homogeneous ethylene interpolymers. A blend of two or more homogeneous ethylene interpolymers (that differ in comonomer content) may have a $CDBI_{50}$ less than 70%; in this disclosure such a blend may be referred to as a homogeneous blend or homogeneous composition. Similarly, a blend of two or more homogeneous ethylene interpolymers (that differ in weight average molecular weight $M_w$) may have a $M_w/M_n \geq 2.8$; in this disclosure such a blend may be referred to as a homogeneous blend or homogeneous composition.

In this disclosure, the term "homogeneous ethylene interpolymer" refers to both linear homogeneous ethylene interpolymers and substantially linear homogeneous ethylene interpolymers. In the art, linear homogeneous ethylene interpolymers are generally assumed to have no long chain branches or an undetectable amount of long chain branches; while substantially linear ethylene interpolymers are generally assumed to have low levels of long-chain branching (i.e. much less than 1 long chain branch per 1000 carbon atoms as described by Shroff and Mavridis in Macromolecules 1999, 32, 8454-8464). These LCB levels are far below the detection limits of analytical methods such as solution viscometry, size-exclusion chromatography and NMR spectrometry. However, LCB structures at these levels have a profound impact on melt rheology and forming behavior of polymeric materials. A long chain branch is macromolecular in nature, i.e. a branch that has a length greater than the critical molecular weight for entanglement (i.e. 2 to 3 time larger than $M_e \approx 900$ g/mol for PE homopolymer) up to a branch that has a length similar to that of the macromolecule backbone that the long chain branch is attached to (see Doerpinghaus and Baird, Journal of Rheology 2003, 47, 717-736).

In this disclosure, the term 'homogeneous catalyst' is defined by the characteristics of the polymer produced by the homogeneous catalyst. More specifically, a catalyst is a homogeneous catalyst if it produces a homogeneous ethylene interpolymer that has a narrow molecular weight distribution (SEC-determined $M_w/M_n$ values of less than 2.8) and a narrow comonomer distribution ($CDBI_{50}$≥70%). Homogeneous catalysts are well known in the art. Two subsets of the homogeneous catalyst genus include unbridged metallocene catalysts and bridged metallocene catalysts. Unbridged metallocene catalysts are characterized by two bulky ligands bonded to the catalytic metal, a non-limiting example includes bis(isopropyl-cyclopentadienyl) hafnium dichloride. In bridged metallocene catalysts the two bulky ligands are covalently bonded (bridged) together, a non-limiting example includes diphenylmethylene (cyclopentadienyl) (2,7-di-t-butylfuorenyl) hafnium dichloride; wherein the diphenylmethylene group bonds, or bridges, the cyclopentadienyl and fluorenyl ligands together. Two additional subsets of the homogeneous catalyst genus include unbridged and bridged single site catalysts. In this disclosure, single site catalysts are characterized as having only one bulky ligand bonded to the catalytic metal. A non-limiting example of an unbridged single site catalyst includes cyclopentadienyl tri(tertiary butyl)phosphinimine titanium dichloride. A non-limiting example of a bridged single site catalyst includes $[C_5(CH_3)_4—Si(CH_3)_2—N(tBu)]$ titanium dichloride, where the $—Si(CH_3)_2$ group functions as the bridging group.

Herein, the term "polyolefin" includes ethylene polymers and propylene polymers; non-limiting examples of propylene polymers include isotactic, syndiotactic and atactic propylene homopolymers, random propylene copolymers containing at least one comonomer (e.g. α-olefins) and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein, the terms "hydrocarbyl", "hydrocarbyl radical" or "hydrocarbyl group" refers to linear, branched, or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl ($—CH_3$) and ethyl ($—CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that comprise from 1 to 3 atoms selected from the group consisting of boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Non-limiting examples of substituted alkyls and aryls include acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

Herein the term "R1" and its superscript form "$^{R1}$" refers to a first reactor in a continuous solution polymerization process; it being understood that R1 is different from the symbol $R^1$; the latter is used in chemical formula, e.g. representing a hydrocarbyl group. Similarly, the term "$R_2$" and its' superscript form "$^{R2}$" refers to a second reactor, and; the term "$R_3$" and it's superscript form "$^{R3}$" refers to a third reactor.

As used herein, the term "oligomers" refers to an ethylene polymer of low molecular weight, e.g., an ethylene polymer with a weight average molecular weight ($M_w$) of about 2000 to 3000 daltons. Other commonly used terms for oligomers include "wax" or "grease". As used herein, the term "light-end impurities" refers to chemical compounds with relatively low boiling points that may be present in the various vessels and process streams within a continuous solution polymerization process; non-limiting examples include, methane, ethane, propane, butane, nitrogen, $CO_2$, chloroethane, HCl, etc.

DESCRIPTION OF EMBODIMENTS

There is a need to improve the continuous solution polymerization process. For example, to increase the molecular weight of the ethylene interpolymer produced at a given reactor temperature. In addition, in solution polymerization there is a need for catalyst formulations that are very efficient at incorporating one or more α-olefins into the propagating macromolecular chain. Expressed in different manner, there is a need for catalyst formulations that produce an ethylene/α-olefin copolymer, having a specific density, at a lower (α-olefin/ethylene) ratio in the reactor feed. In addition, there is a need for ethylene interpolymer products that upon conversion into manufactured articles have improved properties.

In the embodiments disclosed herein, 'a bridged metallocene catalyst formulation' was employed in at least one solution polymerization reactor. This catalyst formulation included a bulky ligand-metal complex, 'Component A', defined by Formula (I).

(I)

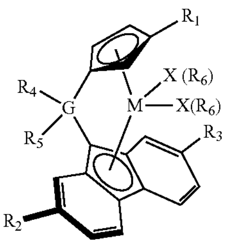

In Formula (I): non-limiting examples of M include Group 4 metals, i.e. titanium, zirconium and hafnium; non-limiting examples of G include Group 14 elements, carbon, silicon, germanium, tin and lead; X represents a halogen atom, fluorine, chlorine, bromine or iodine; the $R_6$ groups are independently selected from a hydrogen atom, a $C_{1-20}$ hydrocarbyl radical, a $C_{1-20}$ alkoxy radical or a $C_{6-10}$ aryl oxide radical (these radicals may be linear, branched or cyclic or further substituted with halogen atoms, $C_{1-10}$ alkyl radicals, $C_{1-10}$ alkoxy radicals, $C_{6-10}$ aryl or aryloxy radicals); $R_1$ represents a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms; $R_2$ and $R_3$ are independently selected from a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms, and; $R_4$ and $R_5$ are independently selected from a hydrogen atom, a $C_{1-20}$ hydrocarbyl radical, a $C_{1-20}$ alkoxy radical a $C_{6-10}$ aryl oxide radical, or alkylsilyl radicals containing at least one silicon atom and $C_{3-30}$ carbon atoms.

In the art, a commonly used term for the X(R6) group shown in Formula (I) is 'leaving group', i.e. any ligand that can be abstracted from Formula (I) forming a catalyst species capable of polymerizing one or more olefin(s). An equivalent term for the $X(R_6)$ group is an 'activatable ligand'. Further non-limiting examples of the $X(R_6)$ group shown in Formula (I) include weak bases such as amines, phosphines, ethers, carboxylates and dienes. In another embodiment, the two $R_6$ groups may form part of a fused ring or ring system.

Further embodiments of component A include structural, optical or enantiomeric isomers (meso and racemic isomers) and mixtures thereof of the structure shown in Formula (I). While not to be construed as limiting, two species of component A include: diphenylmethylene(cyclopentadienyl)(2,7-di-t-butylfuorenyl)hafnium dichloride having the molecular formula $[(2,7\text{-}tBu_2Flu)Ph_2C(Cp)HfCl_2]$; and diphenylmethylene(cyclopentadienyl)(2,7-di-t-butylfuorenyl)hafnium dimethyl having the molecular formula $[(2,7\text{-}tBu_2Flu)Ph_2C(Cp)HfMe_2]$.

In the embodiments disclosed herein, 'a bridged metallocene catalyst formulation' was employed in: (i) a first reactor to produce a first ethylene interpolymer; or (ii) a first and third reactor, to produce a first and third ethylene interpolymer; or (iii) a first and second reactor, to produce a first and second ethylene interpolymer; or (iv) a first, second and third solution polymerization reactor, to produce a first, second and third ethylene interpolymer. The first and second reactors may be operated in series or parallel mode. In series mode the effluent from the first reactor flows directly into the second reactor. In contrast, in parallel mode the effluent from the first reactor by-passes the second reactor and the effluent from the first and second reactor are combined downstream of the second reactor.

A wide variety of catalyst formulations may be employed in the optional third reactor. Non-limiting examples of the catalyst formulation employed in the third reactor include the bridged metallocene catalyst formulation described above, the unbridged single site catalyst formulation described below, a homogeneous catalyst formulation comprising a bulky ligand-metal complex that is not a member of the genera defined by Formula (I) (above), or Formula (II) (below), or a heterogeneous catalyst formulation. Non-limiting examples of heterogeneous catalyst formulations include Ziegler-Natta or chromium catalyst formulations.

In Comparative 1 samples disclosed herein, e.g. Comparative 1a and 1b, 'an unbridged single site catalyst formulation' was employed in at least one solution polymerization reactor. This catalyst formulation included a bulky ligand-metal complex, hereinafter 'Component C', defined by Formula (II).

$$(L^A)_a M(PI)_b(Q)_n \qquad (II)$$

In Formula (II): $(L^A)$ represents a bulky ligand; M represents a metal atom; PI represents a phosphinimine ligand; Q represents a leaving group; a is 0 or 1; b is 1 or 2; (a+b)=2; n is 1 or 2; and the sum of (a+b+n) equals the valance of the metal M. Non-limiting examples of M in Formula (II) include Group 4 metals, titanium, zirconium and hafnium.

Non-limiting examples of the bulky ligand $L^A$ in Formula (II) include unsubstituted or substituted cyclopentadienyl ligands or cyclopentadienyl-type ligands, heteroatom substituted and/or heteroatom containing cyclopentadienyl-type ligands. Additional non-limiting examples include, cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of n-bonding to the metal M, such embodiments include both $\eta^3$-bonding and $\eta^5$-bonding to the metal M. In other embodiments, $L^A$ may comprise one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

The phosphinimine ligand, PI, is defined by Formula (III):

$$(R^P)_3P{=}N{-} \qquad (III)$$

wherein the $R^P$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula —$Si(R^S)_3$, wherein the $R^S$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula —$Ge(R^G)_3$, wherein the $R^G$ groups are defined as $R^S$ is defined in this paragraph.

The leaving group Q is any ligand that can be abstracted from Formula (II) forming a catalyst species capable of polymerizing one or more olefin(s). In some embodiments, Q is a monoanionic labile ligand having a sigma bond to M. Depending on the oxidation state of the metal, the value for n is 1 or 2 such that Formula (II) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-10}$ alkoxy radicals, $C_{6-10}$ arly or aryloxy radicals. Further non-limiting examples of Q ligands include weak bases such as amines, phosphines, ethers, carboxylates, dienes, hydrocarbyl radicals having from 1 to 20 carbon atoms. In another embodiment, two Q ligands may form part of a fused ring or ring system.

Further embodiments of Component C include structural, optical or enantiomeric isomers (meso and racemic isomers) and mixtures thereof of the bulky ligand-metal complex shown in Formula (II).

While not to be construed as limiting, two species of component C include: cyclopentadienyl tri(tertiary butyl) phosphinimine titanium dichloride having the molecular formula $[Cp[(t\text{-}Bu)_3PN]TiCl_2]$; and cyclopentadienyl tri (isopropyl)phosphinimine titanium dichloride having the molecular formula $[Cp[(isopropyl)_3PN]TiCl_2]$.

The bridged metallocene catalyst formulation contains a component A (defined above), a component $M^A$, a component $B^A$ and a component $P^A$. Components M, B and P are defined below and the superscript "$^A$" denotes that fact that the respective component was part of the catalyst formulation containing component A, i.e. the bridged metallocene catalyst formulation.

In this disclosure Comparative ethylene interpolymer products were prepared by employing an unbridged single site catalyst formulation. In these Comparative samples, the unbridged single site catalyst formulation replaced the bridged metallocene catalyst formulation in the first polymerization reactor, or the first and second polymerization reactor(s), or the first, second and third polymerization reactors. The unbridged single site catalyst formulation contains a component C (defined above), a component $M^C$, a component $B^C$ and a component Pc. Components M, B and P are defined below and the superscript "c" denoted that fact that the respective component was part of the catalyst formulation containing component C, i.e. the unbridged single site catalyst formulation.

The catalyst components M, B and P were independently selected for each catalyst formulation. To be more clear: components $M^A$ and $M^C$ may, or may not, be the same chemical compound; components $B^A$ and $B^C$ may, or may not, be the same chemical compound, and; components $P^A$ and $P^C$ may, or may not, be the same chemical compound. Further, catalyst activity was optimized by independently adjusting the mole ratios of the components in each catalyst formulation.

Components M, B and P were not particularly limited, i.e., a wide variety of components can be used as described below.

Component M functioned as a co-catalyst that activated component A or component C, into a cationic complex that effectively polymerized ethylene, or mixtures of ethylene and α-olefins, producing high molecular weight ethylene interpolymers. In the bridged metallocene catalyst formulation and the unbridged single site catalyst formulation the respective component M was independently selected from a variety of compounds and those skilled in the art will understand that the embodiments in this disclosure are not limited to the specific chemical compound disclosed. Suitable compounds for component M included an alumoxane co-catalyst (an equivalent term for alumoxane is aluminoxane). Although the exact structure of an alumoxane co-catalyst was uncertain, subject matter experts generally agree that it was an oligomeric species that contain repeating units of the general Formula (IV):

$$(R)_2AlO—(Al(R)—O)_n—Al(R)_2 \qquad \text{(IV)}$$

where the R groups may be the same or different linear, branched or cyclic hydrocarbyl radicals containing 1 to 20 carbon atoms and n is from 0 to about 50. A non-limiting example of an alumoxane was methyl aluminoxane (or MMAO-7) wherein each R group in Formula (IV) is a methyl radical.

Component B was an ionic activator. In general, ionic activators are comprised of a cation and a bulky anion; wherein the latter is substantially non-coordinating.

In the bridged metallocene catalyst formulation and the unbridged single site catalyst formulation the respective component B was independently selected from a variety of compounds and those skilled in the art will understand that the embodiments in this disclosure are not limited to the specific chemical compound disclosed. Non-limiting examples of component B were boron ionic activators that are four coordinate with four ligands bonded to the boron atom. Non-limiting examples of boron ionic activators included the following Formulas (V) and (VI) shown below;

$$[R^5]^+[B(R^7)_4]^- \qquad \text{(V)}$$

where B represented a boron atom, $R^5$ was an aromatic hydrocarbyl (e.g. triphenyl methyl cation) and each $R^7$ was independently selected from phenyl radicals which were unsubstituted or substituted with from 3 to 5 substituents selected from fluorine atoms, $C_{1-4}$ alkyl or alkoxy radicals which were unsubstituted or substituted by fluorine atoms; and a silyl radical of formula —$Si(R^9)_3$, where each $R^9$ was independently selected from hydrogen atoms and $C_{1-4}$ alkyl radicals, and; compounds of formula (VI);

$$[(R^8)_tZH]^+[B(R^7)_4]^- \qquad \text{(VI)}$$

where B was a boron atom, H was a hydrogen atom, Z was a nitrogen or phosphorus atom, t was 2 or 3 and $R^8$ was selected from $C_{1-8}$ alkyl radicals, phenyl radicals which were unsubstituted or substituted by up to three $C_{1-4}$ alkyl radicals, or one $R^8$ taken together with the nitrogen atom may form an anilinium radical and $R^7$ was as defined above in Formula (VI).

In both Formula (V) and (VI), a non-limiting example of $R^7$ was a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators included: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators included N,N-dimethylanilinium tetrakispentafluorophenyl borate, and triphenylmethylium tetrakispentafluorophenyl borate.

Component P is a hindered phenol and is an optional component in the respective catalyst formulation. In the bridged metallocene catalyst formulation and the unbridged single site catalyst formulation the respective component P was independently selected from a variety of compounds and those skilled in the art will understand that the embodiments in this disclosure are not limited to the specific chemical compound disclosed. Non-limiting example of hindered phenols included butylated phenolic antioxidants, butylated hydroxytoluene, 2,4-di-tertiarybutyl-6-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

As fully described below, a highly active bridged metallocene catalyst formulation was produced by optimizing the quantity and mole ratios of the four components in the formulation, i.e., component A, component $M^A$, component $B^A$ and optionally component $P^A$. Where highly active means a very large amount of ethylene interpolymer is produced from a very small amount of catalyst formulation. Similarly, a highly active unbridged single site catalyst formulation (comparative catalyst formulation) was produced by optimizing the quantity and mole ratios of the four components in the formulation, i.e., component C, component $M^C$, component $B^C$ and optionally component Pc.

In this disclosures, heterogeneous catalyst formulations may be employed in the optional third reactor to synthesize the third ethylene interpolymer. Non-limiting examples of heterogeneous catalyst formulations include Ziegler-Natta and chromium catalyst formulations. Non-limiting examples of Ziegler-Natta catalyst formulations include 'an in-line Ziegler-Natta catalyst formulation' or 'a batch Ziegler-Natta catalyst formulation'. The term 'in-line' refers to the continuous synthesis of a small quantity of active Ziegler-Natta catalyst and immediately injecting this catalyst into the third reactor, wherein ethylene and one or more optional α-olefins were polymerized to form the optional third ethylene interpolymer. The term 'batch' refers to the synthesis of a much larger quantity of catalyst or procatalyst in one or more mixing vessels that were external to, or isolated from, the continuously operating solution polymerization process. Once prepared, the batch Ziegler-Natta catalyst formulation, or batch Ziegler-Natta procatalyst, was transferred to a catalyst storage tank. The term 'procatalyst' referred to an inactive catalyst formulation (inactive with respect to ethylene polymerization); the procatalyst was converted into an active catalyst by adding an alkyl aluminum co-catalyst. As needed, the procatalyst was pumped from the storage tank to at least one continuously operating reactor, wherein an active catalyst polymerizes ethylene and one or more optional α-olefins to form an ethylene interpolymer. The procatalyst may be converted into an active catalyst in the reactor or external to the reactor.

A wide variety of chemical compounds can be used to synthesize an active Ziegler-Natta catalyst formulation. The following describes various chemical compounds that may be combined to produce an active Ziegler-Natta catalyst formulation. Those skilled in the art will understand that the embodiments in this disclosure are not limited to the specific chemical compound disclosed.

An active Ziegler-Natta catalyst formulation may be formed from: a magnesium compound, a chloride compound, a metal compound, an alkyl aluminum co-catalyst and an aluminum alkyl. In this disclosure, the term "component (v)" is equivalent to the magnesium compound, the term "component (vi)" is equivalent to the chloride compound, the term "component (vii)" is equivalent to the metal compound, the term "component (viii)" is equivalent to the alkyl aluminum co-catalyst and the term "component (ix)" is equivalent to the aluminum alkyl. As will be appreciated by those skilled in the art, Ziegler-Natta catalyst formulations may contain additional components; a non-limiting example of an additional component is an electron donor, e.g. amines or ethers.

A non-limiting example of an active in-line Ziegler-Natta catalyst formulation can be prepared as follows. In the first step, a solution of a magnesium compound (component (v)) is reacted with a solution of the chloride compound (component (vi)) to form a magnesium chloride support suspended in solution. Non-limiting examples of magnesium compounds include $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; wherein $R^2$ represents a hydrogen atom, or a linear, branched or cyclic hydrocarbyl radical containing 1 to 10 carbon atoms. In the first step, the solution of magnesium compound may also contain an aluminum alkyl (component (ix)). Non-limiting examples of aluminum alkyl include $Al(R^3)_3$, wherein the $R^3$ groups may be the same or different, linear, branched or cyclic hydrocarbyl radicals containing from 1 to 10 carbon atoms. In the second step a solution of the metal compound (component (vii)) is added to the solution of magnesium chloride and the metal compound is supported on the magnesium chloride. Non-limiting examples of suitable metal compounds include M(X)n or MO(X)n; where M represents a metal selected from Group 4 through Group 8 of the Periodic Table, or mixtures of metals selected from Group 4 through Group 8; O represents oxygen; and X represents chloride or bromide; n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step a solution of an alkyl aluminum co-catalyst (component (viii)) is added to the metal compound supported on the magnesium chloride. A wide variety of alkyl aluminum co-catalysts are suitable, as expressed by Formula (VII):

$$Al(R^4)_p(OR^5)_q(X)_r \quad \text{(VII)}$$

wherein the $R^4$ groups may be the same or different, hydrocarbyl groups having from 1 to 10 carbon atoms; the $OR^5$ groups may be the same or different, alkoxy or aryloxy groups wherein $R^5$ is a hydrocarbyl group having from 1 to 10 carbon atoms bonded to oxygen; X is chloride or bromide; and (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line Ziegler-Natta catalyst formulation, can be carried out in a variety of solvents; non-limiting examples of solvents include linear or branched $C_5$ to $C_{12}$ alkanes or mixtures thereof.

To produce an active in-line Ziegler-Natta catalyst formulation the quantity and mole ratios of the five components, (v) through (ix), are optimized as described below.

Additional embodiments of heterogeneous catalyst formulations include formulations where the "metal compound" is a chromium compound; non-limiting examples include silyl chromate, chromium oxide and chromocene. In some embodiments, the chromium compound is supported on a metal oxide such as silica or alumina. Heterogeneous catalyst formulations containing chromium may also include co-catalysts; non-limiting examples of co-catalysts include trialkylaluminum, alkylaluminoxane and dialkoxyalkylaluminum compounds and the like.

In this disclosure, the bridged metallocene catalyst formulation produced solution process ethylene interpolymer products having a unique unsaturation ratio, UR.

Figure 1:
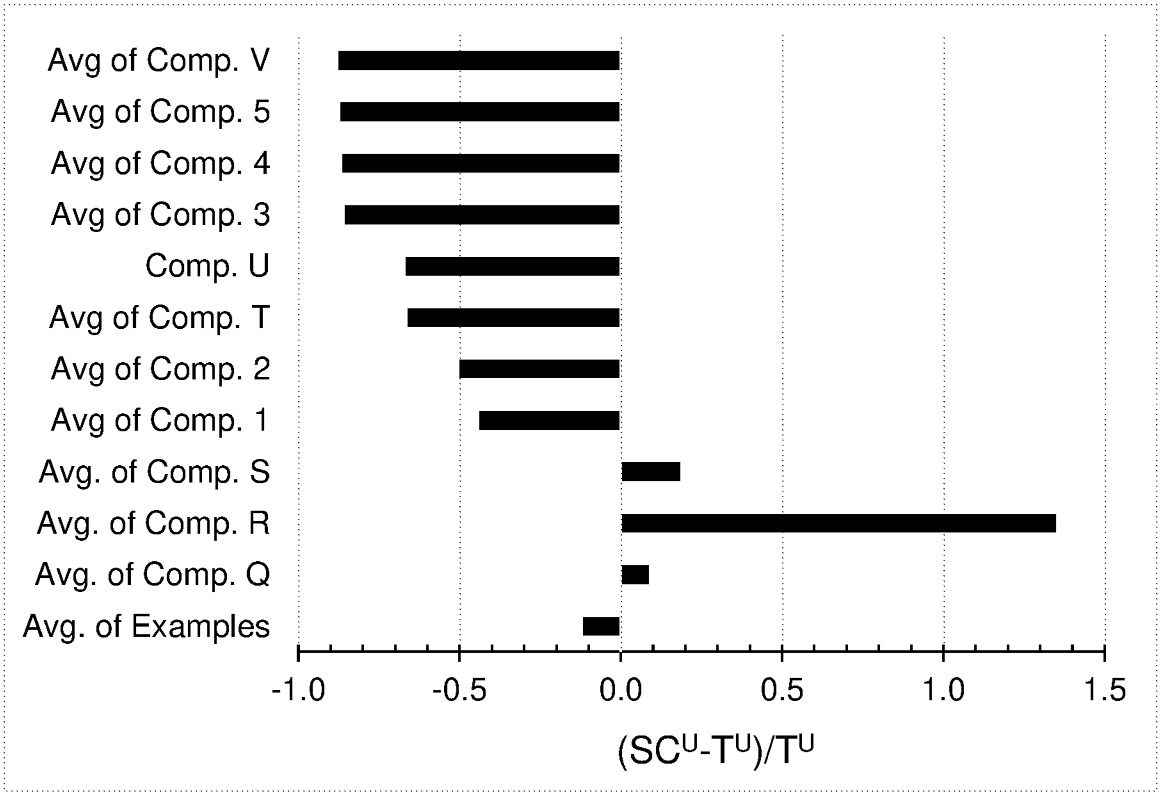
FIG. 1 compares the Unsaturation Ratio 'UR' for Examples 1-6, relative to Comparatives Q through V and 1 through 5.

Table 1 discloses the amount of Internal, Side Chain and Terminal unsaturations per 100 carbons (1000) in the Examples of this disclosure, relative to Comparatives, i.e. the amount of trans-vinylene, vinylidene and terminal vinyl groups as measured according to ASTM D3124-98 and ASTM D6248-98. Table 1 also discloses the dimensionless 'Unsaturation Ratio', 'UR', as defined by the following equation $$UR=(SC^U-T^U)/T^U \quad \text{Eq. (UR)}$$

where $SC^U$ are the side chain unsaturations and $T^U$ are the terminal unsaturations. Graphically, FIG. 1 compares the average UR values for Examples and Comparatives. Statistically, the Examples (Examples 1 through 6) have a significantly different average UR value, relative to all Comparatives. For example, the average UR value for Examples 1 through 6 was −0.116±0.087 and the average UR value for Comparative Q1 through Q4 was 0.085±0.014; these average UR values were significantly different based on a t-test assuming equal variances, i.e. the t-stat of 4.51 exceeded the two tail t-critical of 2.31 and the two tail P-value of 0.00197 was less than 0.05. Comparative Q were commercial products called QUEO® available from *Borealis*, Vienna, Austria; specifically, Comparative Q1 was QUEO 0201, Comparative Q2 was QUEO 8201, Comparative Q3 was QUEO 0203 and Comparative Q4 was QUEO 1001. QUEO products are ethylene/1-octene copolymers, believed to be produced in a solution polymerization process employing one reactor and a metallocene catalyst formulation.

Statistically, the average UR value of Examples 1 through 6 was also significantly different from Comparative R, Comparative S, Comparative T, Comparative U, Comparative V, Comparative 1, Comparative 2, Comparative 3, Comparative 4 and Comparative 5. As shown in Table 1 and FIG. 1, the average UR of Comparative R was 1.349±0.907, this was the average of 7-samples of commercial products called AFFINITY® available from The Dow Chemical Company, Midland, Michigan; specifically, AFFINITY PL1880 (3-samples), AFFINITY PF1 140, AFFINITY PF1 142 and AFFINITY PL1 881. The AFFINITY samples were ethylene/1-octene copolymers believed to be produced in a solution polymerization process employing one reactor and a single site catalyst formulation. The average UR of Comparative S was 0.1833±0.0550, i.e. an average of 5-samples of commercial products called ENABLE® available from ExxonMobil Chemical Company, Spring, Texas; specifically, ENABLE 27-03CH (3-samples) and ENABLE 20-05 (2-samples). ENABLE products were ethylene/1-hexene copolymers, believed to be produced in a gas phase process employing one reactor and a metallocene catalyst formulation. The average UR of Comparative T was −0.6600±0.1306, i.e. an average of 48-samples of commercial products called EXCEED® available from ExxonMobil Chemical Company, Spring, Texas; specifically, EXCEED 1018 (26-samples), EXCEED 1023 (4-samples), EXCEED 1015 (3-samples), EXCEED 4518 (3-samples), EXCEED 3518(4-samples), EXCEED 1012 (3-samples), EXCEED 1318CA (2-samples), EXCEED 3812, EXCEED 1023DA and EXCEED 2718CB. EXCEED products were ethylene/1-hexene copolymers believed to be produced in a gas phase process employing one reactor and a metallocene catalyst formulation. Comparative U, having a UR value of −0.667, was a commercial product called ELITE® AT 6202 available from The Dow Chemical Company, Midland, Michigan. ELITE AT 6202 was an ethylene/1-hexene copolymer, believed to be produced in a dual reactor solution process employing at least one homogeneous catalyst formulation. The average UR of Comparative V was −0.8737±0.0663, i.e. an average of 25-samples of commercial products called ELITE available from The Dow Chemical Company, Midland, Michigan; specifically, ELITE 5400 (12-samples), ELITE 5100 (4-samples), ELITE 5110 (2-samples), ELITE 5230 (2-samples), ELITE 5101 and ELITE 5500. ELITE products were ethylene/1-octene copolymers believed to be produced in a solution polymerization process employing a single site catalyst formulation in a first reactor and a batch Ziegler-Natta catalyst formulation in a second reactor. The average UR of Comparative 1 was −0.4374±0.1698, i.e. an average of 61-samples of a commercial product called SURPASS® FPs117 available from NOVA Chemicals Corporation, Calgary, Alberta. SURPASS FPs117 was an ethylene/1-octene copolymer produced in a solution polymerization process employing a single site catalyst formulation. The average UR of Comparative 2 was −0.5000±0.1000, i.e. an average of 3-samples of an experimental product manufactured by NOVA Chemicals Corporation, Calgary, Alberta. Comparative 2a, 2b and 2c were ethylene/1-octene copolymers (about 0.917 g/cc and about 1.0 $I_2$) produced in a solution polymerization process employing a bridged metallocene catalyst formulation in a first reactor and an unbridged single site catalyst formulation in a second reactor. The average UR of Comparative 3 was −0.8548±0.0427, i.e. an average of 4-samples of an experimental product manufactured by NOVA Chemicals Corporation, Calgary, Alberta. Comparative 3a, 3b, 3c and 3d were ethylene/1-octene copolymers (about 0.917 g/cc and about 1.0 $I_2$) produced in a solution polymerization process employing a bridged metallocene catalyst formulation in a first reactor and an in-line Ziegler-Natta catalyst formulation in a second reactor. The average UR of Comparative 4 was −0.8633±0.0470, i.e. an average of 21-samples of commercial products called SURPASS available from NOVA Chemicals Corporation, Calgary, Alberta; specifically, SURPASS SPs116 (6-samples), SURPASS SPsK919 (5-samples), SURPASS VPsK114 (3-samples) and SURPASS VPsK914 (7-samples) were ethylene/1-octene copolymers produced in a solution polymerization process employing a single site catalyst formulation in a first reactor and an in-line Ziegler-Natta catalyst formulation in a second reactor. The average UR of Comparative 5 was −0.8687±0.0296, i.e. an average of 137-samples of a commercial product called SCLAIR® FP120 available from NOVA Chemicals Corporation, Calgary, Alberta. FP120 was an ethylene/1-octene copolymer produced in a solution polymerization process employing an in-line Ziegler-Natta catalyst formulation.

As evidenced by FIG. 1 and Table 1, the UR values of Comparatives 3 to 5 and Comparative V are not significantly different (the UR values ranged from −0.8548 to −0.8737) this is believed to reflect the fact that a Ziegler-Natta catalyst was employed to manufacture at least a portion of these copolymers.

In this disclosure, the bridged metallocene catalyst formulation produced ethylene interpolymer products having long chain branches, hereinafter 'LCB'. LCB is a structural feature in polyethylenes that is well known to those of ordinary skill in the art.

Architectural parameters such as molecular weight (MW), molecular weight distribution (MWD) and long chain branching (LCB) have a profound impact on melt processing behavior of polymeric materials. Melt-state rheological response can be used as strong tool for characterizing these architectural features. In this context, melt rheology can either supplement or in many cases replace existing (ultra-) dilute solution spectroscopic and chromatographic techniques. It is well known that linear viscoelastic (LVE) rheological data can provide several limiting material functions capable of detecting long-chain branched species based on appearance of new relaxation modes due to interruption of reptation motion by deep arm retraction (Science, 2011, 333, pp 1871-1874). These LVE-based parameters can detect LCB at levels far below the detection limits of analytical methods such as solution viscometry, size-exclusion chromatography and NMR spectrometry. However, it has been long well known that linear viscoelastic measures, while strongly related to structural features, have restricted capabilities to resolve very low content of branched species from linear chains if polydispersity effects are involved (Journal of Molecular Structure, 1999, 485, pp 569-583).

In contrast to linear measures, oscillatory shear nonlinear viscoelasticity parameters maintain their sensitivity to very small number of branching sites along the polymer chain despite the screening effect of polydispersity (see e.g. Journal of Rheology 2003, 47, pp. 717-736). In fact, the presence of long side branches is proven to intensify the elastic energy carried by the entanglement network and change the disentanglement kinetics under and external flow-field which could be detected using nonlinear rheology and by application of a strong oscillatory shear flow.

This disclosure outlines a very sensitive intracycle nonlinear viscoelasticity parameter capable of detecting and quantifying LCB species in ethylene/alpha-olefin interpolymers. By establishing a scaling function to compensate the effect of MW and breadth of MWD, subtle differences in the kinetics of entanglements dissociation induced by LCB presence were detected.

In this context, this disclosure employs the strain-dependence of intracycle shear-thickening behavior, referred to as 'intracycle nonlinear function', or 'INF' hereafter, to determine presence of LCB structures in ethylene interpolymers according to the following steps. In the first step, a sample of an ethylene interpolymer in melt-state is subjected to an oscillating strain-wave at a fixed angular frequency and temperature with a step-wise increasing strain-amplitude from a lower limit strain-amplitude to an upper limit strain-amplitude to obtain a stress-wave response and corresponding viscous Lissajous-Bowditch loop (i.e. stress versus strain-rate loops) at each strain-amplitude level. In the second step, the Intracycle nonlinear function, INF, is determined experimentally using the instantaneous dynamic viscosities at maximum strain-rate ($\eta'_L$) and at minimum strain-rate ($\eta'_M$) in the viscous Lissajous-Bowditch loop at each strain-amplitude level using $$INF = \frac{\eta'_L - \eta'_M}{\eta'_L}$$

(INF is dimensionless) by a rheology data processing software (e.g. Anton Paar RheoCompass). Further, in the third step, the INF obtained for the ethylene interpolymer product of interest is compared with a reference INF predicted for a linear (non-long-chain branched) ethylene interpolymer product having a polydispersity equivalent to the said ethylene interpolymer product. Polydispersity of a given ethylene interpolymer product can be characterized using any combination of moments of molecular weight distribution, i.e. number-average molecular weight, weight-average molecular weight, z-average molecular weight, (z+1)-average molecular weight, etc. In an embodiment of this invention, the ratio of z-average molecular weight divided by weight-average molecular weight was preferably used as a measure of polydispersity. In the fourth step, presence of LCB in the ethylene interpolymer product of interest is detected according to a positive deviation from the predicted reference INF.

The instantaneous dynamic viscosities at maximum strain-rate ($\eta'_L$) and at minimum strain-rate ($\eta'_M$) in a viscous Lissajous-Bowditch loop at a certain strain-amplitude level can be obtained by the stress decomposition method introduced in Journal of rheology 2005, 49, pp 747-758 and by fitting the Chebyshev polynomials of the first kind to the viscous stress response of tested linear or long-chain branched ethylene interpolymers as described in Journal of Rheology 2008, 52, pp 1427-1458. In the insets in FIGS. 3 and 4, the obtained instantaneous dynamic viscosities at maximum strain-rate ($\eta'_L$) and at minimum strain-rate ($\eta'_M$) are visualized as the slope of a secant line crossing the viscous Lissajous-Bowditch loop at the maximum strain-rate and the slope of a tangent line touching the viscous Lissajous-Bowditch loop at a strain-rate of zero for Comparative example 5a and Inventive example 1, respectively. INF is a material function that is initially zero (within the linear regime) and then changes its sign to positive (intracycle shear-thickening) and/or negative values (intracycle shear-thinning) as strain amplitude increases and a nonlinear response emerges. A dimensionless scaling function, similar to Journal of Rheology 2010, 54, pp 27-63, can be defined as $\zeta=\gamma_0 \cos \delta_{\alpha_M\omega}$ where $\gamma_0$ is the imposed strain-amplitude and $\delta_{\alpha_M\omega}$ is the phase-angle at a frequency of $\alpha_M\omega$=0.1 rad/s, wherein $\alpha_M$ is the time-molecular weight superposition shift factor described below (see FIG. 2), was further applied to remove the effect of linear viscoelasticity and molecular weight.

Figure 2:
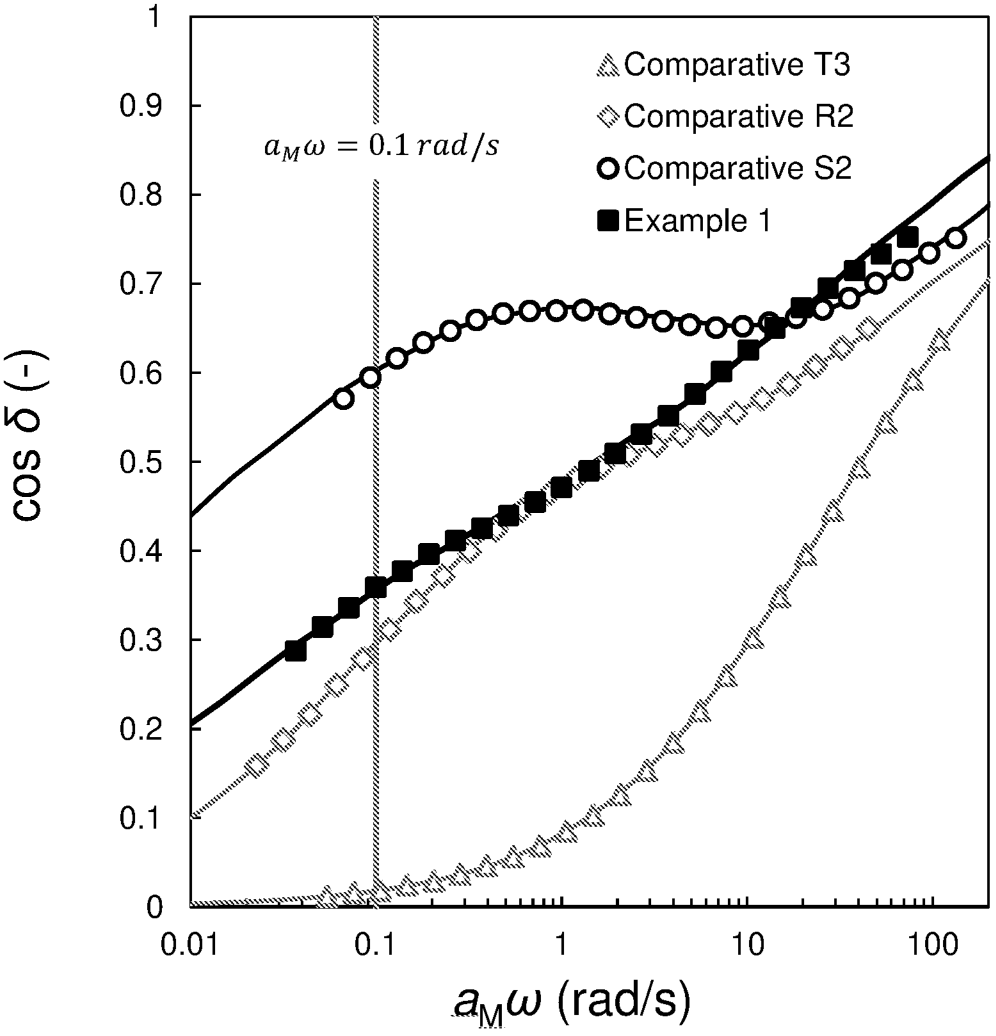
FIG. 2 displays cosine of phase angle cos δ as a function of weighted frequency $\alpha_M\omega$ for Example 1 and comparatives T3, R2 and S2. Solid lines depict the best fits obtained using a 33-mode generalized Maxwell model which were used for interpolating the linear rheology parameter cos $\delta_{\alpha_M\omega}$ at $\alpha_M\omega=0.1$ rad/s.
Figure 3:
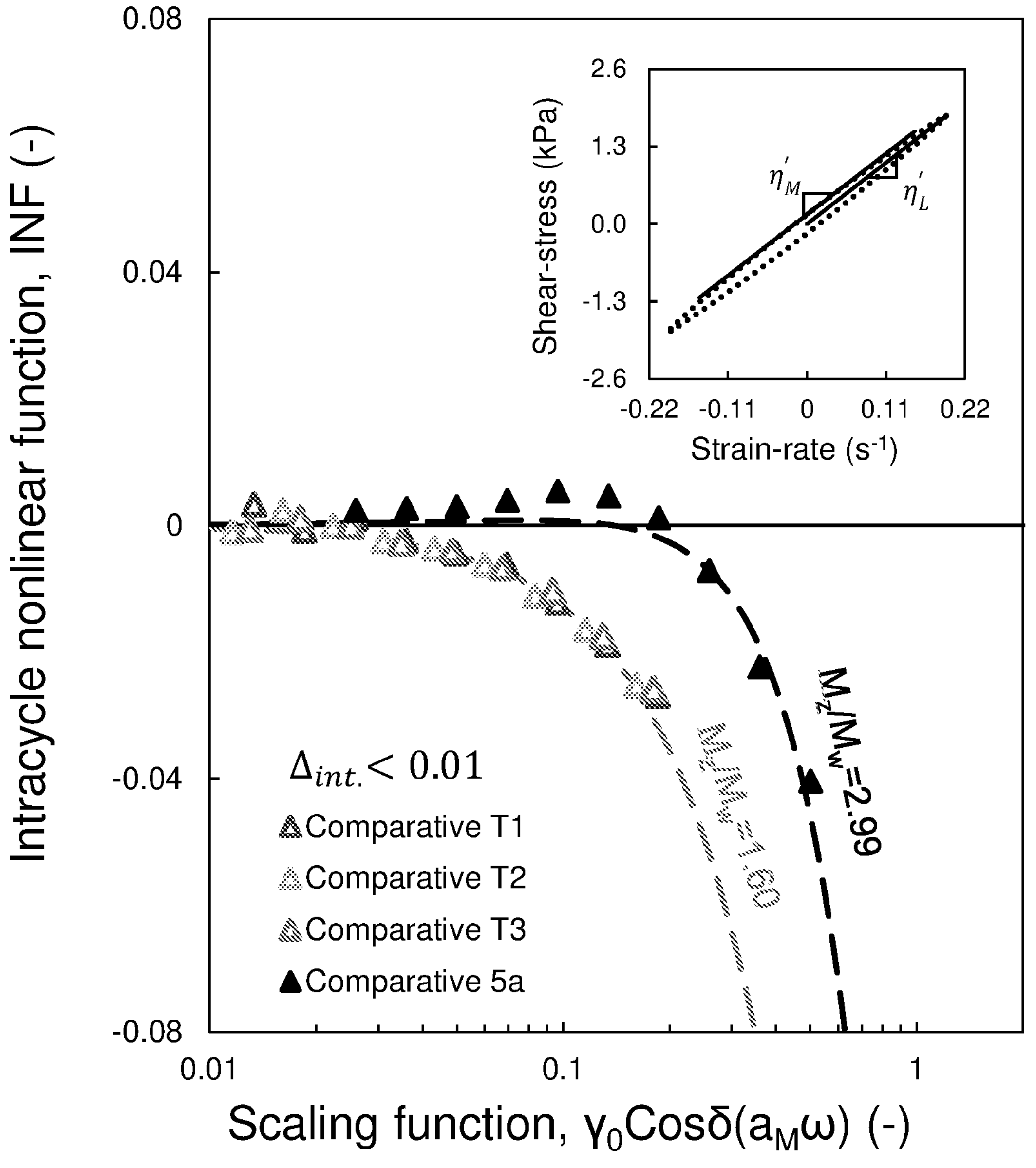
FIG. 3 presents a graphical representation of the dimensionless nonlinear rheology integrated network parameter, $\Delta_{int.}$ for linear ethylene interpolymers; specifically, comparatives T1 through T3 and 5a. The dashed lines are the predicted response of linear ethylene interpolymers having polydispersities equivalent to the comparative sample. For these linear interpolymers, the network parameter $\Delta_{int.}$ is less than 0.01. In the inset, the dotted loop shows the viscous Lissajous-Bowditch of Comparative example 5a at a strain-amplitude of 193% or a $\gamma_0$ cos $\delta_{\alpha_M\omega}$ of 0.17. The straight lines visualize the obtained instantaneous dynamic viscosities at maximum strain-rate ($\eta'_L$) and at minimum strain-rate ($\eta'_M$) as the slope of a secant line crossing the viscous Lissajous-Bowditch loop at the maximum strain-rate and the slope of a tangent line touching the viscous Lissajous-Bowditch loop at a strain-rate of zero.

In this disclosure, the INF values of linear ethylene interpolymers were obtained at 190° C. by applying a sinusoidal strain-wave at an angular frequency of 0.1 rad/s over a strain amplitude range of 1-103%. The raw waveforms and viscous Lissajous-Bowditch loops were analyzed using RheoCompass 1.17 software. As shown in FIG. 3, the INF of these linear ethylene interpolymers were observed to follow (Eq. 1) below (INF is dimensionless):

$$INF^{lin} = -K\zeta^{1.45}(\zeta^{a^*} - C^*);\ \zeta = \gamma_0 \cos\delta_{a_M\omega} \qquad \text{(Eq. 1)}$$

in which K is a constant equal 0.3722, $\gamma_0$ is the imposed strain amplitude, $\alpha_M$ is the time-molecular weight superposition shift factor defined as $$\left(\frac{M_w}{M_{ref}}\right)^{3.41}$$

where $M_W$ is the SEC weight-average molecular weight and $M_{ref}$ is a reference molecular weight of $10^5$ g/mol. In Eq. 1, $\delta_{\alpha_M\omega}$ is the phase-angle at a frequency of $\alpha_M\omega$=0.1 rad/s. FIG. 2 schematically displays the procedure used for interpolating the cosine of phase angle at a weighted frequency of $\alpha_M\omega$=0.1 rad/s for non-limiting examples of Example 1 and Comparatives T3, $R_2$ and S2 using a 33-mode generalized Maxwell model (see Li et al. ANTEC 2014). It should be added that $\delta_{\alpha_M\omega}$ values larger than 88.5° were not used for these calculations and were replaced by the largest phase angle measured within a frequency range of 0.05-100 rad/s. Parameters $\alpha$*and C* in Eq. 1 were defined as a function of the SEC-determined weight-average molecular weight $M_W$ and z-average molecular weight $M_z$ as follows:

$$a* = f\left(\frac{M_z}{M_w}\right) = \begin{cases} 0 & \frac{M_z}{M_w} \le 1.64 \\ 0.8645\left(\frac{M_z}{M_w} - 1.5\right) - 0.1198 & 1.64 < \frac{M_z}{M_w} < 2.21 \\ 0.5938\left(\frac{M_z}{M_w} - 1.5\right)^2 - & \frac{M_z}{M_w} < 2.21 \\ 1.1803\left(\frac{M_z}{M_w} - 1.5\right) + 1.0455 & \end{cases} \qquad \text{(Eq. 2)}$$

$$C* = g\left(\frac{M_z}{M_w}\right) = \begin{cases} 0 & \frac{M_z}{M_w} < 2.21 \\ 0.5944\ln\left(\frac{M_z}{M_w} - 1.5\right) + 0.2057 & \frac{M_z}{M_w} \ge 2.21 \end{cases} \qquad \text{(Eq. 3)}$$

Figure 4:
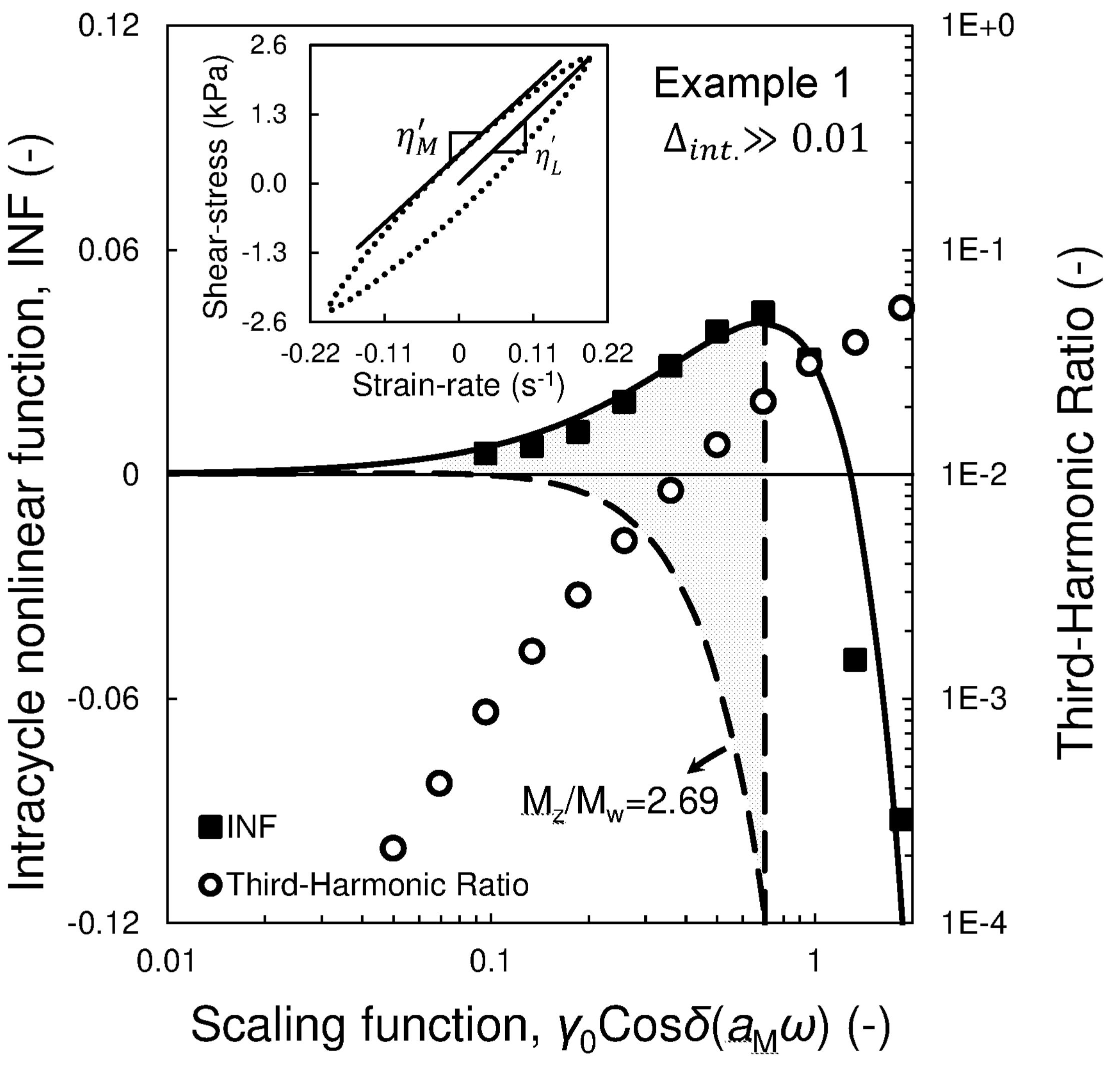
FIG. 4 presents a graphical representation of the dimensionless nonlinear rheology integrated network parameter, $\Delta_{int.}$ for Example 1. The solid line is the best fit obtained using the equation $INF=-K\zeta^{1.45}(\zeta^{\alpha}-C)$ to the data points with a third-harmonic ratio $I_{3/1}$ of at least 0.1%. The dashed line is the predicted response of a linear ethylene interpolymer with an identical polydispersity. As can be seen, the network parameter $\Delta_{int.}$ is positive and significantly larger than 0.01. In the inset, the dotted loop shows the viscous Lissajous-Bowditch of Inventive example 1 at a strain-amplitude of 193% or a $\gamma_0$ cos $\delta_{\alpha_M\omega}$, of 0.69. The straight lines visualize the obtained instantaneous dynamic viscosities at maximum strain-rate ($\eta'_L$) and at minimum strain-rate ($\eta'_M$) as the slope of a secant line crossing the viscous Lissajous-Bowditch loop at the maximum strain-rate and the slope of a tangent line touching the viscous Lissajous-Bowditch loop at a strain-rate of zero.

Similarly, the measured INF values of LCB ethylene interpolymers measured at 190° C. at an angular frequency of 0.1 rad/s over a strain amplitude range of 1-$10^3$%, as shown by the solid line in FIG. 4, can be described using the following formula (INF is dimensionless):

$$INF = -K\zeta^{1.45}(\zeta^a - C);\ \zeta = \gamma_0 \cos\delta_{a_M\omega} \qquad \text{(Eq. 4)}$$

in which K is a constant equal 0.3722 and $\gamma_0$, $\alpha_M$ and $\delta_{\alpha_M\omega}$, parameters have the same definition as in Eq. 1. Parameters a and C in Eq. 4 were used as fitted constants by minimizing sum of squared residuals for data point with at least 0.1% nonlinearity (i.e. a third-order harmonic ratio $I_3/1$ of 0.001) to describe different experimental intracycle viscous nonlinear behaviors ranging from an intracycle shear-thinning (INF<0) behavior to an intracycle shear-thickening behavior (INF>0).

Based on the above formulations, one can define a parameter purely reflecting the impact of branching content on the intracycle nonlinear function, INF; specifically, a 'network parameter', $\Delta_{int.}$, can be formulated based on the integrated area between the measured INF and $INF^{lin}$ over an $\zeta$ interval of 0.01 to 0.7 as follows:

$$\Delta_{int.} = \int_{0.01}^{0.7}\left[INF - INF^{lin}\right]d\zeta = \left[\frac{-K}{a+2.45}\zeta^{a+2.45} + \frac{KC}{2.45}\zeta^{2.45} + \frac{K}{a+2.45}\zeta^{a*+2.45} - \frac{KC^*}{2.45}\zeta^{2.45}\right]_{0.01}^{0.7} \qquad \text{(Eq. 5)}$$

In fact, the presence of long side branches delays the breakdown of the entanglement network under a strong oscillatory shear-field which could be detected using the nonlinear rheology network parameter, $\Delta_{int.}$, described above in Eq. 5. The network parameter, $\Delta_{int.}$, has high sensitivity to the presence of long chain branched species in ethylene interpolymer products. A graphical representation of the intracycle nonlinear function, INF, and the network parameter, $\Delta_{int.}$, are shown in FIGS. 3 and 4. In Table 2, the molecular features as well as the network parameters of the disclosed ethylene interpolymer products, as well as comparative examples are tabulated.

Comparative examples T1, T2 and T3 were commercially available 1-hexene/ethylene interpolymers, specifically EXCEED® 1018CA, EXCEED 1012HA, EXCEED 1015HA from ExxonMobil Chemical Company, Spring, Texas.

Comparative 5a, Comparative 1a, Comparative 4 and Comparative 6 were commercial 1-octene/ethylene copolymers from NOVA Chemicals Corporation, specifically SCLAIR® FP120-A, SURPASS FPs117, SURPASS SPs116 and SURPASS FPs016 from NOVA Chemicals Corporation. Comparative Resin 34 was a commercial ethylene homopolymer from NOVA Chemicals Corporation under the commercial code name of SURPASS HPs167.

The linear Comparatives T1, T2, T3, 1a, 4, 5a, 6 and Resin 34 were commercial single reactor or dual reactor resins produced in solution or gas phase processes with Ziegler-Natta, homogeneous and mixed (Ziegler-Natta+ homogeneous) catalyst formulations and had an $M_z/M_w$ from about 1.5 to about 3.5.

These linear ethylene interpolymers/homopolymers had no or undetectable levels of LCB species, i.e. a network parameter $\Delta_{int.}$ less than 0.01. The solid lines coplotted with the experimental data points in FIG. 3 are predicted trends according to the Eq. 1-3. As can be seen, a good agreement between the predicted trend and measured intracycle nonlinear function values, INF, of these linear interpolymers (e.g. non-limiting Comparatives T1, T2, T3 and 5a shown in FIG. 3) were observed indicating the fact that the presented scaling functions in Eq. 1 to 3 can sufficiently describe the effect of $M_w$ and MWD in the case of linear ethylene interpolymers.

Long chain branched ethylene interpolymers of Examples 1 and 2 were ethylene interpolymer products produced using a bridged metallocene catalyst formulation in a first and a second solution polymerization reactors. Detailed synthesis conditions for the Example 1 and 2 can be found in Tables 4A and 4B. Comparative 3a contains LCB and was produced in the solution pilot plant using a bridged metallocene catalyst formulation in the first reactor and an in-line Ziegler-Natta catalyst formulation in the second reactor. Example 8 contain LCB and was produced in the solution pilot plant employing a bridged metallocene catalyst formulation in the first reactor and an unbridged metallocene catalyst formulation in the second reactor.

Example 1 and 2, as summarized in Table 2, showed a network parameter of 0.0427 and 0.0468. Similarly, Example 8 and Comparative 3a had network parameters significantly greater than 0.01 which is indicative of the presence of LCB points in the microstructure of these compositions; specifically, as tabulated in Table 2, they had network parameter values of 0.0545 and 0.0637, respectively. The $\zeta$ dependence of the INF of Examples 1, 2, 8 and Comparative 3a deviate from the predicted trend based on the Eq. 1-3 due to the presence of long-chain branched macromolecules. The intracycle nonlinear function, INF, of the long-chain branched ethylene interpolymers in Examples 1, 2, 8 and Comparative 3a initially showed a zero INF value (linear regime) and then exhibited a sign change to a positive INF value as a nonlinear response developed (e.g. see FIG. 4). Noticeably, a positive maximum was evident for these resins. At larger strain amplitudes the INF values change sign to negative values.

Comparatives R1, R2 and R3 were commercial products called AFFINITY® PL1880G, AFFINITY PL1840G and AFFINITY 1845 available from The Dow Chemical Company, Midland Michigan. Comparative S1, S2, S3 and S4 were commercial products called ENABLE® available from ExxonMobil Chemical Company, Spring Texas; specifically ENABLE 20-05HH, ENABLE 27-03, Enable 35-05CH and ENABLE 23-05. Comparatives Q1 through Q4 were commercial products called QUEO® available from Borealis, Vienna, Austria; specifically Comparative Q1 was QUEO 0201, Comparative Q2 was QUEO 8201, Comparative Q3 was QUEO 0203 and Comparative Q4 was QUEO 1001. Comparatives V2a, V3 and V4 were commercial products coded ELITE® 5100G, ELITE 5500G and ELITE 5400G available from the Dow Chemical Company, Midland, Michigan. Comparative U1 was a commercial product coded ELITE AT 6202 available from the Dow Chemical Company, Midland, Michigan. As shown in Table 2 Comparatives S1 through S4 contained LCB, having network parameter values of 0.0755, 0.0785, 0.0751 and 0.0701, respectively. Table 2 further discloses that Comparative U1 contains detectable amounts of LCB, i.e. a network parameter value of 0.0591 which is significantly greater than 0.01. Similarly, as summarized in Table 2, the Comparatives V2a, V3 and V4 comprise long-chain branched species as network parameter values of 0.0435, 0.0260 and 0.0517 were observed for these samples. Given Table 2, it was evident that Comparative Q1, Q2, Q3 and Q4 contained long-chain branching, i.e. network parameter values of 0.0648, 0.0629, 0.0501 and 0.0617, respectively. As can be found in Table 2, Comparatives $R_1$, $R_2$ and $R_3$ had network parameter values of 0.0648, 0.0711 and 0.0573.

The $\zeta$ dependence of the INF of Comparatives S1 through S4 and R1 and $R_2$ and Comparatives Q1, Q2 and Q4 and Comparatives V2a, V3, V4 and U1 deviate from the predicted trend based on the Eq. 1-3 due to the presence of long-chain branched macromolecules. The intracycle nonlinear function, INF, of the long-chain branched ethylene interpolymers in these Comparatives initially showed a zero INF value (linear regime) and then exhibited a sign change to a positive INF value as a nonlinear response developed. Noticeably, a positive maximum was evident for these resins. At larger strain amplitudes the INF values change sign to negative values as the polymer melt entered a highly nonlinear regime. Comparatives Q3 and R3 initially displayed a zero INF value (linear regime) and then exhibited a sign change to negative INF values as a nonlinear response developed. Noticeably, no positive maximum was evident for these resins. These lower molecular weight Comparatives had detectable amounts of LCB and showed a departure from the predicted base-line trend for linear counterparts as described in Eq. 1-3.

In this disclosure the network parameter, $\Delta_{int.}$, was used to characterize the LCB content in ethylene interpolymer products. The variation of the network parameter, $\Delta_{int.}$, when plotted against a normalized molecular weight, was an essential feature to differentiate the ethylene interpolymer products, disclosed herein, from comparative polyethylenes. In this context, one can plot the network parameter, $\Delta_{int.}$, as a function of a normalized molecular weight $Z=M_w/M_e$ in which $M_W$ was the weight average molecular weight and $M_e$ was the molecular weigh between entanglements. For calculating $M_e$ the equation with a power-law-like dependence on molecular weight per backbone bond $m_b$ proposed by Feters et al. (Macromolecules, 1994, 27, pp 4639-4647) was used for $m_b$s between 14 to 28 g/mol:

$$M_e = \frac{4}{5}\frac{\rho RTm_b^{3.49}}{24820} \quad \text{(Eq. 6)}$$

in which $m_b$ was the molecular weight per backbone bond. As can be seen $m_b$ was a function of comonomer type and content. The parameter T was the absolute temperature at which $\Delta_{int}$ was measured, ρ was the melt-state density at the temperature $\Delta_{int.}$ was measured (i.e. 0.780 g/cm$^3$ at 190° C., or 463.15 Kelvin) and R was the universal gas constant with a value of 8.314 J/(mol.Kelvn). The molecular weight per backbone bond $m_b$ was calculated in units of g/mol as defined by Chen et al. in J. Rheol. 2010, 54, pp 393-406 as follows:

$$m_b = \frac{n_c M_{w/c} + 28(1 - n_c)}{2} \quad \text{(Eq. 7)}$$

where $n_c$ is the comonomer content in mole fraction determined by Fourier transform infrared (FTIR) spectroscopy according to ASTM D6645-01 (2001) and $M_{w/c}$ is the molecular weight of the comonomer (e.g. 112.22 g/mol for 1-octene).

Figure 5:
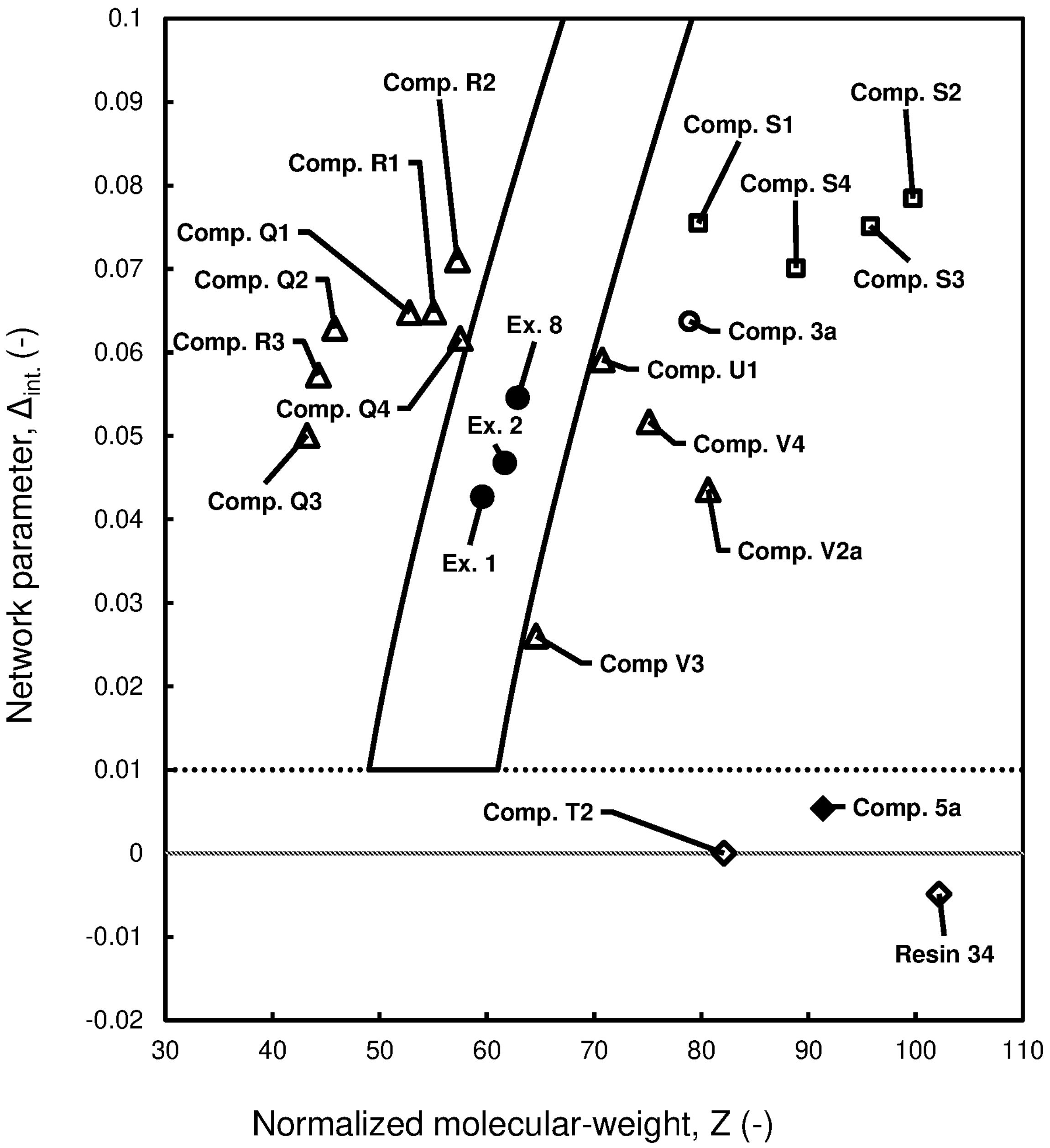
FIG. 5 Compares the dimensionless nonlinear rheology integrated network parameter $\Delta_{int.}$ of Examples 1, 2 and 8 with Comparatives 5a, 3a, R1 through R3, Q1 through Q4, S1 through S4, T2, V2a, V3, V4, U1 and Resin 34 as a function of normalized molecular weight $$Z = \frac{M_w}{M_e}.$$

The $\Delta_{int.}$–Z plot shown in FIG. 5 differentiates Examples 1, 2 and 8 from long chain branched Comparatives $R_1$ through $R_3$, Q1 through Q4, S1 through S4, V2a, V3, V4, U1 and 3a, and linear Comparatives 5a, T2 and Resin 34, using a polydispersity and molecular-weight independent 'network parameter', $\Delta_{int.}$, characterized by the following inequalities defined in Eq. 8 and Eq. 9;

$$0.01 \times (Z - 48)^{0.78} \leq \Delta_{int.} \leq 0.01 \times (Z - 60)^{0.78} \quad \text{(Eq. 8)}$$

$$\Delta_{int.} \geq 0.01 \quad \text{(Eq. 9)}$$

again, Z was the normalized molecular weight $$\left(Z = \frac{M_w}{M_e}\right).$$

As shown in FIG. 5, the network parameter $\Delta_{int.}$ of all the linear Comparatives ranges within values less than 0.01, i.e. Comparatives 5a, T2 and Resin 34. The range specified by equations 7 and 8 encompasses single/multi-component ethylene interpolymer compositions made by different combinations of the unbridged and bridged metallocene catalyst formulations with an intermediate Z-value (e.g. 58≤Z≤68 at $\Delta_{int.}$ of 0.0506) containing LCB structures in levels leading to an intracycle shear-thickening nonlinear behavior with a $\Delta_{int.}$ satisfying Eq. 8 and 9. In fact, Eq. 8 and 9, specifically within a Z range of 58 to 68, characterize architectures with LCB contents in amounts sufficient to intensify elasticity-related properties (e.g. melt-strength, homogeneous deformation under extension, etc.) while maintaining a relatively fast self-diffusion rate. These characteristics enable resin compositions appropriate for processes such as film-blowing with high throughputs during extrusion, stable deformation under extensional action (e.g. film-blowing, thermoforming, etc.) and fast interphase formation during heat-sealing process.

Solution Polymerization Process

Embodiments of the continuous solution polymerization process are shown in FIGS. 6 and 7. FIGS. 6 and 7 are not to be construed as limiting, it being understood, that embodiments are not limited to the precise arrangement of, or number of, vessels shown. In brief, FIG. 6 illustrates one continuously stirred tank reactor (CSTR) followed by an optional tubular reactor and FIG. 7 illustrates two CSTRs followed by an optional tubular reactor. The dotted lines in FIGS. 6 and 7 illustrate optional features of the continuous polymerization process. In this disclosure, equivalent terms for tubular reactor 117 shown in FIG. 7, were the 'third reactor' or 'R3'; optionally a third ethylene interpolymer was produced in this reactor. Turning to FIG. 6 that has one CSTR, the terms third reactor or R3 were also used to describe tubular reactor 17; wherein a third ethylene interpolymer was optionally produced.

In FIG. 6 process solvent 1, ethylene 2 and optional α-olefin 3 are combined to produce reactor feed stream RF1 which flows into reactor 11*a*. It is not particularly important that combined reactor feed stream RF1 be formed, i.e. reactor feed streams can be combined in all possible combinations, including an embodiment where streams 1 through 3 are independently injected into reactor 11*a*. Optionally hydrogen may be injected into reactor 11*a* through stream 4; hydrogen is generally added to control the molecular weight of the first ethylene interpolymer produced in reactor 11*a*. Reactor 11*a* is continuously stirred by stirring assembly 11*b* which includes a motor external to the reactor and an agitator within the reactor.

A bridged metallocene catalyst formulation is injected into reactor 11*a* via stream 5*e*. Catalyst component streams 5*d*, 5*c*, 5*b* and optional 5*a* refer to the ionic activator (Component B), the bulky ligand-metal complex (Component A), the alumoxane co-catalyst (Component M) and optional hindered phenol (Component P), respectively. The catalyst component streams can be arranged in all possible configurations, including an embodiment where streams 5*a* through 5*d* are independently injected into reactor 11*a*. Each catalyst component is dissolved in a catalyst component solvent. Catalyst component solvents, for Components A, B, M and P may be the same or different. Catalyst component solvents are selected such that the combination of catalyst components does not produce a precipitate in any process stream; for example, precipitation of a catalyst component in stream 5*e*. In this disclosure, the term 'first homogeneous catalyst assembly' refers the combination of streams 5*a* through 5*e*, flow controllers and tanks (not shown in FIG. 6) that functions to deliver the bridged metallocene catalyst formulation to the first reactor 11*a*. The optimization of the bridged metallocene catalyst formulation is described below.

Reactor 11*a* produces a first exit stream, stream 11*c*, containing the first ethylene interpolymer dissolved in process solvent, as well as unreacted ethylene, unreacted α-olefins (if present), unreacted hydrogen (if present), active catalyst, deactivated catalyst, residual catalyst components and other impurities (if present).

Optionally the first exit stream, stream 11*c*, is deactivated by adding a catalyst deactivator A from catalyst deactivator tank 18A forming a deactivated solution A, stream 12*e*; in this case, FIG. 6 defaults to a single reactor solution process. If a catalyst deactivator is not added, stream 11*c* enters tubular reactor reactor 17. Catalyst deactivator A is discussed below.

The term "tubular reactor" is meant to convey its conventional meaning, namely a simple tube; wherein the length/diameter (L/D) ratio is at least 10/1. Optionally, one or more of the following reactor feed streams may be injected into tubular reactor 17; process solvent 13, ethylene 14 and α-olefin 15. As shown in FIG. 6, streams 13, 14 and 15 may be combined forming reactor feed stream RF3 and the latter is injected into reactor 17. It is not particularly important that stream RF3 be formed, i.e. reactor feed streams can be combined in all possible combinations. Optionally hydrogen may be injected into reactor 17 through stream 16. Optionally, a homogeneous or a heterogeneous catalyst formulation may be injected into reactor 17. Non-limiting examples of a homogeneous catalyst formulation includes a bridged metallocene catalyst formulation, an unbridged single site catalyst formulation, or a homogeneous catalyst formulation where the bulky ligand-metal complex is not a member of the genera defined by Formula (I) or Formula (II). Stream 40 in FIG. 6 represents the output from a 'second homogeneous catalyst assembly'. One embodiment of the second homogeneous catalyst assembly is similar to the first homogeneous catalyst assembly described above, i.e. having similar streams, flow controllers and vessels.

In FIG. 6, streams 34*a* through 34*h* represent a 'heterogeneous catalyst assembly'. In one embodiment an in-line Ziegler-Natta catalyst formulation is produced in the heterogeneous catalyst assembly. The components that comprise the in-line Ziegler-Natta catalyst formulation are introduced through streams 34*a*, 34*b*, 34*c* and 34*d*. Stream 34*a* contains a blend of an aluminum alkyl and a magnesium compound, stream 34*b* contains a chloride compound, stream 34*c* contains a metal compound and stream 34*d* contains an alkyl aluminum co-catalyst. An efficient in-line Ziegler-Natta catalyst formulation if formed by optimizing the following molar ratios: (aluminum alkyl)/(magnesium compound) or (ix)/(v); (chloride compound)/(magnesium compound) or (vi)/(v); (alkyl aluminum co-catalyst)/(metal compound) or (viii)/(vii); and (aluminum alkyl)/(metal compound) or (ix)/(vii); as well as the time these compounds have to react and equilibrate.

Stream 34*a* contains a binary blend of a magnesium compound, component (v) and an aluminum alkyl, component (ix), in process solvent. The upper limit on the (aluminum alkyl)/(magnesium compound) molar ratio in stream 10*a* may be 70, in some cases 50 and is other cases 30. The lower limit on the (aluminum alkyl)/(magnesium compound) molar ratio may be 3.0, in some cases 5.0 and in other cases 10. Stream 34*b* contains a solution of a chloride compound, component (vi), in process solvent. Stream 34*b* is combined with stream 34*a* and the intermixing of streams 34*a* and 34*b* produces a magnesium chloride catalyst support. To produce an efficient in-line Ziegler-Natta catalyst (efficient in olefin polymerization), the (chloride compound)/(magnesium compound) molar ratio is optimized. The upper limit on the (chloride compound)/(magnesium compound) molar ratio may be 4, in some cases 3.5 and is other cases 3.0. The lower limit on the (chloride compound)/(magnesium compound) molar ratio may be 1.0, in some cases 1.5 and in other cases 1.9. The time between the addition of the chloride compound and the addition of the metal compound (component (vii)) via stream 34*c* is controlled; hereafter HUT-1 (the first Hold-Up-Time). HUT-1 is the time for streams 34*a* and 34*b* to equilibrate and form a magnesium chloride support. The upper limit on HUT-1 may be 70 seconds, in some cases 60 seconds and is other cases 50 seconds. The lower limit on HUT-1 may be 5 seconds, in some cases 10 seconds and in other cases 20 seconds. HUT-1 is controlled by adjusting the length of the conduit between stream 34*b* injection port and stream 34*c* injection port, as well as controlling the flow rates of streams 34*a* and 34*b*. The time between the addition of component (vii) and the addition of the alkyl aluminum co-catalyst, component (viii), via stream 34*d* is controlled; hereafter HUT-2 (the second Hold-Up-Time). HUT-2 is the time for the magnesium chloride support and stream 34*c* to react and equilibrate. The upper limit on HUT-2 may be 50 seconds, in some cases, 35 seconds and is other cases 25 seconds. The lower limit on HUT-2 may be 2 seconds, in some cases 6 seconds and in other cases 10 seconds. HUT-2 is controlled by adjusting the length of the conduit between stream 34*c* injection port and stream 34*d* injection port, as well as controlling the flow rates of streams 34*a*, 34*b* and 34*c*. The quantity of the alkyl aluminum co-catalyst added is optimized to produce an efficient catalyst; this is accomplished by adjusting the (alkyl aluminum co-catalyst)/(metal compound) molar ratio, or (viii)/(vii) molar ratio. The upper limit on the (alkyl aluminum co-catalyst)/(metal compound) molar ratio may be 10, in some cases 7.5 and is other cases 6.0. The lower limit on the (alkyl aluminum co-catalyst)/(metal compound) molar ratio may be 0, in some cases 1.0 and in other cases 2.0. In addition, the time between the addition of the alkyl aluminum co-catalyst and the injection of the in-line Ziegler-Natta catalyst formulation into reactor 17 is controlled; hereafter HUT-3 (the third Hold-Up-Time). HUT-3 is the time for stream 34*d* to intermix and equilibrate to form the in-line Ziegler Natta catalyst formulation. The upper limit on HUT-3 may be 15 seconds, in some cases 10 seconds and is other cases 8 seconds. The lower limit on HUT-3 may be 0.5 seconds, in some cases 1 seconds and in other cases 2 seconds. HUT-3 is controlled by adjusting the length of the conduit between stream 34*d* injection port and the catalyst injection port in reactor 17, and by controlling the flow rates of streams 34*a* through 34*d*. As shown in FIG. 6, optionally, 100% of stream 34*d*, the alkyl aluminum co-catalyst, may be injected directly into reactor 17 via stream 34*h*. Optionally, a portion of stream 34*d* may be injected directly into reactor 17 via stream 34*h* and the remaining portion of stream 34*d* injected into reactor 17 via stream 34*f*.

The quantity of in-line heterogeneous catalyst formulation added to reactor 17 is expressed as the parts-per-million (ppm) of metal compound (component (vii)) in the reactor solution, hereafter "R3 (vii) (ppm)". The upper limit on R3 (vii) (ppm) may be 10 ppm, in some cases 8 ppm and in other cases 6 ppm. The lower limit on R3 (vii) (ppm) in some cases may be 0.5 ppm, in other cases 1 ppm and in still other cases 2 ppm. The (aluminum alkyl)/(metal compound) molar ratio in reactor 17, or the (ix)/(vii) molar ratio, is also controlled. The upper limit on the (aluminum alkyl)/(metal compound) molar ratio in the reactor may be 2, in some cases 1.5 and is other cases 1.0. The lower limit on the (aluminum alkyl)/(metal compound) molar ratio may be 0.05, in some cases 0.075 and in other cases 0.1.

Any combination of the streams employed to prepare and deliver the in-line Ziegler-Natta catalyst formulation to reactor 17 may be heated or cooled, i.e. streams 34*a* through 34*h*; in some cases the upper temperature limit of streams 34*a* through 34*h* may be 90° C., in other cases 80° C. and in still other cases 70° C. and; in some cases the lower temperature limit may be 20° C.; in other cases 35° C. and in still other cases 50° C.

In reactor 17 a third ethylene interpolymer may, or may not, form. A third ethylene interpolymer will not form if catalyst deactivator A is added upstream of reactor 17 via catalyst deactivator tank 18A. A third ethylene interpolymer will be formed if catalyst deactivator B is added downstream of reactor 17 via catalyst deactivator tank 18B forming a deactivated solution, i.e. stream 19.

The optional third ethylene interpolymer produced in reactor 17 may be formed using a variety of operational modes; with the proviso that catalyst deactivator A is not added upstream of reactor 17. Non-limiting examples of operational modes include: (a) residual ethylene, residual optional α-olefin and residual active catalyst entering reactor 17 react to form the optional third ethylene interpolymer; or (b) fresh process solvent 13, fresh ethylene 14 and optional fresh α-olefin 15 are added to reactor 17 and the residual active catalyst entering reactor 17 forms the optional third ethylene interpolymer; or (c) a fresh catalyst formulation is added to reactor 17 to polymerize residual ethylene and residual optional α-olefin to form the optional third ethylene interpolymer; or (d) fresh process solvent 13, ethylene 14, optional α-olefin 15 and a fresh catalyst formulation are added to reactor 17 to form the optional third ethylene interpolymer.

In FIG. 6, deactivated solution A (stream 12*e*) or B (stream 19) passes through pressure let down device 20 and heat exchanger 21. If the optional heterogeneous catalyst formulation has been added, a passivator may be added via tank 22 forming a passivated solution 23. The passivated solution, deactivated solution A or deactivated solution B passes through pressure let down device 24 and enters a first vapor/liquid separator 25; hereinafter, "V/L" is equivalent to vapor/liquid. Two streams are formed in the first V/L separator: a first bottom stream 27 comprising a solution that is ethylene interpolymer rich and also contains residual ethylene, residual optional α-olefins and catalyst residues; and a first gaseous overhead stream 26 comprising ethylene, process solvent, optional α-olefins, optional hydrogen, oligomers and light-end impurities if present.

The first bottom stream enters a second V/L separator 28. In the second V/L separator two streams are formed: a second bottom stream 30 comprising a solution that is richer in ethylene interpolymer product and leaner in process solvent relative to the first bottom stream 27; and a second gaseous overhead stream 29 comprising process solvent, optional α-olefins, ethylene, oligomers and light-end impurities if present.

The second bottom stream 30 flows into a third V/L separator 31. In the third V/L separator two streams are formed: a product stream 33 comprising an ethylene interpolymer product, deactivated catalyst residues and less than 5 weight % of residual process solvent; and a third gaseous overhead stream 32 comprised essentially of process solvent, optional α-olefins and light-end impurities if present.

Embodiments also include the use of one or more V/L separators operating at reduced pressure, i.e. the operating pressure is lower than atmospheric pressure and/or embodiments where heat is added during the devolitization process, i.e. one or more heat exchangers are employed upstream of, or within, one or more of the V/L separators. Such embodiments facilitate the removal of residual process solvent and comonomer such that the residual volatiles in ethylene interpolymer products are less than 500 ppm.

Product stream 33 proceeds to polymer recovery operations. Non-limiting examples of polymer recovery operations include one or more gear pump, single screw extruder or twin screw extruder that forces the molten ethylene interpolymer product through a pelletizer. Other embodiments include the use of a devolatilizing extruder, where residual process solvent and optional α-olefin may be removed such that the volatiles in the ethylene interpolymer product is less than 500 ppm. Once pelletized the solidified ethylene interpolymer product is typically transported to a product silo.

The first, second and third gaseous overhead streams shown in FIG. 6 (streams 26, 29 and 32, respectively) are sent to a distillation column where solvent, ethylene and optional α-olefin are separated for recycling; or the first, second and third gaseous overhead streams are recycled to the reactors; or a portion of the first, second and third gaseous overhead streams are recycled to the reactors and the remaining portion is sent to a distillation column.

FIG. 7 illustrates an embodiment of the continuous solution polymerization process employing two CSTR reactors and an optional tubular reactor. Process solvent 101, ethylene 102 and optional α-olefin 103 are combined to produce reactor feed stream RF101 which flows into reactor 111*a*. Optionally hydrogen may be injected into reactor 111*a* through stream 104. Reactor 111*a* is continuously stirred by stirring assembly 111*b*.

A first bridged metallocene catalyst formulation is injected into reactor 111*a* via stream 105*e*. Catalyst component streams 105*d*, 105*c*, 105*b* and optional 105*a* contain the ionic activator (Component $B^1$, where the superscript '1' denotes the first reactor), the bulky ligand-metal complex (Component $A^1$), the alumoxane co-catalyst (Component $M^1$) and optional hindered phenol (Component $P^1$), respectively. Each catalyst component is dissolved in a catalyst component solvent. Catalyst component solvents, for Components $A^1$, $B^1$, $M^1$ and $P^1$ may be the same or different. In FIG. 7, the first homogeneous catalyst assembly refers the combination of streams 105*a* through 105*e*, flow controllers and tanks that functions to deliver the active bridged metallocene catalyst formulation to reactor 111*a*.

Reactor 111*a* produces a first exit stream, stream 111*c*, containing the first ethylene interpolymer dissolved in process solvent. FIG. 7 includes two embodiments where reactors 111*a* and 112*a* can be operated in series or parallel modes. In series mode 100% of stream 111*c* (the first exit stream) passes through flow controller 111*d* forming stream 111*e* which enters reactor 112*a*. In contrast, in parallel mode 100% of stream 111*c* passes through flow controller 111*f* forming stream 111*g*. Stream 111*g* by-passes reactor 112*a* and is combined with stream 112*c* (the second exit stream) forming stream 112*d* (the third exit stream). Fresh reactor feed streams are injected into reactor 112*a*; process solvent 106, ethylene 107 and optional α-olefin 108 are combined to produce reactor feed stream RF1 02. It is not important that stream RF1 02 is formed, i.e. reactor feed streams can be combined in all possible combinations, including independently injecting each stream into the reactor. Optionally hydrogen may be injected into reactor 112*a* through stream 109 to control the molecular weight of the second ethylene interpolymer. Reactor 112*a* is continuously stirred by stirring assembly 112*b* which includes a motor external to the reactor and an agitator within the reactor.

As shown in FIG. 7, a second bridged metallocene catalyst formulation is injected into reactor 112*a* through stream 110*e* and a second ethylene interpolymer is formed in reactor 112*a*. Catalyst component streams 110*d*, 110*c*, 110*b* and 110*a* contain the ionic activator Component $B^2$ (where the superscript '2' denotes the second reactor), the bulky ligand-metal complex (Component $A^2$), the alumoxane co-catalyst (Component $M^2$) and optional hindered phenol (Component $P^2$), respectively. The catalyst component streams can be arranged in all possible configurations, including an embodiment where streams 110*a* through 110*d* are independently injected into reactor 111*a*. Each catalyst component is dissolved in a catalyst component solvent.

Formula (I) defines the genus of catalyst Component A; however, Component $A^2$ employed in reactor 112*a* may be the same, or different, relative to catalyst Component $A^1$ employed in reactor 111*a*. Similarly, the chemical composition of catalyst Components $B^2$ and $B^1$, catalyst Components $M^2$ and $M^1$ and catalysts Component $P^2$ and $P^1$ may be the same, or different. In this disclosure, the term 'second homogeneous catalyst assembly' refers the combination of streams 110*a* through 110*e*, flow controllers and tanks that functions to deliver the second bridged metallocene catalyst formulation to the second reactor, reactor 112*a* in FIG. 7.

The optimization of the first and second bridged metallocene catalyst formulation is described below.

Although not shown in FIG. 7, an additional embodiment includes the splitting of stream 105*a* into two streams, such that a portion of steam 105*a* is injected into reactor 111*a* and the remaining portion of stream 105*a* is injected into reactor 112*a*. In other words, the first bridged metallocene catalyst formulation is injected into both reactors.

If reactors 111*a* and 112*a* are operated in a series mode, the second exit stream 112*c* contains the second ethylene interpolymer and the first ethylene interpolymer dissolved in process solvent; as well as unreacted ethylene, unreacted α-olefins (if present), unreacted hydrogen (if present), active catalysts, deactivated catalysts, catalyst components and other impurities (if present). Optionally the second exit stream 112*c* is deactivated by adding a catalyst deactivator A from catalyst deactivator tank 118A forming a deactivated solution A, stream 112*e*; in this case, FIG. 7 defaults to a dual reactor solution process. If the second exit stream 112*c* is not deactivated the second exit stream enters tubular reactor 117.

If reactors 111*a* and 112*a* are operated in parallel mode, the second exit stream 112*c* contains the second ethylene interpolymer dissolved in process solvent. The second exit stream 112*c* is combined with stream 111g forming a third exit stream 112*d*, the latter contains the second ethylene interpolymer and the first ethylene interpolymer dissolved in process solvent. Optionally the third exit stream 112*d* is deactivated by adding catalyst deactivator A from catalyst deactivator tank 118A forming deactivated solution A, stream 112*e*. If the third exit stream 112*d* is not deactivated the third exit stream 112*d* enters tubular reactor 117.

Optionally, one or more of the following reactor feed streams may be injected into tubular reactor 117; process solvent 113, ethylene 114 and α-olefin 115. As shown in FIG. 7, streams 113, 114 and 115 may be combined forming reactor feed stream RF1 03 and injected into reactor 117. It is not particularly important that stream RF1 03 be formed, i.e. reactor feed streams can be combined in all possible combinations. Optionally hydrogen may be injected into reactor 117 through stream 116.

Optionally, a homogeneous or a heterogeneous catalyst formulation may be injected into reactor 117. Non-limiting examples of a homogeneous catalyst formulation includes a bridged metallocene catalyst formulation, an unbridged single site catalyst formulation, or a homogeneous catalyst formulation where the bulky ligand-metal complex is not a member of the genera defined by Formula (I) or Formula (II). Stream 140 in FIG. 7 represents the output from a 'third homogeneous catalyst assembly'. One embodiment of the third homogeneous catalyst assembly is similar to the first homogeneous catalyst assembly described above, i.e. having similar streams, flow controllers and vessels.

In FIG. 7, streams 134*a* through 134*h* represent a 'heterogeneous catalyst assembly'. In one embodiment an in-line Ziegler-Natta catalyst formulation is produced in the heterogeneous catalyst assembly. The components that comprise the in-line Ziegler-Natta catalyst formulation are introduced through streams 134*a*, 134*b*, 134*c* and 134*d*. Stream 134*a* contains a blend of an aluminum alkyl and a magnesium compound, stream 134*b* contains a chloride compound, stream 134*c* contains a metal compound and stream 134*d* contains an alkyl aluminum co-catalyst. The optimization of an in-line Ziegler-Natta catalyst formulation is described above.

Once prepared, the in-line Ziegler-Natta catalyst is injected into reactor 117 through stream 134*e*; optionally, additional alkyl aluminum co-catalyst is injected into reactor 117 through stream 134*h*. As shown in FIG. 7, optionally, 100% of stream 134*d*, the alkyl aluminum co-catalyst, may be injected directly into reactor 117 via stream 134*h*. Optionally, a portion of the alkyl aluminum co-catalyst may be injected directly into reactor 117 via stream 134*h* and the remaining portion injected into reactor 117 via stream 134*e*. Any combination of the streams that comprise the heterogeneous catalyst assembly may be heated or cooled, i.e. streams 134*a*-134*e* and 134*h*.

A third ethylene interpolymer may, or may not, form in reactor 117. A third ethylene interpolymer will not form if catalyst deactivator A is added upstream of reactor 117 via catalyst deactivator tank 118A. A third ethylene interpolymer will be formed if catalyst deactivator B is added downstream of reactor 117 via catalyst deactivator tank 118B. The optional third ethylene interpolymer produced in reactor 117 may be formed using a variety of operational modes, as described above; with the proviso that catalyst deactivator A is not added upstream of reactor 17.

In series mode, Reactor 117 produces a third exit stream 117*b* containing the first ethylene interpolymer, the second ethylene interpolymer and optionally a third ethylene interpolymer. As shown in FIG. 7, catalyst deactivator B may be added to the third exit stream 117*b* via catalyst deactivator tank 118B producing a deactivated solution B, stream 119; with the proviso that catalyst deactivator B is not added if catalyst deactivator A was added upstream of reactor 117. As discussed above, if catalyst deactivator A was added, deactivated solution A (stream 112*e*) is equivalent to stream 117*b* that exits tubular reactor 117. In parallel mode, reactor 117 produces a fourth exit stream 117*b* containing the first ethylene interpolymer, the second ethylene interpolymer and optionally a third ethylene interpolymer (as discussed above, in parallel mode, stream 112*d* is the third exit stream). As shown in FIG. 7, in parallel mode, catalyst deactivator B is added to the fourth exit stream 117*b* via catalyst deactivator tank 118B producing a deactivated solution B, stream 119; with the proviso that catalyst deactivator B is not added if catalyst deactivator A was added upstream of reactor 117.

In FIG. 7, deactivated solution A (stream 112*e*) or B (stream 119) passes through pressure let down device 120 and heat exchanger 121. Optionally, if a heterogeneous catalyst formulation has been added, a passivator may be added via tank 122 forming a passivated solution 123.

Deactivated solution A, deactivated solution B or passivated solution 123 pass through pressure let down device 124 and enter a first V/L separator 125.

Two streams are formed in the first V/L separator: a first bottom stream 127 comprising a solution that is rich in ethylene interpolymers, and a first gaseous overhead stream 126 rich in ethylene, solvent, optional α-olefins and optional hydrogen.

The first bottom stream enters a second V/L separator 128. In the second V/L separator two streams are formed: a second bottom stream 130 comprising a solution that is richer in ethylene interpolymer and leaner in process solvent relative to the first bottom stream 127, and a second gaseous overhead stream 129.

The second bottom stream 130 flows into a third V/L separator 131. In the third V/L separator two streams are formed: a product stream 133 comprising an ethylene interpolymer product, deactivated catalyst residues and less than 5 weight % of residual process solvent, and a third gaseous overhead stream 132. Product stream 133 proceeds to polymer recovery operations.

Other embodiments include the use of one or more V/L separators operating at reduced pressure, i.e. the operating pressure is lower than atmospheric pressure and/or embodiments where heat is added during the devolitization process, i.e. one or more heat exchangers are employed upstream of, or within, one or more of the V/L separators. Such embodiments facilitate the removal of residual process solvent and comonomer such that the residual volatiles in ethylene interpolymer products are less than 500 ppm.

Product stream 133 proceeds to polymer recovery operations. Non-limiting examples of polymer recovery operations include one or more gear pump, single screw extruder or twin screw extruder that forces the molten ethylene interpolymer product through a pelletizer. Other embodiments include the use of a devolatilizing extruder, where residual process solvent and optional α-olefin may be removed such that the volatiles in the ethylene interpolymer product is less than 500 ppm. Once pelletized the solidified ethylene interpolymer product is typically transported to a product silo.

A highly active bridged metallocene catalyst formulation was produced by optimizing the proportion of each of the four catalyst components: Component A, Component M, Component B and Component P. The term "highly active" means the catalyst formulation is very efficient in converting olefins to polyolefins. In practice the optimization objective is to maximize the following ratio: (pounds of ethylene interpolymer product produced) per (pounds of catalyst consumed). In the case of a single CSTR, the quantity of the bulky ligand-metal complex, Component A, added to reactor R1 was expressed as the parts per million (ppm) of Component A in the total mass of the solution in R1, i.e. "R1 catalyst (ppm)" as recited in Table 4A. The upper limit on the ppm of Component A may be 5, in some cases 3 and is other cases 2. The lower limit on the ppm of Component A may be 0.02, in some cases 0.05 and in other cases 0.1. In the case of two CSTRs, the quantity of Component A added to R1 and R2 was controlled and expressed as the parts per million (ppm) of Component A in R1 and R2, optionally the quantity of Component A added to $R_3$ was controlled and expressed as the parts per million (ppm) of Component A in $R_3$.

The proportion of Catalyst component B, the ionic activator, added to R1 was optimized by controlling the (ionic activator)/(Component A) molar ratio, ([B]/[A]), in the R1 solution. The upper limit on the R1 ([B]/[A]) may be 10, in some cases 5 and in other cases 2. The lower limit on R1 ([B]/[A]) may be 0.3, in some cases 0.5 and in other cases 1.0. The proportion of catalyst Component M was optimized by controlling the (alumoxane)/(Component A) molar ratio, ([M]/[A]), in the R1 solution. The alumoxane co-catalyst was generally added in a molar excess relative to Component A. The upper limit on R1 ([M]/[A]), may be 300, in some cases 200 and is other cases 100. The lower limit on R1 ([M]/[A]), may be 1, in some cases 10 and in other cases 30. The addition of catalyst Component P (the hindered phenol) to R1 is optional. If added, the proportion of Component P was optimized by controlling the (hindered phenol)/(alumoxane), ([P]/[M]), molar ratio in R1. The upper limit on $R_1$ ([P]/[M]) may be 1, in some cases 0.75 and in other cases 0.5. The lower limit on R1 ([P]/[M]) may be 0.0, in some cases 0.1 and in other cases 0.2.

In embodiments employing two CSTR's and two homogeneous catalyst assemblies a second bridged metallocene catalyst formulation may be prepared independently of the first bridged metallocene catalyst formulation and optimized as described above. Optionally, a bridged metallocene catalyst formulation may be employed in the tubular reactor and optimized as described above.

In the continuous solution processes embodiments shown in FIGS. 6 and 7 a variety of solvents may be used as the process solvent; non-limiting examples include linear, branched or cyclic $C_5$ to $C_{12}$ alkanes. Non-limiting examples of α-olefins include 1-propene, 1-butene, 1-pentene, 1-hexene, 1-octene, 1-nonene and 1-decene. Suitable catalyst component solvents include aliphatic and aromatic hydrocarbons. Non-limiting examples of aliphatic catalyst component solvents include linear, branched or cyclic $C_{5-12}$ aliphatic hydrocarbons, e.g. pentane, methyl pentane, hexane, heptane, octane, cyclohexane, methylcyclohexane, hydrogenated naphtha or combinations thereof. Non-limiting examples of aromatic catalyst component solvents include benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

It is well known to individuals experienced in the art that reactor feed streams (solvent, monomer, α-olefin, hydrogen, catalyst formulation, etc.) must be essentially free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene and α-olefins, etc.

Referring to the first reactor shown in FIG. 6, or the first and second reactors shown in FIG. 7, any combination of the feed streams may be heated or cooled: more specifically, streams 1-4 in FIG. 6 and streams 101-104 and 106-109 in FIG. 7. The upper limit on reactor feed stream temperatures may be 90° C.; in other cases, 80° C. and in still other cases 70° C. The lower limit on reactor feed stream temperatures may be 20° C.; in other cases, 35° C. and in still other cases 50° C.

Any combination of the streams feeding the tubular reactor may be heated or cooled; for example, streams 13-16 in FIG. 6. In some cases, tubular reactor feed streams are tempered, i.e. the tubular reactor feed streams are heated to at least above ambient temperature. The upper temperature limit on the tubular reactor feed streams in some cases are 200° C., in other cases 170° C. and in still other cases 140° C.; the lower temperature limit on the tubular reactor feed streams in some cases are 60° C., in other cases 90° C. and in still other cases 120° C.; with the proviso that the temperature of the tubular reactor feed streams are lower than the temperature of the process stream that enters the tubular reactor.

The operating temperature of the solution polymerization reactors, e.g. vessels 111*a* (R1) and 112*a* (R2)) in FIG. 7 can vary over a wide range. For example, the upper limit on reactor temperatures in some cases may be 300° C., in other cases 280° C. and in still other cases 260° C.; and the lower limit in some cases may be 80° C., in other cases 100° C. and in still other cases 125° C. The second reactor, reactor 112*a* ($R_2$), is operated at a higher temperature than the first reactor 111*a* ($R_1$). The maximum temperature difference between these two reactors ($T^{R2}$-$T^{R1}$) in some cases is 120° C., in other cases 100° C. and in still other cases 80° C.; the minimum ($T^{R2}$-$T^{R1}$) in some cases is 1° C., in other cases 5° C. and in still other cases 10° C. The optional tubular reactor, reactor 117 (R3), may be operated in some cases 100° C. higher than R2; in other cases 60° C. higher than $R_2$, in still other cases 10° C. higher than R2 and in alternative cases 0° C. higher, i.e. the same temperature as R2. The temperature within optional R3 may increase along its length. The maximum temperature difference between the inlet and outlet of R3 in some cases is 100° C., in other cases 60° C. and in still other cases 40° C. The minimum temperature difference between the inlet and outlet of R3 is in some cases may be 0° C., in other cases 3° C. and in still other cases 10° C. In some cases, R3 is operated an adiabatic fashion and in other cases R3 is heated.

The pressure in the polymerization reactors should be high enough to maintain the polymerization solution as a single-phase solution and to provide the upstream pressure to force the polymer solution from the reactors through a heat exchanger and on to polymer recovery operations. Referring to the embodiments shown in FIGS. 6 and 7, the operating pressure of the solution polymerization reactors can vary over a wide range. For example, the upper limit on reactor pressure in some cases may be 45 MPag, in other cases 30 MPag and in still other cases 20 MPag; and the lower limit in some cases may be 3 MPag, in other some cases 5 MPag and in still other cases 7 MPag.

Referring to the embodiments shown in FIGS. 6 and 7, prior to entering the first V/L separator, deactivated solution A, deactivated solution B or the passivated solution may have a maximum temperature in some cases of 300° C., in other cases 290° C. and in still other cases 280° C.; the minimum temperature may be in some cases 150° C., in other cases 200° C. and in still other cases 220° C. Immediately prior to entering the first V/L separator, deactivated solution A, deactivated solution B or the passivated solution in some cases may have a maximum pressure of 40 MPag, in other cases 25 MPag and in still cases 15 MPag; the minimum pressure in some cases may be 1.5 MPag, in other cases 5 MPag and in still other cases 6 MPag.

The first V/L separator (vessels 25 and 125 in FIGS. 6 and 7, respectively) may be operated over a relatively broad range of temperatures and pressures. For example, the maximum operating temperature of the first V/L separator in some cases may be 300° C., in other cases 285° C. and in still other cases 270° C.; the minimum operating temperature in some cases may be 100° C., in other cases 140° C. and in still other cases 170° C. The maximum operating pressure of the first V/L separator in some cases may be 20 MPag, in other cases 10 MPag and in still other cases 5 MPag; the minimum operating pressure in some cases may be 1 MPag, in other cases 2 MPag and in still other cases 3 MPag.

The second V/L separator may be operated over a relatively broad range of temperatures and pressures. For example, the maximum operating temperature of the second V/L separator in some cases may be 300° C., in other cases 250° C. and in still other cases 200° C.; the minimum operating temperature in some cases may be 100° C., in other cases 125° C. and in still other cases 150° C. The maximum operating pressure of the second V/L separator in some cases may be 1000 kPag, in other cases 900 kPag and in still other cases 800 kPag; the minimum operating pressure in some cases may be 10 kPag, in other cases 20 kPag and in still other cases 30 kPag.

The third V/L separator (vessels 31 and 131 in FIGS. 6 and 7, respectively) may be operated over a relatively broad range of temperatures and pressures. For example, the maximum operating temperature of the third V/L separator in some cases may be 300° C., in other cases 250° C., and in still other cases 200° C.; the minimum operating temperature in some cases may be 100° C., in other cases 125° C. and in still other cases 150° C. The maximum operating pressure of the third V/L separator in some cases may be 500 kPag, in other cases 150 kPag and in still other cases 100 kPag; the minimum operating pressure in some cases may be 1 kPag, in other cases 10 kPag and in still other cases 25 kPag.

Embodiments of the continuous solution polymerization process shown in FIGS. 6 and 7 show three V/L separators. However, continuous solution polymerization embodiments may include configurations comprising at least one V/L separator.

The ethylene interpolymer product produced in the continuous solution polymerization process may be recovered using conventional devolatilization systems that are well known to persons skilled in the art, non-limiting examples include flash devolatilization systems and devolatilizing extruders.

Any reactor shape or design may be used for reactor 111*a* (R1) and reactor 112*a* (R2) in FIG. 7; non-limiting examples include unstirred or stirred spherical, cylindrical or tank-like vessels, as well as tubular reactors or recirculating loop reactors. At commercial scale the maximum volume of R1 in some cases may be about 20,000 gallons (about 75,710 L), in other cases about 10,000 gallons (about 37,850 L) and in still other cases about 5,000 gallons (about 18,930 L). At commercial scale the minimum volume of R1 in some cases may be about 100 gallons (about 379 L), in other cases about 500 gallons (about 1,893 L) and in still other cases about 1,000 gallons (about 3,785 L). At pilot plant scales reactor volumes are typically much smaller, for example the volume of R1 at pilot scale could be less than about 2 gallons (less than about 7.6 L). In this disclosure the volume of reactor R2 is expressed as a percent of the volume of reactor R1. The upper limit on the volume of R2 in some cases may be about 600% of R1, in other cases about 400% of R1 and in still other cases about 200% of R1. For clarity, if the volume of R1 is 5,000 gallons and $R_2$ is 200% the volume of R1, then R2 has a volume of 10,000 gallons. The lower limit on the volume of R2 in some cases may be about 50% of R1, in other cases about 100% of R1 and in still other cases about 150% of R1. In the case of continuously stirred tank reactors the stirring rate can vary over a wide range; in some cases, from about 10 rpm to about 2000 rpm, in other cases from about 100 to about 1500 rpm and in still other cases from about 200 to about 1300 rpm. In this disclosure the volume of R3, the tubular reactor, is expressed as a percent of the volume of reactor R2. The upper limit on the volume of R3 in some cases may be about 500% of R2, in other cases about 300% of R2 and in still other cases about 100% of R2. The lower limit on the volume of R3 in some cases may be about 3% of R2, in other cases about 10% of R2 and in still other cases about 50% of R2.

The “average reactor residence time”, a commonly used parameter in the chemical engineering art, is defined by the first moment of the reactor residence time distribution; the reactor residence time distribution is a probability distribution function that describes the amount of time that a fluid element spends inside the reactor. The average reactor residence time can vary widely depending on process flow rates and reactor mixing, design and capacity. The upper limit on the average reactor residence time of the solution in R1 in some cases may be 600 seconds, in other cases 360 seconds and in still other cases 180 seconds. The lower limit on the average reactor residence time of the solution in R1 in some cases may be 10 seconds, in other cases 20 seconds and in still other cases 40 seconds. The upper limit on the average reactor residence time of the solution in R2 in some cases may be 720 seconds, in other cases 480 seconds and in still other cases 240 seconds. The lower limit on the average reactor residence time of the solution in R2 in some cases may be 10 seconds, in other cases 30 seconds and in still other cases 60 seconds. The upper limit on the average reactor residence time of the solution in R3 in some cases may be 600 seconds, in other cases 360 seconds and in still other cases 180 seconds. The lower limit on the average reactor residence time of the solution in R3 in some cases may be 1 second, in other cases 5 seconds and in still other cases 10 seconds.

Optionally, additional reactors (e.g. CSTRs, loops or tubes, etc.) could be added to the continuous solution polymerization process embodiments shown in FIG. 7. In this disclosure, the number of reactors is not particularly important; with the proviso that the continuous solution polymerization process comprises at least one reactor that employs at least one bridged metallocene catalyst formulation.

In operating the continuous solution polymerization process embodiments shown in FIG. 7 the total amount of ethylene supplied to the process can be portioned or split between the three reactors $R_1$, $R_2$ and $R_3$. This operational variable is referred to as the Ethylene Split (ES), i.e. "$ES^{R1}$", "$ES^{R2}$" and "$ES^{R3}$" refer to the weight percent of ethylene injected in $R_1$, $R_2$ and $R_3$, respectively; with the proviso that $ES^{R1}+ES^{R2}+ES^{R3}=100\%$. This is accomplished by adjusting the ethylene flow rates in the following streams: stream 102 (R1), stream 107 (R2) and stream 114 ($R_3$). The upper limit on $ES^{R1}$ in some cases is about 60%, in other cases about 55% and in still other cases about 50%; the lower limit on $ES^{R1}$ in some cases is about 10%, in other cases about 15% and in still other cases about 20%. The upper limit on $ES^{R2}$ in some cases is about 90%, in other cases about 80% and in still other cases about 70%; the lower limit on $ES^{R2}$ in some cases is about 20%, in other cases about 30% and in still other cases about 40%. The upper limit on $ES^{R3}$ in some cases is about 30%, in other cases about 25% and in still other cases about 20%; the lower limit on $ES^{R3}$ in some cases is 0%, in other cases about 5% and in still other cases about 10%.

In operating the continuous solution polymerization process embodiments shown in FIG. 7 the ethylene concentration in each reactor is also controlled. The ethylene concentration in reactor 1, hereafter $EC^{R1}$, is defined as the weight of ethylene in reactor 1 divided by the total weight of everything added to reactor 1; $EC^{R2}$ and $EC^{R3}$ are defined similarly. Ethylene concentrations in the reactors ($EC^{R1}$ or $EC^{R2}$ or $EC^{R3}$) in some cases may vary from about 7 weight percent (wt. %) to about 25 wt. %, in other cases from about 8 wt. % to about 20 wt. % and in still other cases from about 9 wt. % to about 17 wt. %.

In operating the continuous solution polymerization process embodiments shown in FIG. 7 the total amount of ethylene converted in each reactor is monitored. The term "$Q^{R1}$" refers to the percent of the ethylene added to $R_1$ that is converted into an ethylene interpolymer by the catalyst formulation. Similarly, $Q^{R2}$ and $Q^{R3}$ represent the percent of the ethylene added to R2 and R3 that was converted into ethylene interpolymer, in the respective reactor. Ethylene conversions can vary significantly depending on a variety of process conditions, e.g. catalyst concentration, catalyst formulation, impurities and poisons. The upper limit on both $Q^{R1}$ and $Q^{R2}$ in some cases is about 99%, in other cases about 95% and in still other cases about 90%; the lower limit on both $Q^{R1}$ and $Q^{R2}$ in some cases is about 65%, in other cases about 70% and in still other cases about 75%. The upper limit on $Q^{R3}$ in some cases is about 99%, in other cases about 95% and in still other cases about 90%; the lower limit on $Q^{R3}$ in some cases is 0%, in other cases about 5% and in still other cases about 10%. The term "$Q^T$" represents the total or overall ethylene conversion across the entire continuous solution polymerization plant; i.e. $Q^T=100\times$[weight of ethylene in the interpolymer product]/([weight of ethylene in the interpolymer product]+[weight of unreacted ethylene]). The upper limit on $Q^T$ in some cases is about 99%, in other cases about 95% and in still other cases about 90%; the lower limit on $Q^T$ in some cases is about 75%, in other cases about 80% and in still other cases about 85%.

Referring to FIG. 7, optionally, α-olefin may be added to the continuous solution polymerization process. If added, α-olefin may be proportioned or split between $R_1$, $R_2$ and $R_3$. This operational variable is referred to as the Comonomer (α-olefin) Split (CS), i.e. "$CS^{R1}$", "$CS^{R2}$" and "$CS^{R3}$" refer to the weight percent of α-olefin comonomer that is injected in $R_1$, $R_2$ and $R_3$, respectively; with the proviso that $CS^{R1}+CS^{R2}+CS^{R3}=100\%$. This is accomplished by adjusting α-olefin flow rates in the following streams: stream 103 ($R_1$), stream 108 ($R_2$) and stream 115 ($R_3$). The upper limit on $CS^{R1}$ in some cases is 100% (i.e. 100% of the α-olefin is injected into $R_1$), in other cases about 95% and in still other cases about 90%. The lower limit on $CS^{R1}$ in some cases is 0% (ethylene homopolymer produced in $R_1$), in other cases about 5% and in still other cases about 10%. The upper limit on $CS^{R2}$ in some cases is about 100% (i.e. 100% of the α-olefin is injected into reactor 2), in other cases about 95% and in still other cases about 90%. The lower limit on $CS^{R2}$ in some cases is 0%, in other cases about 5% and in still other cases about 10%. The upper limit on $CS^{R3}$ in some cases is 100%, in other cases about 95% and in still other cases about 90%. The lower limit on $CS^{R3}$ in some cases is 0%, in other cases about 5% and in still other cases about 10%. In the continuous polymerization processes described in this disclosure, polymerization is terminated by adding a catalyst deactivator. Embodiments in FIG. 6 show catalyst deactivation occurring either: (a) upstream of the tubular reactor by adding a catalyst deactivator A from catalyst deactivator tank 18A; or (b) downstream of the tubular reactor by adding a catalyst deactivator B from catalyst deactivator tank 18B. Catalyst deactivator tanks 18A and 18B may contain neat (100%) catalyst deactivator, a solution of catalyst deactivator in a solvent, or a slurry of catalyst deactivator in a solvent. The chemical composition of catalyst deactivator A and B may be the same, or different. Non-limiting examples of suitable solvents include linear or branched $C_5$ to $C_{12}$ alkanes. In this disclosure, how the catalyst deactivator is added is not particularly important. Once added, the catalyst deactivator substantially stops the polymerization reaction by changing active catalyst species to inactive forms. Suitable deactivators are well known in the art, non-limiting examples include: amines (e.g. U.S. Pat. No. 4,803,259 to Zboril et al.); alkali or alkaline earth metal salts of carboxylic acid (e.g. U.S. Pat. No. 4,105,609 to Machan et al.); water (e.g. U.S. Pat. No. 4,731,438 to Bernier et al.); hydrotalcites, alcohols and carboxylic acids (e.g. U.S. Pat. No. 4,379,882 to Miyata); or a combination thereof (U.S. Pat. No. 6,180,730 to Sibtain et al.). In this disclosure the quantify of catalyst deactivator added was determined by the following catalyst deactivator molar ratio: 0.3≤(catalyst deactivator)/((total catalytic metal)+(alkyl aluminum co-catalyst)+(aluminum alkyl))≤2.0; where the total catalytic metal is the total moles of catalytic metal added to the solution process. The upper limit on the catalyst deactivator molar ratio may be 2, in some cases 1.5 and in other cases 0.75. The lower limit on the catalyst deactivator molar ratio may be 0.3, in some cases 0.35 and in still other cases 0.4. In general, the catalyst deactivator is added in a minimal amount such that the catalyst is deactivated and the polymerization reaction is quenched.

If the optional heterogeneous catalyst formulation was employed in the third reactor, prior to entering the first V/L separator, a passivator or acid scavenger was added to deactivated solution A or B to form a passivated solution, i.e. passivated solution stream 23 as shown in FIG. 6. Optional passivator tank 22 may contain neat (100%) passivator, a solution of passivator in a solvent, or a slurry of passivator in a solvent. Non-limiting examples of suitable solvents include linear or branched $C_5$ to $C_{12}$ alkanes. In this disclosure, how the passivator is added is not particularly important. Suitable passivators are well known in the art, non-limiting examples include alkali or alkaline earth metal salts of carboxylic acids or hydrotalcites. The quantity of passivator added can vary over a wide range. The quantity of passivator added was determined by the total moles of chloride compounds added to the solution process, i.e. the chloride compound "compound (vi)" plus the metal compound "compound (vii)" that was used to manufacture the heterogeneous catalyst formulation. The upper limit on the (passivator)/(total chlorides) molar ratio may be 15, in some cases 13 and in other cases 11. The lower limit on the (passivator)/(total chlorides) molar ratio may be about 5, in some cases about 7 and in still other cases about 9. In general, the passivator is added in the minimal amount to substantially passivate the deactivated solution.

In this disclosure, an unbridged single site catalyst formulation was employed in the comparative solution process and comparative ethylene interpolymer products were produced. A highly active unbridged single site catalyst formulation was produced by optimizing the proportion of each of the four catalyst components: Component C, Component $M^C$ (where the superscript 'c' denotes the unbridged single site catalyst formulation), Component $B^C$ and Component Pc.

In the case of one CSTR, the quantity of the bulky ligand metal complex, Component C, added to the first reactor ($R_1$) was expressed as the parts per million (ppm) of Component C in the total mass of the solution in R1, i.e. "R1 catalyst (ppm)". In the case of two CSTRs, the quantity of Component C added to R1 and R2 was controlled and expressed as the parts per million (ppm) of Component C in R1 and R2; optionally the quantity of Component C added to R3 was controlled and expressed as the parts per million (ppm) of Component C in R3. The upper limit on the ppm of Component C in any reactor may be 5, in some cases 3 and is other cases 2. The lower limit on the ppm of Component C in any reactor may be 0.02, in some cases 0.05 and in other cases 0.1.

The proportion of catalyst Component $B^C$ was optimized by controlling the (ionic activator)/(bulky ligand-metal complex) molar ratio, ($[B^0]/[C]$), in a reactor. The upper limit on reactor ([Bc]/[C]) may be 10, in some cases 5 and in other cases 2. The lower limit on reactor ([Bc]/[C]) may be 0.3, in some cases 0.5 and in other cases 1.0. The proportion of catalyst Component $M^C$ was optimized by controlling the (alumoxane)/(bulky ligand-metal complex) molar ratio, ($[M^C]/[C]$), in a reactor. The alumoxane co-catalyst was generally added in a molar excess relative to the bulky ligand-metal complex. The upper limit on reactor ($[M^C]/[C]$) molar ratio may be 1000, in some cases 500 and is other cases 200. The lower limit on reactor ($[M^C]/[C]$) molar ratio may be 1, in some cases 10 and in other cases 30. The addition of catalyst Component $P^C$ is optional. If added, the proportion of Component $P^C$ was optimized by controlling the (hindered phenol)/(alumoxane) molar ratio, ($[P^C]/[M^C]$), in any reactor. The upper limit on reactor ($[P^C]/[M^C]$) molar ratio may be 1.0, in some cases 0.75 and in other cases 0.5. The lower limit on reactor ($[P^C]/[M^C]$) molar ratio may be 0.0, in some cases 0.1 and in other cases 0.2.

Interpolymers

The first ethylene interpolymer was synthesized by a bridged metallocene catalyst formulation. Referring to the embodiment shown in FIG. 6, if the optional α-olefin is not added to reactor 11*a* (R1), then the first ethylene interpolymer is an ethylene homopolymer. If an α-olefin is added, the following weight ratio is one parameter to control the density of the first ethylene interpolymer: $((\alpha\text{-olefin})/(\text{ethylene}))^{R1}$. The upper limit on $((\alpha\text{-olefin})/(\text{ethylene}))^{R1}$ may be about 3; in other cases about 2 and in still other cases about 1. The lower limit on $((\alpha\text{-olefin})/(\text{ethylene}))^{R1}$ may be 0; in other cases about 0.25 and in still other cases about 0.5. Hereafter, the symbol "$\sigma^1$" refers to the density of the first ethylene interpolymer produced in $R_1$, i.e. reactor 11*a* in FIG. 6 or reactor 111*a* in FIG. 7. The upper limit on $\sigma^1$ may be 0.975 g/cc; in some cases, 0.965 g/cc and, in other cases 0.955 g/cc. The lower limit on $\sigma^1$ may be 0.855 g/cc, in some cases 0.865 g/cc, and, in other cases 0.875 g/cc. Density decreases as the content of one or more α-olefins in the first ethylene interpolymer increases. The α-olefin content was expressed as the mole percent of α-olefin in the first ethylene interpolymer. The upper limit on the mole percent of α-olefin(s) in the first ethylene interpolymer may be 25%; in some cases, 23% and in other cases 20%. The lower limit on the mole percent of α-olefin in the first ethylene interpolymer was 0%, i.e. no α-olefin was added to the solution polymerization process and the first ethylene interpolymer was an ethylene homopolymer.

Methods to determine the $CDBI_{50}$ (Composition Distribution Branching Index) of an ethylene interpolymer are well known to those skilled in the art. The $CDBI_{50}$, expressed as a percent, was defined as the percent of the ethylene interpolymer whose comonomer (α-olefin) composition is within 50% of the median comonomer composition. It is also well known to those skilled in the art that the $CDBI_{50}$ of ethylene interpolymers produced with homogeneous catalyst formulations are higher relative to the $CDBI_{50}$ of α-olefin containing ethylene interpolymers produced with heterogeneous catalyst formulations. The upper limit on the $CDBI_{50}$ of the first ethylene interpolymer may be 98%, in other cases 95% and in still other cases 90%. The lower limit on the $CDBI_{50}$ of the first ethylene interpolymer may be 70%, in other cases 75% and in still other cases 80%.

The upper limit on the $M_w/M_n$ of the first ethylene interpolymer may be 2.4, in other cases 2.3 and in still other cases 2.2. The lower limit on the $M_w/M_n$ the first ethylene interpolymer may be 1.7, in other cases 1.8 and in still other cases 1.9.

The first ethylene interpolymer contains long chain branching as characterized by the dimensionless nonlinear rheology network parameter '$\Delta_{int}$' discussed above. The upper limit on the $\Delta_{int.}$ of the first ethylene interpolymer may be 0.09, in other cases 0.07 and in still other cases 0.05 (dimensionless). The lower limit on the $\Delta_{int.}$ of the first ethylene interpolymer may be greater than or equal to 0.01, in other cases greater than 0.015 and in still other cases greater than 0.02 (dimensionless).

The first ethylene interpolymer has an Unsaturation Ratio, UR, defined by Eq.(UR) discussed above. The upper limit on the UR of the first ethylene interpolymer may be 0.06, in other cases 0.04 and in still other cases 0.02 (dimensionless). The lower limit on the UR of the first ethylene interpolymer may be −0.40, in other cases −0.30 and in still other cases −0.20 (dimensionless).

The first ethylene interpolymer contained 'a residual catalytic metal' that reflected the chemical composition of the bridged metallocene catalyst formulation injected into the first reactor. Residual catalytic metal was quantified by Neutron Activation Analysis (NAA), i.e. the parts per million (ppm) of catalytic metal in the first ethylene interpolymer, where the catalytic metal originated from the metal in Component A (Formula (I)); this metal will be referred to as "metal $A^{R1}$". Non-limiting examples of metal $A^{R1}$ include Group 4 metals, titanium, zirconium and hafnium. In the case of an ethylene interpolymer product that contains one interpolymer, i.e. the first ethylene interpolymer, the residual catalytic metal is equal to the ppm metal $A^{R1}$ in the ethylene interpolymer product. The upper limit on the ppm of metal $A^{R1}$ in the first ethylene interpolymer may be 5.0 ppm, in other cases 4.0 ppm and in still other cases 3.0 ppm. The lower limit on the ppm of metal $A^{R1}$ in the first ethylene interpolymer may be 0.03 ppm, in other cases 0.09 ppm and in still other cases 0.15 ppm.

The amount of hydrogen added to $R_1$ can vary over a wide range allowing the continuous solution process to produce first ethylene interpolymers that differ in melt index, hereafter $I_2^1$ (melt index is measured at 190° C. using a 2.16 kg load following the procedures outlined in ASTM D1238). This is accomplished by adjusting the hydrogen flow rate in stream 4 (FIG. 6). The quantity of hydrogen added to reactor 11*a* (R1) is expressed as the parts-per-million (ppm) of hydrogen in R1 relative to the total mass in reactor $R_1$; hereinafter $H_2^{R1}$ (ppm). In some cases, $H_2^{R1}$ (ppm) ranges from 100 ppm to 0 ppm, in other cases from 50 ppm to 0 ppm, in alternative cases from 20 to 0 and in still other cases from 2 ppm to 0 ppm.

The upper limit on $I_2^1$ may be 200 dg/min, in some cases 100 dg/min. in other cases, 50 dg/min, and, in still other cases 1 dg/min. The lower limit on $I_2^1$ may be 0.01 dg/min, in some cases 0.05 dg/min. in other cases, 0.1 dg/min, and, in still other cases 0.5 dg/min.

The upper limit on the weight percent (wt. %) of the first ethylene interpolymer in the ethylene interpolymer product may be 100 wt. %, in some cases 60 wt. %, in other cases 55 wt. % and in still other cases 50 wt. %. The lower limit on the wt. % of the first ethylene interpolymer in the ethylene interpolymer product may be 5 wt. %; in other cases, 8 wt. % and in still other cases 10 wt. %.

The second ethylene interpolymer, may, or may not, be present. FIG. 6 illustrates an embodiment where the second ethylene interpolymer is not present, i.e. where one CSTR was used and stream 11*c* was deactivated (via deactivator tank 18A). Turning to FIG. 7, a second ethylene interpolymer was synthesized by injecting a bridged metallocene catalyst formulation into the second solution polymerization reactor 112*a* (or R2). If optional α-olefin is not added to reactor 112*a* (R2) either through fresh α-olefin stream 108 or carried over from reactor 111*a* (R1) in stream 111*e* (series mode), then the second ethylene interpolymer was an ethylene homopolymer. If α-olefin was present in R2, the following weight ratio was one parameter to control the density of the second ethylene interpolymer: $((\alpha\text{-olefin})/(\text{ethylene}))^{R2}$. The upper limit on $((\alpha\text{-olefin})/(\text{ethylene}))^{R2}$ may be 3; in other cases 2 and in still other cases 1. The lower limit on $((\alpha\text{-olefin})/(\text{ethylene}))^{R2}$ may be 0; in other cases 0.25 and in still other cases 0.5. Hereafter, the symbol "$\sigma^2$" refers to the density of the second ethylene interpolymer. The upper limit on $\sigma^2$ may be 0.975 g/cc; in some cases, 0.965 g/cc and, in other cases 0.955 g/cc. The lower limit on $\sigma^2$ may be 0.855 g/cc, in some cases 0.865 g/cc, and, in other cases 0.875 g/cc. The upper limit on the mole percent of one or more α-olefins in the second ethylene interpolymer may be 25%; in some cases, 23% and in other cases 20%. The lower limit on the mole percent of α-olefin in the second ethylene interpolymer was 0%, i.e. no α-olefin was added to the solution polymerization process and the second ethylene interpolymer was an ethylene homopolymer.

The upper limit on the $CDBI_{50}$ of the second ethylene interpolymer may be 98%, in other cases 95% and in still other cases 90%. The lower limit on the $CDBI_{50}$ of the second ethylene interpolymer may be 70%, in other cases 75% and in still other cases 80%.

The upper limit on the $M_w/M_n$ of the second ethylene interpolymer may be 2.4, in other cases 2.3 and in still other cases 2.2. The lower limit on the $M_w/M_n$ the second ethylene interpolymer may be 1.7, in other cases 1.8 and in still other cases 1.9.

The second ethylene interpolymer contains long chain branching as characterized by the dimensionless nonlinear rheology network parameter '$\Delta_{int}$' discussed above. The upper limit on the $\Delta_{int.}$ of the second ethylene interpolymer may be 0.09, in other cases 0.07 and in still other cases 0.05 (dimensionless). The lower limit on the $\Delta_{int.}$ of the second ethylene interpolymer may be greater than or equal to 0.01, in other cases greater than 0.015 and in still other cases greater than 0.02 dimensionless.

The second ethylene interpolymer has an Unsaturation Ratio, UR, defined by Eq. (UR). The upper limit on the UR of the second ethylene interpolymer may be 0.06, in other cases 0.04 and in still other cases 0.02 (dimensionless). The lower limit on the UR of the second ethylene interpolymer may be −0.40, in other cases −0.30 and in still other cases −0.20 (dimensionless).

The catalyst residue in the second ethylene interpolymer reflects the amount of the bridged metallocene catalyst formulation employed in R2 or the amount of Component A employed in R2. The species of Component A (Formula (I)) containing 'metal $A^{R2}$' employed in second reactor may differ from the species of Component A employed in the first reactor. In the case of a pure sample of the second ethylene interpolymer, the upper limit on the ppm of metal $A^{R2}$ in the second ethylene interpolymer may be 5.0 ppm, in other cases 4.0 ppm and in still other cases 3.0 ppm; while the lower limit on the ppm of metal $A^{R2}$ in the second ethylene interpolymer may be 0.03 ppm, in other cases 0.09 ppm and in still other cases 0.15 ppm.

Referring to the embodiments shown in FIG. 7, the amount of hydrogen added to $R_2$ can vary over a wide range which allows the continuous solution polymerization process to produce second ethylene interpolymers that differ in melt index, hereinafter $I_2^2$. This is accomplished by adjusting the hydrogen flow rate in stream 109. The quantity of hydrogen added was expressed as the parts-per-million (ppm) of hydrogen in $R_2$ relative to the total mass in reactor R2; hereinafter $H_2^{R2}$ (ppm). In some cases, $H_2^{R2}$ (ppm) ranges from 100 ppm to 0 ppm, in some cases from 50 ppm to 0 ppm, in other cases from 20 to 0 and in still other cases from 2 ppm to 0 ppm. The upper limit on $I_2^2$ may be 1000 dg/min; in some cases, 750 dg/min; in other cases, 500 dg/min, and, in still other cases 200 dg/min. The lower limit on $I_2^2$ may be 0.3 dg/min, in some cases 0.4 dg/min, in other cases 0.5 dg/min; and in still other cases 0.6 dg/min.

The upper limit on the weight percent (wt. %) of the second ethylene interpolymer in the ethylene interpolymer product may be 95 wt. %, in other cases 92 wt. % and in still other cases 90 wt. %. The lower limit on the wt. % of the second ethylene interpolymer in the ethylene interpolymer product may be 0 wt. %, in some cases 20 wt. %, in other cases 30 wt. % and in still other cases 40 wt. %.

Optionally, embodiments of ethylene interpolymer products contained a third ethylene interpolymer. Referring to FIG. 6, a third ethylene interpolymer was produced in reactor 17 (R3) if catalyst deactivator A was not added upstream of reactor 17. Referring to FIG. 7, a third ethylene interpolymer was produced in reactor 117 if catalyst deactivator was not added upstream of reactor 117. If α-olefin was not added, the third ethylene interpolymer was an ethylene homopolymer. If α-olefin was present in R3, the following weight ratio was one parameter that determined the density of the third ethylene interpolymer: $((\alpha\text{-olefin})/(\text{ethylene}))^{R3}$. The upper limit on $((\alpha\text{-olefin})/(\text{ethylene}))^{R3}$ may be 3; in other cases 2 and in still other cases 1. The lower limit on $((\alpha\text{-olefin})/(\text{ethylene}))^{R3}$ may be 0; in other cases 0.25 and in still other cases 0.5. Hereinafter, the symbol "$\sigma^3$" refers to the density of the third ethylene interpolymer. The upper limit on $\sigma^3$ may be 0.975 g/cc; in some cases, 0.965 g/cc and, in other cases 0.955 g/cc. The lower limit on $\sigma^3$ may be 0.855 g/cc, in some cases 0.865 g/cc, and, in other cases 0.875 g/cc. The upper limit on the mole percent of one or more α-olefins in the third ethylene interpolymer may be 25%; in some cases, 23% and in other cases 20%. The lower limit on the mole percent of α-olefin in the third ethylene interpolymer was 0%, i.e. no α-olefin was added to the solution polymerization process and the third ethylene interpolymer was an ethylene homopolymer.

One or more of the following homogeneous catalyst formulations may be injected into R3: the bridged metallocene catalyst formulation, the unbridged single site catalyst formulation or a homogeneous catalyst formulation that contains a bulky ligand-metal complex that is not a member of the genera defined by Formula (I) or Formula (II). FIGS. 6 and 7 illustrates the injection of a homogeneous catalyst formulation into reactor 17 or 117, respectively, through stream 40 or 140, respectively. This disclosure includes embodiments where a heterogeneous catalyst formulation was injected into the third reactor (R3). FIG. 6 illustrates a non-limiting example were a heterogeneous catalyst assembly (streams 34*a*-34*e* and 34*h*) was employed to produce and inject an on-line Ziegler-Natta catalyst formulation into reactor 17. Similarly, FIG. 7 illustrates a non-limiting example were a heterogeneous catalyst assembly (streams 134*a*-134*e* and 134*h*) was employed to produce and inject an on-line Ziegler-Natta catalyst formulation into reactor 117.

The upper limit on the $CDBI_{50}$ of the third ethylene interpolymer may be 98%, in other cases 95% and in still other cases 90%. The lower limit on the $CDBI_{50}$ of the optional third ethylene interpolymer may be 35%, in other cases 40% and in still other cases 45%.

The upper limit on the $M_w/M_n$ of the third ethylene interpolymer may be 5.0, in other cases 4.8 and in still other cases 4.5. The lower limit on the $M_w/M_n$ of the optional third ethylene interpolymer may be 1.7, in other cases 1.8 and in still other cases 1.9.

If the bridged metallocene catalyst formulation was employed in the third reactor the third ethylene interpolymer contained long chain branching as characterized by the dimensionless nonlinear rheology network parameter '$\Delta_{int}$' discussed above. The upper limit on the $\Delta_{int.}$ of the third ethylene interpolymer may be 0.09, in other cases 0.07 and in still other cases 0.05 (dimensionless). The lower limit on the $\Delta_{int.}$ of the third ethylene interpolymer may be greater than or equal to 0.01, in other cases greater than 0.015, and in still other cases greater than 0.02 (dimensionless). If the unbridged single site catalyst formulation was employed in the third reactor the third ethylene interpolymer contained an undetectable amount of long chain branching, i.e. the third ethylene interpolymer has a dimensionless $\Delta_{int.}$ value less than 0.01. If a heterogeneous catalyst formulation was employed in the third reactor the third ethylene interpolymer contained an undetectable amount of long chain branching. If a homogeneous catalyst formulation containing a bulky ligand-metal complex that is not a member of the genera defined by Formula (I) or Formula (II) was employed in $R_3$, the third ethylene interpolymer may, or may not, contain LCB.

If the third ethylene interpolymer was synthesized by the bridged metallocene catalyst formulation, the third ethylene interpolymer was characterized by an Unsaturation Ratio, UR; where the upper limit on UR was 0.06, in other cases 0.04 and in still other cases 0.02 (dimensionless) and the lower limit on UR was −0.40, in other cases −0.30 and in still other cases −0.20 (dimensionless). If the third ethylene interpolymer was synthesized by the unbridged single site catalyst formulation, the third ethylene interpolymer was characterized by an Unsaturation Ratio, UR; where the upper limit on UR was −0.1, in other cases −0.2 and in still other cases −0.3 and the lower limit on UR was −0.8, in other cases −0.65 and in still other cases −0.5. If the third ethylene interpolymer was synthesized by a Ziegler-Natta catalyst formulation, the third ethylene interpolymer was characterized by the an Unsaturation Ratio, UR; where the upper limit on UR was −0.7, in other cases −0.75 and in still other cases −0.8 and the lower limit on UR was −1.0, in other cases −0.95 and in still other cases −0.9.

The catalyst residue in the third ethylene interpolymer reflected the catalyst employed in its manufacture. If the bridged metallocene catalyst formulation was used, the species of Component A (Formula (I)) containing 'metal $A^{R3}$' employed in the third reactor may differ from the species employed in $R_1$, or $R_1$ and $R_2$. In other words, the catalytic metal employed in $R_3$ may differ from the catalytic metal employed in $R_1$ and/or $R_2$. In the case of a pure sample of the third ethylene interpolymer, the upper limit on the ppm of metal $A^{R3}$ in the third ethylene interpolymer may be 5.0 ppm, in other cases 4.0 ppm and in still other cases 3.0 ppm; while the lower limit on the ppm of metal $A^{R3}$ in the third ethylene interpolymer may be 0.03 ppm, in other cases 0.09 ppm and in still other cases 0.15 ppm.

The third ethylene interpolymer may be synthesized using an unbridged single site catalyst formulation comprising Component C and a catalytic 'metal $C^{R3}$' Non-limiting examples of metal $C^{R3}$ include the Group 4 metals titanium, zirconium and hafnium. In the case of a pure sample of the third ethylene interpolymer, the upper limit on the ppm of metal $C^{R3}$ in the third ethylene interpolymer may be 3.0 ppm, in other cases 2.0 ppm and in still other cases 1.5 ppm. The lower limit on the ppm of metal $C^{R3}$ in the third ethylene interpolymer may be 0.03 ppm, in other cases 0.09 ppm and in still other cases 0.15 ppm.

The third ethylene interpolymer may be synthesized using a homogeneous catalyst formulation that contains a bulky ligand-metal complex, containing metal '$B^{R3}$', that is not a member of the genera defined by Formula (I) or Formula (II). Non-limiting examples of metal $B^{R3}$ include the Group 4 metals titanium, zirconium and hafnium. In the case of a pure sample of the third ethylene interpolymer, the upper limit on the ppm of metal $B^{R3}$ in the third ethylene interpolymer may be 5.0 ppm, in other cases 4.0 ppm and in still other cases 3.0 ppm. The lower limit on the ppm of metal $B^{R3}$ in the third ethylene interpolymer may be 0.03 ppm, in other cases 0.09 ppm and in still other cases 0.15 ppm.

The third ethylene interpolymer may be synthesized using a heterogeneous catalyst formulation. A non-limiting example of a heterogeneous catalyst formulation is an in-line Ziegler-Natta catalyst formulation; FIGS. 6 and 7 illustrate the injection of in-line Ziegler-Natta catalyst formulations into tubular reactor 17 or 117, respectively, through streams 34*e* or 134*e*, respectively. The in-line Ziegler-Natta catalyst formulation comprises a metal compound (component (vii)) and the term 'metal $Z^{R3}$' refers to the metal in this compound. Non-limiting examples of metal $Z^{R3}$ include metals selected from Group 4 through Group 8 of the Periodic Table. In the case of a pure sample of the third ethylene interpolymer, the upper limit on the ppm of metal $Z^{R3}$ in the third ethylene interpolymer may be 12 ppm, in other cases 10 ppm and in still other cases 8 ppm; while the lower limit on the ppm of metal $Z^{R3}$ in the third ethylene interpolymer may be 0.5 ppm, in other cases 1 ppm and in still other cases 3 ppm.

Referring to the embodiments shown in FIGS. 6 and 7, optional hydrogen may be injected into the tubular reactor 17 or 117, respectively, through stream 16 or stream 116, respectively. The amount of hydrogen added to R3 may vary over a wide range. Adjusting the amount of hydrogen in R3, hereinafter $H_2^{R3}$ (ppm), allows the continuous solution process to produce third ethylene interpolymers that differ widely in melt index, hereinafter 123. The amount of optional hydrogen added to $R_3$ ranges from 100 ppm to 0 ppm, in some cases from 50 ppm to 0 ppm, in other cases from 20 to 0 and in still other cases from 2 ppm to 0 ppm. The upper limit on 123 may be 2000 dg/min; in some cases, 1500 dg/min; in other cases, 1000 dg/min; and, in still other cases 500 dg/min. The lower limit on 123 may be 0.4 dg/min, in some cases 0.6 dg/min, in other cases 0.8 dg/min; and, in still other cases 1.0 dg/min.

The upper limit on the weight percent (wt. %) of the optional third ethylene interpolymer in the ethylene interpolymer product may be 30 wt. %, in other cases 25 wt. % and in still other cases 20 wt. %. The lower limit on the wt. % of the optional third ethylene interpolymer in the ethylene interpolymer product may be 0 wt. %; in other cases, 5 wt. % and in still other cases 10 wt. %.

Embodiments of the ethylene interpolymer product may comprise: (i) the first ethylene interpolymer; (ii) the first ethylene interpolymer and the third ethylene interpolymer; (iii) the first ethylene interpolymer and the second ethylene interpolymer; or (iv) the first ethylene interpolymer, the second ethylene interpolymer and the third ethylene interpolymer.

The upper limit on the density of the ethylene interpolymer product ($\rho^f$) may be 0.975 g/cc; in some cases, 0.965 g/cc; and, in other cases 0.955 g/cc. The lower limit on the density of the ethylene interpolymer product may be 0.855 g/cc, in some cases 0.865 g/cc; and, in other cases 0.875 g/cc. The upper limit on the mole percent of one or more $\alpha$-olefins in the ethylene interpolymer product may be 25%; in some cases, 23% and in other cases 20%. The lower limit on the mole percent of $\alpha$-olefin in the ethylene interpolymer product was 0%, i.e. no $\alpha$-olefin was added to the solution polymerization process and the ethylene interpolymer product was an ethylene homopolymer.

The upper limit on the $CDBI_{50}$ of the ethylene interpolymer product may be 98%, in other cases 90% and in still other cases 85%. An ethylene interpolymer product with a $CDBI_{50}$ of 97% may result if an $\alpha$-olefin is not added to the continuous solution polymerization process; in this case, the ethylene interpolymer product is an ethylene homopolymer. The lower limit on the $CDBI_{50}$ of an ethylene interpolymer product may be 1%, in other cases 2% and in still other cases 3%.

The upper limit on the $M_w/M_n$ of the ethylene interpolymer product depends on the number of reactors employed and polymerizations conditions. For example, referring to FIG. 6, if stream 11*c* is deactivated upstream of tubular reactor 17 the upper limit on the $M_w/M_n$ of the ethylene interpolymer product may be 2.4, in other cases 2.3 and in still other cases 2.2; while the lower limit on the $M_w/M_n$ of this ethylene interpolymer product may be 1.7, in other cases 1.8, and in still other cases 1.9. Referring to multi-reactor FIG. 7, the upper limit on the $M_w/M_n$ of an ethylene interpolymer product (comprising a first, second and optionally a third ethylene interpolymer) may be 25, in other cases 20 and in still other cases 15; while the lower limit on the $M_w/M_n$ of this ethylene interpolymer product may be 1.8, in other cases 1.9, and in still other cases 2.0.

The ethylene interpolymer product contains long chain branching (LCB) and LCB was characterized by the dimensionless nonlinear rheology network parameter '$\Delta_{int.}$' discussed above. The upper limit on the $\Delta_{int.}$ of the ethylene interpolymer product may be 0.09, in other cases 0.07 and in still other cases 0.05 (dimensionless). The lower limit on the $\Delta_{int.}$ of the ethylene interpolymer product may be greater than or equal to 0.01, in other cases greater than 0.015, and in still other cases greater than 0.02 (dimensionless).

If the ethylene interpolymer product was synthesized using one or more bridged metallocene catalyst formulations, the ethylene interpolymer product was characterized by an Unsaturation Ratio, UR; where the upper limit on UR was 0.06, in other cases 0.04 and in still other cases 0.02 (dimensionless) and the lower limit on UR was −0.40, in other cases −0.30 and in still other cases −0.20 (dimensionless). If the ethylene interpolymer product contained a portion of a third ethylene interpolymer synthesized using an unbridged single site catalyst formulation, the ethylene interpolymer product was characterized by an Unsaturation Ratio, UR; where the upper limit on UR was 0.06, in other cases 0.04, and in still other cases 0.02 and the lower limit on UR was −0.8, in other cases −0.65, and in still other cases −0.5. If the ethylene interpolymer product contained a portion of a third ethylene interpolymer synthesized using a Ziegler-Natta catalyst formulation, the ethylene interpolymer product was characterized by an Unsaturation Ratio, UR; where the upper limit on UR was 0.06, in other cases 0.04 and in still other cases 0.02 and the lower limit on UR was −1.0, in other cases −0.95, and in still other cases −0.9.

Table 3 discloses the 'residual catalytic metal' in ethylene interpolymer product Examples 1-6 as determined by Neutron Activation Analysis (NAA). In Examples 1, 2 and 4-6 the same bridged metallocene catalyst formulation was injected into reactors 111*a* and 112*a* (FIG. 7) and the residual catalytic metals in these samples varied from 1.38 to 1.98 ppm Hf. In Example 3 one CSTR was employed and the bridged metallocene catalyst formulation was injected into reactor 11*a* (FIG. 6), Example 3 had a residual catalytic metal of 2.20 ppm Hf. In Examples 1-6 the quantity of titanium was below the N.A.A. detection limit. In Example 8, a bridged metallocene catalyst formulation (Hf containing) was injected into reactor 111a and an unbridged single site catalyst formulation (Ti containing) was injected into reactor 112a. Comparatives Q1-Q4 were manufactured using a Hf-based catalyst formulation and contained from 0.24-0.34 ppm Hf and undetectable Ti. Comparative 2 and Comparative 3 were manufactured using a Hf-based and a Ti-based catalyst formulation. The remaining comparatives in Table 3 were produced with various Ti-based catalyst formulations, i.e. Comparatives R, S, U, V, 1, 4 and 5 where the Ti content ranged from 0.14 to 7.14 ppm Ti.

In embodiments where the same species of Component A was employed in one or more reactors, the upper limit on the residual catalytic metal in the ethylene interpolymer product may be 5.0 ppm, in other cases 4.0 ppm, and in still other cases 3.0 ppm; and the lower limit on the residual catalytic metal in the ethylene interpolymer product may be 0.03 ppm, in other cases 0.09 ppm, and in still other cases 0.15 ppm.

In embodiments where two or more reactors were operating and different species of Component A (having different metals) were employed in each reactor, the upper limit on the ppm of metal $A^{R1}$ in the ethylene interpolymer product may be 3.0 ppm, in other cases 2.5 ppm and in still other cases 2.0 ppm; while the lower limit on the ppm of metal $A^{R1}$ in the ethylene interpolymer product may be 0.0015 ppm, in other cases 0.005 ppm, and in still other cases 0.01 ppm.

In embodiments where the ethylene interpolymer product contained two interpolymers and different species of Component A (having different metals) were employed in $R_1$ (vessel 111a FIG. 7) and $R_2$ (vessel 112a FIG. 7), the upper limit on the ppm of metal $A^{R2}$ in the ethylene interpolymer product may be 5.0 ppm, in other cases 4.0 ppm, and in still other cases 3.0 ppm; while the lower limit on the ppm of metal $A^{R2}$ in the ethylene interpolymer product may be 0.0012 ppm, in other cases 0.04 ppm, and in still other cases 0.06 ppm.

In embodiments where the ethylene interpolymer product contains a third ethylene interpolymer and different species of Component A (having different metals) were employed in R1, R2 and R3 (vessel 117 FIG. 7) the upper limit on the ppm of metal $A^{R2}$ in the ethylene interpolymer product may be 3.5 ppm, in other cases 2.5 ppm, and in still other cases 2.0 ppm; and the lower limit on the ppm of metal $A^{R2}$ in the ethylene interpolymer product may be 0.003 ppm, in other cases 0.01 ppm, and in still other cases 0.015 ppm.

In embodiments where the ethylene interpolymer product contained a third ethylene interpolymer and different species of Component A (having different metals) were employed in $R_1$, $R_2$ and $R_3$ the upper limit on the ppm of metal $A^{R3}$ in the ethylene interpolymer product may be 1.5 ppm, in other cases 1.25 ppm and in still other cases 1.0 ppm. In embodiments where an unbridged single site catalyst formulation, comprising metal $C^{R3}$, was injected into the tubular reactor the upper limit on the ppm of metal $C^{R3}$ in the ethylene interpolymer product may be 1.0 ppm, in other cases 0.8 ppm and in still other cases 0.5 ppm. In embodiments were a homogeneous catalyst formulation, comprising metal $B^{R3}$, was injected into the tubular reactor the upper limit on the ppm of metal $B^{R3}$ in the ethylene interpolymer product may be 1.5 ppm, in other cases 1.25 ppm and in still other cases 1.0 ppm. In embodiments were a heterogeneous catalyst formulation, comprising metal $Z^{R3}$, was injected into the tubular reactor the upper limit on the ppm of metal $Z^{R3}$ in the ethylene interpolymer product may be 3.5 ppm, in other cases 3 ppm and in still other cases 2.5 ppm. The lower limit on the ppm of metal $A^{R3}$, $C^{R3}$, $B^{R3}$ or $Z^{R3}$ in the ethylene interpolymer product was 0.0, i.e. a catalyst deactivator was added upstream of the tubular reactor (R3).

The upper limit on melt index of the ethylene interpolymer product may be 500 dg/min, in some cases 400 dg/min, in other cases, 300 dg/min, and, in still other cases 200 dg/min. The lower limit on the melt index of the ethylene interpolymer product may be 0.3 dg/min, in some cases 0.4 dg/min, in other cases, 0.5 dg/min and, in still other cases 0.6 dg/min.

Manufactured Articles

The ethylene interpolymer products disclosed herein may be converted into flexible manufactured articles such as monolayer or multilayer films. Non-limiting examples of processes to prepare such films include blown film processes, double bubble processes, triple bubble processes, cast film processes, tenter frame processes and machine direction orientation (MDO) processes.

In the blown film extrusion process an extruder heats, melts, mixes and conveys a thermoplastic, or a thermoplastic blend. Once molten, the thermoplastic is forced through an annular die to produce a thermoplastic tube. In the case of co-extrusion, multiple extruders are employed to produce a multilayer thermoplastic tube. The temperature of the extrusion process is primarily determined by the thermoplastic or thermoplastic blend being processed, for example the melting temperature or glass transition temperature of the thermoplastic and the desired viscosity of the melt. In the case of polyolefins, typical extrusion temperatures are from 330° F. to 550° F. (166° C. to 288° C.). Upon exit from the annular die, the thermoplastic tube is inflated with air, cooled, solidified and pulled through a pair of nip rollers. Due to air inflation, the tube increases in diameter forming a bubble of desired size. Due to the pulling action of the nip rollers the bubble is stretched in the machine direction. Thus, the bubble is stretched in two directions: the transverse direction (TD) where the inflating air increases the diameter of the bubble; and the machine direction (MD) where the nip rollers stretch the bubble. As a result, the physical properties of blown films are typically anisotropic, i.e. the physical properties differ in the MD and TD directions; for example, film tear strength and tensile properties typically differ in the MD and TD. In some prior art documents, the terms "cross direction" or "CD" is used; these terms are equivalent to the terms "transverse direction" or "TD" used in this disclosure. In the blown film process, air is also blown on the external bubble circumference to cool the thermoplastic as it exits the annular die. The final width of the film is determined by controlling the inflating air or the internal bubble pressure; in other words, increasing or decreasing bubble diameter. Film thickness is controlled primarily by increasing or decreasing the speed of the nip rollers to control the draw-down rate. After exiting the nip rollers, the bubble or tube is collapsed and may be slit in the machine direction thus creating sheeting. Each sheet may be wound into a roll of film. Each roll may be further slit to create film of the desired width. Each roll of film is further processed into a variety of consumer products as described below.

The cast film process is similar in that a single or multiple extruder(s) may be used; however, the various thermoplastic materials are metered into a flat die and extruded into a monolayer or multilayer sheet, rather than a tube. In the cast film process the extruded sheet is solidified on a chill roll.

In the double bubble process, a first blown film bubble is formed and cooled, then the first bubble is heated and re-inflated forming a second blown film bubble, which is subsequently cooled. The ethylene interpolymer products, disclosed herein, are also suitable for the triple bubble blown process. Additional film converting processes, suitable for the disclosed ethylene interpolymer products, include processes that involve a Machine Direction Orientation (MDO) step; for example, blowing a film or casting a film, quenching the film and then subjecting the film tube or film sheet to a MDO process at any stretch ratio. Additionally, the ethylene interpolymer product films disclosed herein are suitable for use in tenter frame processes as well as other processes that introduce biaxial orientation.

Depending on the end-use application, the disclosed ethylene interpolymer products may be converted into films that span a wide range of thicknesses. Non-limiting examples include, food packaging films where thicknesses may range from 0.5 mil (13 μm) to 4 mil (102 μm), and, in heavy duty sack applications film thickness may range from 2 mil (51 μm) to 10 mil (254 μm).

The monolayer, in monolayer films, may contain more than one ethylene interpolymer product and/or one or more additional polymer; non-limiting examples of additional polymers include ethylene polymers and propylene polymers. The lower limit on the weight percent of the ethylene interpolymer product in a monolayer film may be 3 wt. %, in other cases 10 wt. % and in still other cases 30 wt. %. The upper limit on the weight percent of the ethylene interpolymer product in the monolayer film may be 100 wt. %, in other cases 90 wt. % and in still other cases 70 wt. %.

The ethylene interpolymer products disclosed herein may also be used in one or more layers of a multilayer film; non-limiting examples of multilayer films include three, five, seven, nine, eleven or more layers. The disclosed ethylene interpolymer products are also suitable for use in processes that employ micro-layering dies and/or feedblocks, such processes can produce films having many layers, non-limiting examples include from 10 to 10,000 layers.

The thickness of a specific layer (containing the ethylene interpolymer product) within a multilayer film may be 5%, in other cases 15% and in still other cases 30% of the total multilayer film thickness. In other embodiments, the thickness of a specific layer (containing the ethylene interpolymer product) within a multilayer film may be 95%, in other cases 80%, and in still other cases 65% of the total multilayer film thickness. Each individual layer of a multilayer film may contain more than one ethylene interpolymer product and/or additional thermoplastics.

Additional embodiments include laminations and coatings, wherein mono or multilayer films containing the disclosed ethylene interpolymer products are extrusion laminated or adhesively laminated or extrusion coated. In extrusion lamination or adhesive lamination, two or more substrates are bonded together with a thermoplastic or an adhesive, respectively. In extrusion coating, a thermoplastic is applied to the surface of a substrate. These processes are well known to those experienced in the art. Frequently, adhesive lamination or extrusion lamination are used to bond dissimilar materials, non-limiting examples include the bonding of a paper web to a thermoplastic web, or the bonding of an aluminum foil containing web to a thermoplastic web, or the bonding of two thermoplastic webs that are chemically incompatible, e.g. the bonding of an ethylene interpolymer product containing web to a polyester or polyamide web. Prior to lamination, the web containing the disclosed ethylene interpolymer product(s) may be monolayer or multilayer. Prior to lamination the individual webs may be surface treated to improve the bonding, a non-limiting example of a surface treatment is corona treating. A primary web or film may be laminated on its upper surface, its lower surface, or both its upper and lower surfaces with a secondary web. A secondary web and a tertiary web could be laminated to the primary web; wherein the secondary and tertiary webs differ in chemical composition. As non-limiting examples, secondary or tertiary webs may include polyamide, polyester and polypropylene, or webs containing barrier resin layers such as EVOH. Such webs may also contain a vapor deposited barrier layer; for example, a thin silicon oxide ($SiO_x$) or aluminum oxide ($AlO_x$) layer. Multilayer webs (or films) may contain three, five, seven, nine, eleven or more layers.

The ethylene interpolymer products disclosed herein can be used in a wide range of manufactured articles comprising one or more films (monolayer or multilayer). Non-limiting examples of such manufactured articles include: food packaging films (fresh and frozen foods, liquids and granular foods), stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction oriented (MDO) films, biaxially oriented films and functional film layers in oriented polypropylene (OPP) films, e.g. sealant and/or toughness layers. Additional manufactured articles comprising one or more films containing at least one ethylene interpolymer product include laminates and/or multilayer films; sealants and tie layers in multilayer films and composites; laminations with paper; aluminum foil laminates or laminates containing vacuum deposited aluminum; polyamide laminates; polyester laminates; extrusion coated laminates; and hot-melt adhesive formulations. The manufactured articles summarized in this paragraph contain at least one film (monolayer or multilayer) comprising at least one embodiment of the disclosed ethylene interpolymer products.

Desired film physical properties (monolayer or multilayer) typically depend on the application of interest. Non-limiting examples of desirable film properties include: optical properties (gloss, haze and clarity), dart impact, Elmendorf tear, modulus (1% and 2% secant modulus), tensile properties (yield strength, break strength, elongation at break, toughness, etc.), heat sealing properties (heat seal initiation temperature, SIT, and hot tack). Specific hot tack and heat sealing properties are desired in high speed vertical and horizontal form-fill-seal processes that load and seal a commercial product (liquid, solid, paste, part, etc.) inside a pouch-like package.

In addition to desired film physical properties, it is desired that the disclosed ethylene interpolymer products are easy to process on film lines. Those skilled in the art frequently use the term "processability" to differentiate polymers with improved processability, relative to polymers with inferior processability. A commonly used measure to quantify processability is extrusion pressure; more specifically, a polymer with improved processability has a lower extrusion pressure (on a blown film or a cast film extrusion line) relative to a polymer with inferior processability.

The ethylene interpolymer products disclosed herein have improved bubble stability, e.g. relative to the Comparative 1 products disclosed herein. Improved bubble stability allows one to produce mono or multilayer films at higher production rates. Melt strength, measured in centi-Newtons (cN), is frequently used as a measure of bubble stability, i.e. the higher the melt strength the higher the bubble stability. As shown in Table 5A and 5B, Example 1 (4.56 cN) and Example 2 (3.2 cN) have higher melt strengths relative to Comparative 15 (2.78 cN) and Comparative 16 (3.03). In other words, the ethylene interpolymer products disclosed herein have an improved melt strength of from 65% to 25%, relative to comparatives.

The films used in the manufactured articles described in this section may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents, and combinations thereof.

The processes disclosed herein are also capable of making ethylene interpolymer products that have a useful combination of desirable physical properties for use in rigid applications or rigid articles. Non-limiting examples of rigid articles include: deli containers, margarine tubs, drink cups and produce trays; household and industrial containers, cups, bottles, pails, crates, tanks, drums, bumpers, lids, industrial bulk containers, industrial vessels, material handling containers, bottle cap liners, bottle caps, living hinge closures; toys, playground equipment, recreational equipment, boats, marine and safety equipment; wire and cable applications such as power cables, communication cables and conduits; flexible tubing and hoses; pipe applications including both pressure pipe and non-pressure pipe markets, e.g. natural gas distribution, water mains, interior plumbing, storm sewer, sanitary sewer, corrugated pipes and conduit; foamed articles manufactured from foamed sheet or bun foam; military packaging (equipment and ready meals); personal care packaging, diapers and sanitary products; cosmetic, pharmaceutical and medical packaging; and truck bed liners, pallets and automotive dunnage. The rigid manufactured articles summarized in this paragraph contain one or more of the ethylene interpolymer products disclosed herein or a blend of at least one of the ethylene interpolymer products disclosed herein with at least one other thermoplastic.

Such rigid manufactured articles may be fabricated using the following non-limiting processes: injection molding, compression molding, blow molding, rotomolding, profile extrusion, pipe extrusion, sheet thermoforming and foaming processes employing chemical or physical blowing agents.

The desired physical properties of rigid manufactured articles depend on the application of interest. Non-limiting examples of desired properties include: flexural modulus (1% and 2% secant modulus); tensile toughness; environmental stress crack resistance (ESCR); slow crack growth resistance (PENT); abrasion resistance; shore hardness; deflection temperature under load; VICAT softening point; IZOD impact strength; ARM impact resistance; Charpy impact resistance, and; color (whiteness and/or yellowness index).

The rigid manufactured articles described in this section may optionally include, depending on its intended use, additives and adjuvants. Non-limiting examples of additives and adjuvants include, antioxidants, slip agents, processing aids, anti-static additives, colorants, dyes, filler materials, heat stabilizers, light stabilizers, light absorbers, lubricants, pigments, plasticizers, nucleating agents and combinations thereof.

Additional Embodiments

The following paragraphs disclose additional embodiments of the disclosed ethylene interpolymer products.

An ethylene interpolymer product comprising: (i) a first ethylene interpolymer; (ii) a second ethylene interpolymer; and (iii) optionally a third ethylene interpolymer; wherein said ethylene interpolymer product has: a) a dimensionless nonlinear rheology network parameter, $\Delta_{int.}$, greater than or equal to 0.01, satisfying the inequality $[0.01\times(Z-48)^{0.78}\leq\Delta_{int.}\leq0.01\times(Z-60)^{0.78}]$ wherein Z is a normalized molecular weight defined by $M_w/M_e$ where $M_W$ and $M_e$ are the weight average molecular weight and molecular weight between entanglements of said ethylene interpolymer, respectively; and b) a residual catalytic metal of from 0.03 to ≤5 ppm of hafnium, in said ethylene interpolymer product. Other embodiments of the ethylene interpolymer products described in this paragraph may have a melt index from about 0.3 to about 500 dg/minute, a density from about 0.855 to about 0.975 g/cc, a $M_w/M_n$ from about 1.7 to about 25 and a $CDBI_{50}$ from about 1% to about 98%. Other embodiments of the ethylene interpolymer products described in this paragraph may contain: from 5 to 60 weight percent of the first ethylene interpolymer having a melt index from 0.01 to 200 dg/min and a density of 0.855 g/cc to 0.975 g/cc; from 20 to 95 weight percent of the second ethylene interpolymer having a melt index from 0.3 to 1000 dg/min and a density of 0.855 g/cc to 0.975 g/cc; and optionally from 0 to 30 weight percent of the third ethylene interpolymer having a melt index from 0.5 to 2000 dg/min and a density of 0.855 g/cc to 0.975 g/cc; where weight percent is the weight of said first, said second or said optional third ethylene interpolymer, individually, divided by the weight of said ethylene interpolymer product. Other embodiments of the ethylene interpolymer products described in this paragraph may contain from 0 to about 25 mole percent of one or more α-olefin; non-limiting examples of α-olefins include $C_3$ to $C_{10}$α-olefins. Other embodiments of the ethylene interpolymer products may be manufactured in a solution polymerization process. The first and second ethylene interpolymers, in the ethylene interpolymer products of this paragraph, may be synthesized using a bridged metallocene catalyst formulation that comprises a Component A defined by Formula (I)

(I)

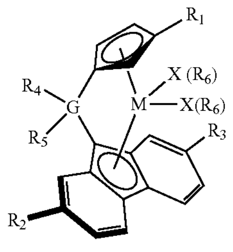

wherein M is a metal selected from titanium, hafnium and zirconium; G is the element carbon, silicon, germanium, tin or lead; X represents a halogen atom, $R_6$ groups are independently selected from a hydrogen atom, a $C_{1-20}$ hydrocarbyl radical, a $C_{1-20}$ alkoxy radical or a $C_{6-10}$ aryl oxide radical, these radicals may be linear, branched or cyclic or further substituted with halogen atoms, $C_{1-10}$ alkyl radicals, $C_{1-10}$ alkoxy radicals, $C_{6-10}$ aryl or aryloxy radicals; $R_1$ represents a hydrogen atom, a $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical; and $R_4$ and $R_5$ are independently selected from a hydrogen atom, a $C_{1-20}$ hydrocarbyl radial, a $C_{1-20}$ alkoxy radical or a $C_{6-10}$ aryl oxide radical. The bridged metallocene catalyst formulation may further comprise: a component M, comprising an alumoxane co-catalyst; a component B, comprising a boron ionic activator, and, optionally, a component P, comprising a hindered phenol. The optional third ethylene interpolymer may be synthesized using a homogeneous catalyst formulation or a heterogeneous catalyst formulation; non-limiting examples of homogeneous catalyst formulations include bridged metallocene catalyst formulations or unbridged single site catalyst formulations; non-limiting examples of heterogeneous catalyst formulations include in-line Ziegler-Natta catalyst formulations or batch Ziegler-Natta catalyst formulations. Optionally a heterogeneous catalyst formulation comprising metal $Z^{R3}$ may be injected into the tubular reactor, in this case embodiments of ethylene interpolymer products may contain from 0.1 to 3.5 ppm of metal $Z^{R3}$.

Other embodiments include: a continuous solution polymerization process comprising: i) injecting ethylene, a process solvent, a bridged metallocene catalyst formulation, optionally one or more α-olefins and optionally hydrogen into a first reactor to produce a first exit stream containing a first ethylene interpolymer in said process solvent; ii) passing said first exit stream into a second reactor and injecting into said second reactor, ethylene, said process solvent, said bridged metallocene catalyst formulation, optionally one or more α-olefins and optionally hydrogen to produce a second exit stream containing a second ethylene interpolymer and said first ethylene interpolymer in said process solvent; iii) passing said second exit stream into a third reactor and optionally injecting into said third reactor, ethylene, process solvent, one or more α-olefins, hydrogen and a homogeneous catalyst formulation or a heterogeneous catalyst formulation to produce a third exit stream containing an third ethylene interpolymer, said second ethylene interpolymer and said first ethylene interpolymer in said process solvent; iv) phase separating said third exit stream to recover an ethylene interpolymer product comprising said first ethylene interpolymer, said second ethylene interpolymer and said optional third ethylene interpolymer; where said continuous solution polymerization process is improved by having (a) and/or (b):

(a) at least a 70% reduced [α-olefin/ethylene] weight ratio as defined by the following formula:

$$\% \text{ Reduced } \left[\frac{\alpha-\text{olefin}}{\text{ethylene}}\right] = 100 \times \left\{ \frac{\left(\frac{\alpha-\text{olefin}}{\text{ethylene}}\right)^A - \left(\frac{\alpha-\text{olefin}}{\text{ethylene}}\right)^C}{\left(\frac{\alpha-\text{olefin}}{\text{ethylene}}\right)^C} \right\} \leq -70\%$$

wherein (α-olefin/ethylene)$^A$ is calculated by dividing the weight of said α-olefin added to said first reactor by the weight of said ethylene added to said first reactor, wherein said first ethylene interpolymer having a target density is produced by said bridged metallocene catalyst formulation; and (α-olefin/ethylene)$^C$ is calculated by dividing the weight of said α-olefin added to said first reactor by the weight of said ethylene added to said first reactor, wherein a control ethylene interpolymer having said target density is produced by replacing said bridged metallocene catalyst formulation with an unbridged single site catalyst formulation;

(b) at least a 5% improved weight average molecular weight as defined by the following formula:

$$\% \text{ Improved } M_w = 100\% \times (M_w^A - M_w^C)/M_w^C \geq 10\%$$

wherein $M_W{}^A$ is a weight average molecular weight of said first ethylene interpolymer and $M_w{}^C$ is a weight average molecular weight of a comparative ethylene interpolymer; wherein said comparative ethylene interpolymer is produced in said first reactor by replacing said bridged metallocene catalyst formulation with said unbridged single site catalyst formulation. Additional steps of this process may comprise: a) optionally adding a catalyst deactivator A to said second exit stream, downstream of said second reactor, forming a deactivated solution A; b) adding a catalyst deactivator B to said third exit stream, downstream of said third reactor, forming a deactivated solution B; with the proviso that step b) is skipped if said catalyst deactivator A is added in step a); c) phase separating said deactivated solution A or B to recover said ethylene interpolymer product. If a heterogeneous catalyst formulation was added to the third reactor, additional process steps may comprise: d) adding a passivator to said deactivated solution A or B forming a passivated solution, with the proviso that step d) is skipped if said heterogeneous catalyst formulation is not added to said third reactor; and e) phase separating said deactivated solution A or B, or said passivated solution, to recover said ethylene interpolymer product. The bridged metallocene catalyst formulation may comprise: a bulky ligand-metal complex 'Component A'; a component M, comprising an alumoxane co-catalyst; a component B, comprising a boron ionic activator, and; optionally, a component P, comprising a hindered phenol; wherein the following mole ratios may be employed: a molar ratio of said component B to said component A from about 0.3:1 to about 10:1; a molar ratio of said component M to said component A from about 1:1 to about 300:1, and; a molar ratio of said optional component P to said component $M^A$ from 0.0:1 to about 1:1. Non-limiting examples of components M, B and P include: methylalumoxane (MMAO-7); trityl tetrakis (pentafluorophenyl) borate; and 2,6-di-tert-butyl-4-ethylphenol, respectively. The process may further comprise the injection of said bridged metallocene catalyst formulation into said first reactor and optionally said second reactor at a catalyst inlet temperature from about 20° C. to about 70° C.; optionally, said component M and said component P may be deleted from said bridged metallocene catalyst formulation and replaced with a component J defined by the formula $Al(R^1)_n(OR^2)_o$, wherein the ($R^1$) groups may be the same or different hydrocarbyl groups having from 1 to 10 carbon atoms; the ($OR^2$) groups may be the same or different, alkoxy or aryloxy groups, wherein $R^2$ is a hydrocarbyl group having from 1 to 10 carbon atoms bonded to oxygen, and; (n+o)=3, with the proviso that n is greater than 0. Optionally, said bridged metallocene catalyst formulation may be injected into said reactors at a catalyst inlet temperature from 80° C. to 180° C. Optionally said homogeneous catalyst formulation injected into said third reactor is said bridged metallocene formulation, said single site catalyst formulation, or a homogeneous catalyst formulation wherein the bulky metal-ligand complex is not a member of the genera defined by Formula (I) or (II). Optionally, said heterogeneous catalyst formulation injected into said third reactor is an in-line Ziegler-Natta catalyst formulation or a batch Ziegler-Natta catalyst formulation. The in-line Ziegler-Natta catalyst formulation is formed in an in-line process comprising: i) forming a first product mixture in an in-line heterogeneous catalyst assembly by combining a stream S1 and a stream S2 and allowing said first product mixture to equilibrate for a HUT-1 seconds; wherein said stream S1 comprises a magnesium compound and an aluminum alkyl in said process solvent and said stream S2 comprises a chloride compound in said process solvent; ii) forming a second product mixture in said in-line heterogeneous catalyst assembly by combining said first product mixture with a stream S3 and allowing said second product mixture to equilibrate for a HUT-2 seconds; wherein said stream S3 comprises a metal compound in said process solvent; iii) forming said in-line Ziegler-Natta catalyst formulation in said in-line heterogeneous catalyst assembly by combining said second product mixture with a stream S4 and allowing said in-line Ziegler-Natta catalyst formulation to equilibrate for a HUT-3 seconds prior to injection into said third reactor, wherein said stream S4 comprises an alkyl aluminum co-catalyst in said process solvent; iv) optionally, step iii) is skipped and said in-line Ziegler-Natta catalyst formulation is formed inside said third reactor; wherein, said second product mixture is equilibrated for an additional HUT-3 seconds and injected into said third reactor and said stream S4 is independently injected into said third reactor. Typical Hold-Up-Times include: said HUT-1 is from about 5 seconds to about 70 seconds, said HUT-2 is from about 2 seconds to about 50 seconds and said HUT-3 is from about 0.5 to about 15 seconds; and said in-line Ziegler-Natta catalyst formulation and optionally said second product mixture are injected at a catalyst inlet temperature from about 20° C. to about 70° C. The in-line Ziegler-Natta catalyst formulation may comprise: i) said magnesium compound is defined by the formula $Mg(R^1)_2$, wherein the $R^1$ groups may be the same or different; ii) said aluminum alkyl is defined by the formula $Al(R^3)_3$, wherein the $R^3$ groups may be the same or different; iii) said chloride compound is defined by the formula $R^2Cl$; iv) said metal compound is defined by the formulas $M(X)_n$ or $MO(X)_n$, wherein M represents titanium, zirconium, hafnium, vanadium, niobium, tantalum, chromium, molybdenum, tungsten, manganese, technetium, rhenium, iron, ruthenium, osmium or mixtures thereof, 0 represents oxygen, X represents chloride or bromide and n is an integer that satisfies the oxidation state of the metal M; and v) said alkyl aluminum co-catalyst is defined by the formula $Al(R^4)_p(OR^5)_q(X)_r$, wherein the $R^4$ groups may be the same or different, the $OR^5$ groups may be the same or different and (p+q+r)=3, with the proviso that p is greater than 0; wherein $R^1$, $R^2$, $R^3$, $R^4$ and $R^5$ represent hydrocarbyl groups having from 1 to 10 carbon atoms; optionally $R^2$ may be a hydrogen atom. The in-line Ziegler-Natta catalyst formulation may comprise: a molar ratio of said aluminum alkyl to said magnesium compound in said third reactor from 3.0:1 to 70:1; a molar ratio of said chloride compound to said magnesium compound in said third reactor from 1.0:1 to 4.0:1; a molar ratio of said alkyl aluminum co-catalyst to said metal compound in said third reactor from 0:1 to 10:1, and; a molar ratio of said aluminum alkyl to said metal compound in said third reactor from 0.05:1 to 2:1. In the process embodiment described in this paragraph: the process solvent may be one or more $C_5$ to $C_{12}$ alkanes; said first, second and third reactors may operate at temperatures from 80° C. to 300° C., and; pressures from 3 MPag to 45 MPag. The process solvent in said first reactor has an average reactor residence time from about 10 seconds to about 600 seconds and said process solvent in said second reactor has an average reactor residence time from about 10 seconds to about 720 seconds. The process may also have a reactor temperature difference ($T^{R2}$-$T^{R1}$) ranging from 1° C. to 120° C.; wherein $T^{R2}$ is the temperature of the solution in said second reactor and $T^{R1}$ is the temperature of the solution in said first reactor. Said optional α-olefins may be one or more of $C_3$ to $C_{10}$α-olefins. Ethylene interpolymer products may be produced employing embodiments of the solution polymerization process disclosed in this paragraph.

Other embodiments include: a continuous solution polymerization process comprising: i) injecting ethylene, a process solvent, a bridged metallocene catalyst formulation, optionally one or more α-olefins and optionally hydrogen into a first reactor to produce a first exit stream containing a first ethylene interpolymer in said process solvent; ii) injecting ethylene, said process solvent, said bridged metallocene catalyst formulation, optionally one or more α-olefins and optionally hydrogen into a second reactor to produce a second exit stream containing a second ethylene interpolymer in said process solvent; iii) combining said first and said second exit streams to form a third exit stream; iv) passing said third exit stream into a third reactor and optionally injecting into said third reactor, ethylene, process solvent, one or more α-olefins, hydrogen and a homogeneous catalyst formulation or a heterogeneous catalyst formulation to produce a fourth exit stream containing an optional third ethylene interpolymer, said second ethylene interpolymer and said first ethylene interpolymer in said process solvent; v) phase separating said fourth exit stream to recover an ethylene interpolymer product comprising said first ethylene interpolymer, said second ethylene interpolymer and said optional third ethylene interpolymer; wherein, said continuous solution polymerization process is improved by having one or more of the following, i.e. (a) and/or (b):

(a) at least an 70% reduced [α-olefin/ethylene] weight ratio as defined by the following formula:

$$\%\ \text{Reduced}\left[\frac{\alpha-\text{olefin}}{\text{ethylene}}\right]=100\times\left\{\frac{\left(\frac{\alpha-\text{olefin}}{\text{ethylene}}\right)^{A}-\left(\frac{\alpha-\text{olefin}}{\text{ethylene}}\right)^{C}}{\left(\frac{\alpha-\text{olefin}}{\text{ethylene}}\right)^{C}}\right\}\leq-70\%$$

wherein (α-olefin/ethylene)$^A$ is calculated by dividing the weight of said α-olefin added to said first reactor by the weight of said ethylene added to said first reactor, wherein said first ethylene interpolymer having a target density is produced by said bridged metallocene catalyst formulation; and (α-olefin/ethylene)$^C$ is calculated by dividing the weight of said α-olefin added to said first reactor by the weight of said ethylene added to said first reactor, wherein a control ethylene interpolymer having said target density is produced by replacing said bridged metallocene catalyst formulation with an unbridged single site catalyst formulation;

(b) at least a 5% improved weight average molecular weight as defined by the following formula:

$$\%\ \text{Improved}\ M_w = 100\%\ x\ (M_w^A - M_w^C)/M_w^C \geq 5\%$$

wherein $M_W^A$ is a weight average molecular weight of said first ethylene interpolymer and $M_w^C$ is a weight average molecular weight of a comparative ethylene interpolymer; wherein said comparative ethylene interpolymer is produced in said first reactor by replacing said bridged metallocene catalyst formulation with said unbridged single site catalyst formulation.

Additional steps of this process may comprise: a) optionally adding a catalyst deactivator A to said third exit stream, downstream of said second reactor, forming a deactivated solution A; b) adding a catalyst deactivator B to said fourth exit stream, downstream of said third reactor, forming a deactivated solution B; with the proviso that step b) is skipped if said catalyst deactivator A is added in step a); c) phase separating said deactivated solution A or B to recover said ethylene interpolymer product. If a heterogeneous catalyst formulation was added to the third reactor, additional process steps may comprise: d) adding a passivator to said deactivated solution A or B forming a passivated solution, with the proviso that step d) is skipped if said heterogeneous catalyst formulation is not added to said third reactor; and e) phase separating said deactivated solution A or B, or said passivated solution, to recover said ethylene interpolymer product. Ethylene interpolymer products may be produced employing embodiments of the solution polymerization process disclosed in this paragraph.

Testing Methods

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Ethylene interpolymer product densities were determined using ASTM D792-13 (Nov. 1, 2013).

Melt Index

Ethylene interpolymer product melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship:

$$S.Ex. = \log\left(I_6/I_2\right)/\log\left(6480/2160\right)$$

wherein $I_6$ and $I_2$ are the melt flow rates measured at 190° C. using 6.48 kg and 2.16 kg loads, respectively.

Conventional Size Exclusion Chromatoqraphy (SEC)

Ethylene interpolymer product samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Polymer solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect SEC columns from oxidative degradation. The sample injection volume was 200 PL. The SEC columns were calibrated with narrow distribution polystyrene standards. The polystyrene molecular weights were converted to polyethylene molecular weights using the Mark-Houwink equation, as described in the ASTM standard test method D6474-12 (December 2012). The SEC raw data were processed with the Cirrus GPC software, to produce molar mass averages ($M_n$, $M_W$, $M_z$) and molar mass distribution (e.g. Polydispersity, $M_w/M_n$). In the polyethylene art, a commonly used term that is equivalent to SEC is GPC, i.e. Gel Permeation Chromatography.

GPC-FTIR

Ethylene interpolymer product (polymer) solutions (2 to 4 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a Waters GPC 150C chromatography unit equipped with four Shodex columns (HT803, HT804, HT805 and HT806) using TCB as the mobile phase with a flow rate of 1.0 mL/minute, with a FTIR spectrometer and a heated FTIR flow through cell coupled with the chromatography unit through a heated transfer line as the detection system. BHT was added to the mobile phase at a concentration of 250 ppm to protect SEC columns from oxidative degradation. The sample injection volume was 300 μL. The raw FTIR spectra were processed with OPUS FTIR software and the polymer concentration and methyl content were calculated in real time with the Chemometric Software (PLS technique) associated with the OPUS. Then the polymer concentration and methyl content were acquired and baseline-corrected with the CIRRUS GPC software. The SEC columns were calibrated with narrow distribution polystyrene standards. The polystyrene molecular weights were converted to polyethylene molecular weights using the Mark-Houwink equation, as described in the ASTM standard test method D6474. The comonomer content was calculated based on the polymer concentration and methyl content predicted by the PLS technique as described in Paul J. DesLauriers, Polymer 43, pages 159-170 (2002); herein incorporated by reference.

The GPC-FTIR method measures total methyl content, which includes the methyl groups located at the ends of each macromolecular chain, i.e. methyl end groups. Thus, the raw GPC-FTIR data must be corrected by subtracting the contribution from methyl end groups. To be more clear, the raw GPC-FTIR data overestimates the amount of short chain branching (SCB) and this overestimation increases as molecular weight (M) decreases. In this disclosure, raw GPC-FTIR data was corrected using the 2-methyl correction. At a given molecular weight (M), the number of methyl end groups (NE) was calculated using the following equation; $N_E$=28000/M, and $N_E$ (M dependent) was subtracted from the raw GPC-FTIR data to produce the SCB/1000C (2-Methyl Corrected) GPC-FTIR data.

Composition Distribution Branching Index (CDBI)

The "Composition Distribution Branching Index", hereinafter CDBI, of the disclosed Examples and Comparative Examples were measured using a CRYSTAF/TREF 200+ unit equipped with an IR detector, hereinafter the CTREF. The acronym "TREF" refers to Temperature Rising Elution Fractionation. The CTREF was supplied by PolymerChar S.A. (Valencia Technology Park, Gustave Eiffel, 8, Paterna, E-46980 Valencia, Spain). The CTREF was operated in the TREF mode, which generates the chemical composition of the polymer sample as a function of elution temperature, the Co/Ho ratio (Copolymer/Homopolymer ratio) and the CDBI (the Composition Distribution Breadth Index), i.e. $CDBI_{50}$ and $CDBI_{25}$. A polymer sample (80 to 100 mg) was placed into the reactor vessel of the CTREF. The reactor vessel was filled with 35 ml of 1,2,4-trichlorobenzene (TCB) and the polymer was dissolved by heating the solution to 150° C. for 2 hours. An aliquot (1.5 mL) of the solution was then loaded into the CTREF column which was packed with stainless steel beads. The column, loaded with sample, was allowed to stabilize at 110° C. for 45 minutes. The polymer was then crystallized from solution, within the column, by dropping the temperature to 30° C. at a cooling rate of 0.09° C./minute. The column was then equilibrated for 30 minutes at 30° C. The crystallized polymer was then eluted from the column with TCB flowing through the column at 0.75 mL/minute, while the column was slowly heated from 30° C. to 120° C. at a heating rate of 0.25° C./minute. The raw CTREF data were processed using Polymer Char software, an Excel spreadsheet and CTREF software developed in-house. $CDBI_{50}$ was defined as the percent of polymer whose composition is within 50% of the median comonomer (α-olefin) composition; $CDBI_{50}$ was calculated from the composition distribution curve and the normalized cumulative integral of the composition distribution curve, as described in U.S. Pat. No. 5,376,439.

Those skilled in the art will understand that a calibration curve is required to convert a CTREF elution temperature to comonomer content, i.e. the amount of comonomer in the ethylene/α-olefin polymer fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference. $CDBI_{25}$ as calculated in a similar manner; $CDBI_{25}$ is defined as the percent of polymer whose composition is with 25% of the median comonomer composition. At the end of each sample run, the CTREF column was cleaned for 30 minutes; specifically, with the CTREF column temperature at 160° C., TCB flowed (0.75 mL/minute) through the column for 30 minutes. CTREF deconvolutions were performed to determine the amount of branching (BrF (#C6/1000C)) and density of the first ethylene interpolymer using the following equations: BrF (#C6/1000C)=74.29-0.7598 (TPCTREF), where TPCTREF is the peak elution temperature of the first ethylene interpolymer in the CTREF chromatogram, and BrF (#C6/1000C)=9341.8 $(\rho^1)^2$-17766 $(\rho^1)$+8446.8, where $\rho^1$ was the density of the first ethylene interpolymer. The BrF (#C6/1000C) and density of the second ethylene interpolymer was determined using blending rules, given the overall BrF (#C6/1000C) and density of the ethylene interpolymer product. The BrF (#C6/1000C) and density of the second and third ethylene interpolymer was assumed to be the same.

Neutron Activation (Elemental Analysis)

Neutron Activation Analysis, hereinafter N.A.A., was used to determine catalyst residues in ethylene interpolymer products as follows. A radiation vial (composed of ultrapure polyethylene, 7 mL internal volume) was filled with an ethylene interpolymer product sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and Cl) or 3 to 5 hours for long half-life elements (e.g. Zr, Hf, Cr, Fe and Ni). The average thermal neutron flux within the reactor was $5\times10^{11}/cm^2/s$. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (Ortec model GEM55185, Advanced Measurement Technology Inc., Oak Ridge, TN, USA) and a multichannel analyzer (Ortec model DSPEC Pro). The amount of each element in the sample was calculated from the gamma-ray spectrum and recorded in parts per million, relative to the total weight of the ethylene interpolymer product sample. The N.A.A. system was calibrated with Specpure standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the N.A.A. system. Standards are used to determine the sensitivity of the N.A.A. procedure (in counts/pg).

Unsaturation

The quantity of unsaturated groups, i.e. double bonds, in an ethylene interpolymer product was determined according to ASTM D3124-98 (published March 2011) and ASTM D6248-98 (published July 2012). An ethylene interpolymer product sample was: a) first subjected to an overnight carbon disulfide extraction to remove additives that may interfere with the analysis; b) the sample (pellet, film or granular form) was pressed into a plaque of uniform thickness (0.5 mm); and c) the plaque was analyzed by FTIR to quantify the amount of terminal (vinyl) and internal unsaturation (trans-vinylene), and; d) the sample plaque was brominated and reanalyzed by FTIR to quantify the amount of side chain unsaturation (vinylidene). The IR resonances of these groups appear at 908 $cm^{-1}$, 965 $cm^{-1}$ and 888 $cm^{-1}$, respectively. The procedure is based on Beer's Law: A=abdc, where a is the extinction coefficient for the specific unsaturation being measured, b is the plaque thickness, d the plaque density and c the selected unsaturation. Experimentally, the weight and area of the plaque are measured rather than the density and the thickness.

Comonomer (α-Olefin) Content: Fourier Transform Infrared (FTIR) Spectroscopy

The quantity of comonomer in an ethylene interpolymer product was determine by FTIR and reported as the Short Chain Branching (SCB) content having dimensions of $CH_3$ #/1000C (number of methyl branches per 1000 carbon atoms). This test was completed according to ASTM D6645-01 (2001), employing a compression molded polymer plaque and a Thermo-Nicolet 750 Magna-IR Spectrophotometer. The polymer plaque was prepared using a compression molding device (Wabash-Genesis Series press) according to ASTM D4703-16 (April 2016).

Linear Melt Rheoloqy

Oscillatory shear measurements under small strain-amplitudes were carried out to obtain linear viscoelastic functions at 190° C. under $N_2$ atmosphere, at a strain amplitude of 10% and over a frequency range of 0.02-126 rad/s at 5 points per decade. Frequency sweep experiments were performed with a TA Instruments DHR3 stress-controlled rheometer using a cone-plate geometry with a cone angle of 5°, a truncation of 137 μm and a diameter of 25 mm. In this experiment a sinusoidal strain-wave was applied, and the stress-wave response was analyzed in terms of linear viscoelastic functions, i.e. complex viscosity, complex modulus, etc. The zero-shear rate viscosity ($\eta_0$) based on the linear regime frequency sweep results was predicted by Ellis model (see R. B. Bird et al. "Dynamics of Polymer Liquids. Volume 1: Fluid Mechanics" Wiley-Interscience Publications (1987) p.228) or Carreau-Yasuda model (see K. Yasuda (1979) PhD Thesis, IT Cambridge). In this disclosure the onset of shear thinning, c ($s^{-1}$), was determined by fitting the three parameter Ellis model ($\eta_0$, $\tau$ and n) to the magnitude of complex viscosity ($|\eta^*|$) versus angular frequency ($\omega$) data at 190° C.; i.e. $|\eta^*|=\eta_0/(1+(\omega/\tau)^{(n-1)})$.

The Flow Activation Energy (FAE) having dimensions of kJ/mol was also determined. The Anton Paar MCR501 rotational rheometer was used to generate the data from which the FAE was calculated; specifically, the melt-state complex viscosity versus angular frequency in a linear regime (from 0.05 to 100 rad/s at 7 data points per decade at a strain-amplitude of 5%) at four different temperatures (160, 175, 190 and 205° C.) were measured. Using 190° C. as the reference temperature, a time-temperature-superposition shift was carried out to obtain the shift factors. The FAE of each sample was calculated using TTS (time-temperature superposition) shifting of the complex viscosity curves and Arrhenius equation fitting on horizontal shift factors of each temperature with RheoPlus and Orchestrator software (see Markovitz, H., "Superposition in Rheology", J. Polym. Sci., Polymer Symposium Series 50, pp 431-456, 1975).

Nonlinear Melt Rheoloqy

Nonlinear melt rheology was measured at 190° C. under nitrogen atmosphere, at an angular frequency of 0.1 rad/s, at a strain-amplitude range of 1 and 1000% and at a gap-size of 1 mm using a 25 mm stainless parallel-plate geometry. Multiple gap-size measurements indicated that these test conditions can generate a nearly instability-free stress signal suitable for further analysis. In this disclosure, the disentanglement kinetics of PE melts under a strong oscillatory shear flow was studied towards developing a very sensitive, $M_W$- and MWD-independent intracycle nonlinear viscoelasticity parameter capable of detecting presence of LCB species in ethylene/alpha-olefin interpolymers. The intracycle nonlinear function, INF (dimensionless), was determined experimentally for linear or long-chain branched ethylene interpolymers according to Journal of Rheology 2008, 52, pp 1427-1458 using RheoCompass 1.17 software.

The LCB characterization method described in this disclosure mainly relies on a nonlinear rheology method amplifying subtle differences in the kinetics of entanglements dissociation in the melt-state in linear and LCB ethylene interpolymer compositions under a strong oscillatory shear-field. The following is a step-by-step procedure enabling a skilled technician in the area of rheological testing and rheological data analysis to complete the test and determine presence of long chain branched structures in an ethylene interpolymer product.

Step 1

A pre-compression molded disk of the ethylene interpolymer with a thickness of about 1.9-2 mm is loaded on the rheometer lower plate at a temperature close to 190° C. After reaching thermal equilibrium at 190° C., the upper plate is lowered squeezing the molten polymer at a rate of 1000 to 100 μm/s not exceeding a normal force of 40 N. The upper plate is lowered to a vertical position 30 μm above the testing gap-height and the excess molten sample is trimmed and the gap is lowered to the testing position of 1 mm. The temperature is then kept constant to reach thermal equilibrium at 190±0.1° C. The melt-state sample is then subjected to an oscillating strain-wave at a fixed angular frequency and temperature with a step-wise increasing strain-amplitude from a lower limit strain-amplitude to an upper limit strain-amplitude to obtain a stress-wave response and corresponding viscous Lissajous-Bowditch loop (i.e. stress versus strain-rate loops; the insets in FIGS. 3 and 4) at each strain-amplitude level. Twenty-two equidistantly spaced strain-amplitude values within the range of 1 to 1000% were applied at an angular frequency of 0.1 rad/s.

Step 2

The Intracycle nonlinear function, INF, is determined experimentally using the instantaneous dynamic viscosities at maximum strain-rate ($\eta'_L$) and at minimum strain-rate ($\eta'_M$) in the viscous Lissajous-Bowditch loop at each strain-amplitude level using $$INF = \frac{\eta'_L - \eta'_M}{\eta'_L}$$

(INF is dimensionless) by a rheology data processing software (Anton Paar RheoCompass 1.17 in this disclosure). The instantaneous dynamic viscosities at maximum strain-rate ($\eta'_L$) and at minimum strain-rate ($\eta'_M$) in a viscous Lissajous-Bowditch loop at a certain strain-amplitude level can be obtained by the stress decomposition method introduced in Journal of rheology 2005, 49, pp 747-758 and by fitting the Chebyshev polynomials of the first kind to the viscous stress response of tested linear or long-chain branched ethylene interpolymers as described in Journal of Rheology 2008, 52, pp 1427-1458. In the insets in FIGS. 3 and 4, the obtained instantaneous dynamic viscosities at maximum strain-rate ($\eta'_L$) and at minimum strain-rate ($\eta'_M$) are visualized as the slope of a secant line crossing the viscous Lissajous-Bowditch loop at the maximum strain-rate and the slope of a tangent line touching the viscous Lissajous-Bowditch loop at a strain-rate of zero for Comparative example 5a and Inventive example 1, respectively. INF is a material function that is initially zero (within the linear regime) and then changes its sign to positive (intracycle shear-thickening) and/or negative values (intracycle shear-thinning) as strain amplitude increases and a nonlinear response emerges. A dimensionless scaling function, similar to Journal of Rheology 2010, 54, pp 27-63, can be defined as $\zeta=\gamma_0 \cos \delta_{\alpha_M\omega}$ where $\gamma_0$ is the imposed strain-amplitude and $\delta_{\alpha_M\omega}$ is the phase-angle at a frequency of $\alpha_M\omega$ 0.1 rad/s, wherein $\alpha_M$ is the time-molecular weight superposition shift factor described below (see FIG. 2), was further applied to remove the effect of linear viscoelasticity and molecular weight.

Step 3

Further, in the third step, the INF obtained for the ethylene interpolymer product of interest is compared with a reference INF predicted for a linear (non-long-chain branched) ethylene interpolymer product having a polydispersity equivalent to the said ethylene interpolymer product. Polydispersity of a given ethylene interpolymer product can be characterized using any combination of moments of molecular weight distribution, i.e. number-average molecular weight, weight-average molecular weight, z-average molecular weight, (z+1)-average molecular weight, etc. In this disclosure, the ratio of z-average molecular weight divided by weight-average molecular weight was preferably used as a measure of polydispersity. The importance of $M_z/M_w$ has been extensively proposed in rheology literature (e.g. see Polym, Eng. Sci. 1996, 36, p p852-861).

As shown in FIG. 3, the reference INF for a linear ethylene interpolymer can be predicted using Eq. 1 as follows (INF is dimensionless):

$$INF^{lin} = -K\zeta^{1.45}(\zeta^{a*} - C*);\ \zeta = \gamma_0 \cos\delta_{a_M\omega} \qquad \text{(Eq. 1)}$$

in which K is a constant equal 0.3722, $\gamma_0$ is the imposed strain amplitude, $\alpha_M$ is the time-molecular weight superposition shift factor defined as $$\left(\frac{M_w}{M_{ref}}\right)^{3.41}$$

where $M_w$ is the SEC weight-average molecular weight and $M_{ref}$ is a reference molecular weight of $10^5$ g/mol. In Eq. 1, $\delta_{\alpha_M\omega}$ is the phase-angle at a frequency of $\alpha_M\omega$ 0.1 rad/s. FIG. 2 schematically displays the procedure used for interpolating the cosine of phase angle at a weighted frequency of $\alpha_M\omega$=0.1 rad/s for non-limiting examples of Example 1 and Comparatives T3, $R_2$ and S2 using a 33-mode generalized Maxwell model (see Li et al. ANTEC 2014). It should be added that $\delta_{\alpha_M\omega}$ values larger than 88.5° were not used for these calculations and were replaced by the largest phase angle measured within a frequency range of 0.05-100 rad/s. Parameters $\alpha$*and C* in Eq. 1 were defined as a function of the SEC-determined weight-average molecular weight $M_w$ and z-average molecular weight $M_z$ as follows:

$$a* = f\left(\frac{M_z}{M_w}\right) = \begin{cases} 0 & \frac{M_z}{M_w} \le 1.64 \\ 0.8645\left(\frac{M_z}{M_w} - 1.5\right) - 0.1198 & 1.64 < \frac{M_z}{M_w} < 2.21 \\ 0.5938\left(\frac{M_z}{M_w} - 1.5\right)^2 - 1.1803\left(\frac{M_z}{M_w} - 1.5\right) + 1.0455 & \frac{M_z}{M_w} < 2.21 \end{cases} \qquad \text{(Eq. 2)}$$

$$C* = g\left(\frac{M_z}{M_w}\right) = \begin{cases} 0 & \frac{M_z}{M_w} < 2.21 \\ 0.5944\ln\left(\frac{M_z}{M_w} - 1.5\right) + 0.2057 & \frac{M_z}{M_w} \ge 2.21 \end{cases} \qquad \text{(Eq. 3)}$$

Step 4

In the fourth step, presence of LCB in the ethylene interpolymer product of interest is detected according to a positive deviation from the predicted reference INF. The measured INF values of LCB ethylene interpolymers obtained at 190° C. at an angular frequency of 0.1 rad/s over a strain amplitude range of 1-103%, as shown by the solid line in FIG. 4, can be described using the following formula (INF is dimensionless):

$$INF = -K\zeta^{1.45}(\zeta^{a} - C);\ \zeta = \gamma_0 \cos\delta_{a_M\omega} \qquad \text{(Eq. 4)}$$

in which K is a constant equal 0.3722 and $\gamma_0$, $\alpha_M$ and $\delta_{\alpha_M\omega}$, parameters have the same definition as in Eq. 1. Parameters a and C in Eq. 4 were used as fitted constants by minimizing sum of squared residuals for data point with at least 0.1% nonlinearity (i.e. a third-order harmonic ratio $I_{3/1}$ of 0.001) to describe different experimental intracycle viscous nonlinear behaviors ranging from an intracycle shear-thinning (INF<0) behavior to an intracycle shear-thickening behavior (INF>0).

One can then calculate the 'network parameter', $\Delta_{int.}$, which purely reflects the impact of branching content on the intracycle nonlinear function, INF; according to the integrated area between the measured INF and $INF^{lin}$ over an $\zeta$ interval of 0.01 to 0.7 as follows:

$$\Delta_{int.} = \int_{0.01}^{0.7}\left[INF - INF^{lin}\right]d\zeta = \left[\frac{-K}{a+2.45}\zeta^{a+2.45} + \frac{KC}{2.45}\zeta^{2.45} + \frac{K}{a^*+2.45}\zeta^{a^*+2.45} - \frac{KC^*}{2.45}\zeta^{2.45}\right]_{0.01}^{0.7} \qquad \text{(Eq. 5)}$$

Melt Strength

The Accelerated-Haul-Off (AHO) Melt Strength (MS), having dimensions of centi-Newtons (cN), was measured on a Rosand RH-7 capillary rheometer (available from Malvern Instruments Ltd, Worcestershire, UK) having a barrel diameter of 15 mm, a flat die of 2-mm diameter and L/D ratio of 10:1 and equipped with a pressure transducer of 10,000 psi (68.95 MPa). The polymer melt was extruded through a capillary die under a constant rate (constant piston speed of 5.33 mm/min at 190° C.) which formed an extruded polymer filament. The polymer filament was then passed through a set of rollers and stretched at an ever-increasing haul-off speed until rupture. More specifically, the initial polymer filament speed was increased from 0 m/min at a constant acceleration rate from 50 to 80 m/min$^2$ until the polymer filament ruptured. During this experiment, the force on the rollers was constantly measured, initially the force rises quickly and then plateaus prior to filament rupture. The mean value of the force in the plateau region of the force versus time curve was defined as the melt strength for the polymer, measured in centi-Newtons (cN).

Vicat Softening Point (Temperature)

The Vicat softening point of an ethylene interpolymer product was determined according to ASTM D1525-07 (published December 2009). This test determines the temperature at which a specified needle penetration occurs when samples are subjected to ASTM D1525-07 test conditions, i.e. heating Rate B (120±10° C./hr and 938 gram load (10±0.2N load).

Heat Deflection Temperature

The heat deflection temperature of an ethylene interpolymer product was determined using ASTM D648-07 (approved Mar. 1, 2007). The heat deflection temperature is the temperature at which a deflection tool applying 0.455 MPa (66 PSI) stress on the center of a molded ethylene interpolymer plaque (3.175 mm (0.125 in) thick) causes it to deflect 0.25 mm (0.010 in) as the plaque is heated in a medium at a constant rate.

Flexural Properties

The flexural properties, i.e. flexural secant and tangent modulus and flexural strength were determined using ASTM D790-10 (published in April 2010).

Film Dart Impact

Film dart impact strength was determined using ASTM D1709-09 Method A (May 1, 2009). In this disclosure the dart impact test employed a 1.5 inch (38 mm) diameter hemispherical headed dart.

Film Puncture

Film "puncture", the energy (J/mm) required to break the film was determined using ASTM D5748-95 (originally adopted in 1995, reapproved in 2012).

Film Lub-Tef Puncture

The 'Lub-Tef Puncture' test was performed using a specifically designed Teflon probe at a 20 in/min. puncture rate, the purpose of this test was to determine the puncture resistance of monolayer ethylene interpolymer product films. An MTS Insight/Instron Model 5 SL Universal Testing Machine equipped with MTS Testworks 4 software was used; MTS 1000 N or 5000 N load cells were used. Film samples were ASTM conditioned for at least 24 hours prior to testing. Given a roll of blown film, a 4.25 inches sample were cut in the transverse direction, having a length of the film roll layflat dimension and the outside of the film is labelled (the probe impacts the outside of the film). Mount the Teflon coated puncture probe and set the testing speed to 20 inch/min. Mount the film sample into the clamp and deposit 1 $cm^3$ of lube onto the center of the film. When the crosshead is in the starting test position, set the limit switches on the Load Cell frame to 10 inches below and above the crosshead. Measure and record film sample thickness and begin (start) the puncture test. Prior to the next test thoroughly clean the probe head. Repeat until at least 5 consistent puncture results are obtained, i.e. standard deviation less than 10%. The lubricant used was Muko Lubricating Jelly; a water-soluble personal lubricant available from Cardinal Health Inc., 1000 Tesma Way, Vaughan, ON, L4K 5R8 Canada. The probe head was machined Teflon having a 1.4 inches cone shape with a flat tip.

Film Tensile Properties

The following film tensile properties were determined using ASTM D882-12 (Aug. 1, 2012): tensile break strength (MPa), elongation at break (%), tensile yield strength (MPa) and tensile elongation at yield (%). Tensile properties were measured in the both the machine direction (MD) and the transverse direction (TD) of the blown films.

Film Secant Modulus

The secant modulus is a measure of film stiffness. Secant moduli were determined according to ASTM D882. The secant modulus is the slope of a line drawn between two points on the stress-strain curve, i.e. the secant line. The first point on the stress-strain curve is the origin, i.e. the point that corresponds to the origin (the point of zero percent strain and zero stress), and; the second point on the stress-strain curve is the point that corresponds to a strain of 1%; given these two points the 1% secant modulus is calculated and is expressed in terms of force per unit area (MPa). The 2% secant modulus is calculated similarly. This method is used to calculated film modulus because the stress-strain relationship of polyethylene does not follow Hook's law, i.e. the stress-strain behavior of polyethylene is non-linear due to its viscoelastic nature. Secant moduli were measured using a conventional Instron tensile tester equipped with a 200 lbf load cell. Strips of monolayer film samples were cut for testing with following dimensions: 14 inches long, 1 inch wide and 1 mil thick; ensuring that there were no nicks or cuts on the edges of the samples. Film samples were cut in both the machine direction (MD) and the transverse direction (TD) and tested. ASTM conditions were used to condition the samples. The thickness of each film was accurately measured with a hand-held micrometer and entered along with the sample name into the Instron software. Samples were loaded in the Instron with a grip separation of 10 inch and pulled at a rate of 1 inch/min generating the strain-strain curve. The 1% and 2% secant modulus were calculated using the Instron software.

Film Elmendorf Tear

Film tear performance was determined by ASTM D1922-09 (May 1, 2009); an equivalent term for tear is "Elmendorf tear". Film tear was measured in both the machine direction (MD) and the transverse direction (TD) of the blown films.

Film Puncture-Propaqation Tear

Puncture-propagation tear resistance of blown film was determined using ASTM D2582-09 (May 1, 2009). This test measures the resistance of a blown film to snagging, or more precisely, to dynamic puncture and propagation of that puncture resulting in a tear. Puncture-propagation tear resistance was measured in the machine direction (MD) and the transverse direction (TD) of the blown films.

Film Opticals

Film optical properties were measured as follows: Haze, ASTM D1003-13 (Nov. 15, 2013); and Gloss ASTM D2457-13 (Apr. 1, 2013).

Film Dynatup Impact

Instrumented impact testing was carried out on a machine called a Dynatup Impact Tester purchased from Illinois Test Works Inc., Santa Barbara, CA, USA; those skilled in the art frequently call this test the Dynatup impact test. Testing was completed according to the following procedure. Test samples are prepared by cutting 5 inches (12.7 cm) wide and 6 inch (15.2 cm) long strips from a roll of blown film; film was 1 mil thick. Prior to testing, the thickness of each sample was accurately measured with a handheld micrometer and recorded. ASTM conditions were employed. Test samples were mounted in the 9250 Dynatup Impact drop tower/test machine using the pneumatic clamp. Dynatup tup #1, 0.5 inch (1.3 cm) diameter, was attached to the crosshead using the Allen bolt supplied. Prior to testing, the crosshead is raised to a height such that the film impact velocity is 10.9±0.1 ft/s. A weight was added to the crosshead such that: 1) the crosshead slowdown, or tup slowdown, was no more than 20% from the beginning of the test to the point of peak load and 2) the tup must penetrate through the specimen. If the tup does not penetrate through the film, additional weight is added to the crosshead to increase the striking velocity. During each test the Dynatup Impulse Data Acquisition System Software collected the experimental data (load (Ib) versus time). At least 5 film samples are tested and the software reports the following average values: "Dynatup Maximum (Max) Load (Ib)", the highest load measured during the impact test; "Dynatup Total Energy (ft-lb)", the area under the load curve from the start of the test to the end of the test (puncture of the sample), and; "Dynatup Total Energy at Max Load (ft-lb)", the area under the load curve from the start of the test to the maximum load point.

Cold Seal Strength

The cold seal strength of 3.5 mil (88.9 μm) 9-layer films were measured using a conventional Instron Tensile Tester. In this test, two multilayer films were sealed (layer 1 to layer 1) over a range of temperatures, the seals were then aged at least 24 hours at 73° F. (23° C.) and prior to tensile testing. The following parameters were used in the Cold Seal Strength Test: the film specimen width was 1 inch (25.4 mm); film sealing time, 0.5 second; film sealing pressure, 0.27 $N/mm^2$; temperature range, 90° C. to 170° C. with temperature increments of 5 or 10° C. After aging, seal strength was determined using the following tensile parameters: pull (crosshead) speed, 12 in/min (30.48 cm/min); grip separation 0.39 in (0.99 cm); direction of pull, 90° to seal; and 4 to 8 samples of each multilayer film were tested at each temperature increment to calculate an average value. In the cold seal test, the Seal Initiation Temperature (SIT) was recorded, in ° C.; the SIT was the temperature at which the seal strength reached 8.8N/in.

Film Hot tack Strength

The hot tack strength of 3.5 mil (88.9 μm) 9-layer films were measured using a J&B Hot Tack Tester (commercially available from Jbi Hot Tack, Geloeslaan 30, B-3630 Maamechelen, Belgium). In the hot tack test the strength of a polymer to polymer seal is measured immediately after heat sealing two films together, i.e., when the polyolefin is in a semi-molten state. This test simulates heat sealing on automatic packaging machines, e.g., vertical or horizontal form, fill and seal equipment. The following parameters were used in the J&B Hot Tack Test: film specimen width, 1 inch (25.4 mm); film sealing time, 0.5 second; film sealing pressure, 0.27 $N/mm^2$; seal time, 0.5 s, cool time, 0.5 second; film peel speed, 7.9 in/second (200 mm/second); temperature range, 90° C. to 170° C.; temperature increments of 5 or 10° C.; and 4 to 8 samples of each multilayer film were tested at each temperature increment to calculate an average value. In this disclosure, the Hot Tack Onset (HTO) temperature, measured in ° C., was the temperature at which the hot tack force reached 1 N. In addition, the Maximum Hot Tack Force (Max. HTF) was recorded, i.e. the maximum hot tack force (N) recorded during the hot tack experiment, as was the temperature (° C.) at which the Max. HTF was observed.

Film Hexane Extractables

Hexane extractables was determined according to the Code of Federal Registration 21 CFR § 177.1520 Para (c) 3.1 and 3.2; wherein the quantity of hexane extractable material in a film is determined gravimetrically. Elaborating, 2.5 grams of 3.5 mil (89 μm) monolayer film was placed in a stainless steel basket, the film and basket were weighed ($w^i$). While in the basket the film was: extracted with n-hexane at 49.5° C. for two hours; dried at 80° C. in a vacuum oven for 2 hours; cooled in a desiccator for 30 minutes, and weighed ($w^f$). The percent loss in weight is the percent hexane extractables ($w^{C6}$): $w^{C6}=100\times(w^i-w^f)/w^i$.

Examples

Pilot Plant Polymerizations

The following examples are presented for the purpose of illustrating selected embodiments of this disclosure, it being understood that, the examples presented hereinafter do not limit the claims presented. Examples of ethylene interpolymer products were prepared in a continuous solution process pilot plant as described below.

Solution process conditions for Examples 1-3 are summarized in Tables 4A and 4B. Two CSTR reactors (R1 and R2), configured in series, were employed to manufacture Examples 1 and 2. One CSTR reactor was employed to manufacture Example 3 (R2). R1 pressure varied from 14 MPa to 18 MPa; R2 was operated at a lower pressure to facilitate continuous flow from R1 to R2. CSTR's were agitated to give conditions in which the reactor contents were well mixed. The process was operated continuously by feeding fresh process solvent, ethylene, 1-octene and hydrogen to the reactors. Methylpentane was used as the process solvent (a commercial blend of methylpentane isomers). The volume of the first CSTR reactor (R1) was 3.2 gallons (12 L), the volume of the second CSTR reactor (R2) was 5.8 gallons (22 L) and the volume of the tubular reactor (R3) was 0.58 gallons (2.2 L).

The following components were used to prepare the bridged metallocene catalyst formulation: component A, diphenylmethylene(cyclopentadienyl)(2,7-di-t-butylfuorenyl)hafnium dimethyl, $[(2,7\text{-}tBu_2Flu)Ph_2C(Cp)HfMe_2]$ (abbreviated CpF-2); component M, methylaluminoxane (MMAO-07); component B, trityl tetrakis(pentafluoro-phenyl)borate; and component P, 2,6-di-tert-butyl-4-ethylphenol. The following catalyst component solvents were used: methylpentane for components M and P; and xylene for component A and B.

Comparative ethylene interpolymer products were manufactured using the unbridged single site catalyst formulation comprising: component C, cyclopentadienyl tri(tertiary butyl)phosphinimine titanium dichloride $[Cp[(t\text{-}Bu)_3PN]TiCl_2]$ (abbreviated PIC-1); component M, methylaluminoxane (MMAO-07); component B, trityl tetrakis(pentafluoro-phenyl)borate; and component P, 2,6-di-tert-butyl-4-ethylphenol. The following catalyst component solvents were used: methylpentane for components M and P; and xylene for component A and B.

In the case of Example 1, Table 4A shows the quantity of CpF-2 in reactor 1 (R1) was 0.85 ppm, i.e. 'R1 catalyst (ppm)'. The efficiency of the bridged metallocene catalyst formulation was optimized by adjusting the mole ratios of the catalyst components and the $R_1$ catalyst inlet temperature. As shown in Table 4A, the mole ratios optimized were: ([M]/[A]), i.e. [(MMAO-07)/(CpF-2)]; ([P]/]M]), i.e. [(2,6-di-tert-butyl-4-ethylphenol)/(MMAO-07)]; and ([B]/[A]), i.e. [(trityl tetrakis(pentafluoro-phenyl)borate)/(CpF-2)]. To be more clear, in Example 1 (Table 4A), the mole ratios in R1 were: R1 ([M]/[A])=50; R1 ([P]/[M])=0.40, and; R1 ([B]/[A])=1.2. As shown in Table 4B, the $R_1$ catalyst inlet temperature was 21° C. in the case of Example 1. In Examples 1 and 2a second bridged metallocene catalyst formulation was injected into the second reactor (R2). Tables 4A and 4B disclose additional process parameters, e.g. ethylene and 1-octene splits between the reactors, and reactor temperatures and ethylene conversions, etc.

Average residence time of the solvent in a reactor is primarily influenced by the amount of solvent flowing through each reactor and the total amount of solvent flowing through the solution process, the following are representative or typical values for the Examples shown in Tables 4A and 4B: average reactor residence times were: 61 seconds in R1, 73 seconds in R2, 7.3 seconds for an R3 volume of 0.58 gallons (2.2 L).

Polymerization in the continuous solution polymerization process was terminated by adding a catalyst deactivator to the third exit stream exiting the tubular reactor (R3). The catalyst deactivator used was octanoic acid (caprylic acid), commercially available from P&G Chemicals, Cincinnati, OH, U.S.A. The catalyst deactivator was added such that the moles of fatty acid added were 50% of the total molar amount of catalytic metal and aluminum added to the polymerization process.

A two-stage devolitizing process was employed to recover the ethylene interpolymer product from the process solvent, i.e. two vapor/liquid separators were used and the second bottom stream (from the second V/L separator) was passed through a gear pump/pelletizer combination.

Prior to pelletization the ethylene interpolymer product was stabilized by adding 500 ppm of IRGANOX® 1076 (a primary antioxidant) and 500 ppm of IRGAFOS® 168 (a secondary antioxidant), based on weight of the ethylene interpolymer product. Antioxidants were dissolved in process solvent and added between the first and second V/L separators.

Ethylene Interpolymer product Examples 1-3 were characterized and the results are disclosed in Table 5A. Table 5A also discloses Examples 4-6 prepared on the same solution pilot plant employing the bridged metallocene catalyst formulation and reactor configuration as described above for Examples 1-3. In Table 5A the term 'FAE (J/mol)' was the Flow Activation Energy of Examples 1-6 determined as described in the experimental section; 'MS (cN)' was the Melt Strength; and '$\tau(s^{-1})$' discloses the rheological onset of shear-thinning.

Table 5B characterizes comparative ethylene interpolymer products. Comparative 1a was SURPASS FPs117-C, Comparative 2a was produced in the solution pilot plant using a bridged metallocene catalyst formulation in the first reactor and an unbridged single site catalyst formulation in the second reactor, Comparative 3a was produced in the solution pilot plant using a bridged metallocene catalyst formulation in the first reactor and an in-line Ziegler-Natta catalyst formulation in the second reactor, Comparative 4a was SURPASS VPsK914, Comparative 5a was SCLAIR FP120 and Comparatives 14-16 were was produced in the solution pilot plant employing an unbridged single site catalyst formulation in reactors 1 and 2.

Table 5C characterizes additional comparative ethylene interpolymer products. Comparatives Q1-Q4 were QUEO products, specifically QUEO 0201, QUEO 8201, QUEO 0203 and QUEO 1001, respectively. The remaining comparative samples were: Comparative $R_1$ was AFFINITY PL1880; Comparative S1 was ENABLE 20-05HH; Comparative T1 was EXCEED 1018CA; Comparative U1 was ELITE AT 6202; and Comparative V1 was ELITE 5401G.

There is a need to improve the continuous solution polymerization process, e.g. to increase the production rate, where production rate is the kilograms of ethylene interpolymer product produced per hour. Tables 6A and 6B disclose series dual reactor solution polymerization process conditions that produced products having melt indexes (I2) of about 1.0 dg/min and densities of about 0.9175 g/cc. An improved continuous solution polymerization process is represented by Example 6 in Table 6A. Example 6 was an ethylene interpolymer product produced on the solution pilot plant (described above) by injecting the bridged metallocene catalyst formulation (CpF-2) into reactors 1 and 2.

A comparative continuous solution polymerization process is represented by Comparative 8 in Table 6A. Comparative 8 was a comparative ethylene interpolymer product produced on the same solution pilot plant by injecting the unbridged single site catalyst formulation (PIC-1) into reactors 1 and 2. The improved process had a production rate, $PR^A$, of 93.0 kg/hr; in contrast the comparative process had a comparative production rate, $PR^C$, of 81.3 kg/hr. The improved process had an increased production rate, $PR^I$, of 14.5%, i.e.

$$PR^I=100\times(PR^A-PR^C)/PR^C=100\times((93.0-81.3)/81.3)=14.5\%.$$

Tables 7A and 7B disclose series dual reactor solution polymerization process conditions that produced products having fractional melt indexes (I2) of about 0.8 dg/min and densities of about 0.9145 g/cc. Example 5 was synthesized using the bridged metallocene catalyst formulation; in contrast, Comparative 9 was synthesized using the unbridged single site catalyst formulation. In the case of Example 5, the improved continuous solution polymerization process had a production rate, $PR^A$, of 93.9 kg/hr; in contrast the comparative process had a comparative production rate, $PR^C$, of 79.4 kg/hr. The improved process had an increased production rate, $PR^I$, of 18.3%.

There is a need to improve the continuous solution polymerization process, e.g. to increase the molecular weight of the ethylene interpolymer product produced at a specific reactor temperature. In addition, in solution polymerization there is a need for catalyst formulations that efficiently incorporate α-olefins into the propagating macromolecular chain. Expressed alternatively, there is a need for catalyst formulations that produce an ethylene interpolymer product, having a specific density, at a lower (α-olefin/ethylene) ratio in the reactor.

Table 8 compares the solution polymerization conditions of Example 10 manufactured using a bridged metallocene catalyst formulation (CpF-2) and Comparative 10s simulated using an unbridged single site catalyst formulation (PIC-1). Example 10 was produced on the continuous solution process pilot plant (described above) employing one CSTR reactor. Relative to Example 10, Comparative 10s was computer simulated using the same reactor configuration, same reactor temperature (165° C.), same hydrogen concentration (4 ppm), same ethylene conversion (90% ($Q^T$)) and the [α-olefin/ethylene] ratio was adjusted to produce an ethylene interpolymer product having the same branch frequency as Example 10 (about 16 $C_6$/1000C). Given Table 8 it is evident that Example 10 characterizes an improved solution polymerization process, relative to Comparative 10s, i.e. an improved '% Reduced [α-olefin/ethylene]' ratio results. Elaborating, the [α-olefin/ethylene]$^A$ weight ratio of Example 10 was 83.8% lower (improved) relative to the [α-olefin/ethylene]$^C$ weight ratio of Comparative 10s, i.e.:

$$\%\ \text{Reduced}\left[\frac{\alpha-\text{olefin}}{\text{ethylene}}\right]=100\times\left\{\frac{\left(\frac{\alpha-\text{olefin}}{\text{ethylene}}\right)^A-\left(\frac{\alpha-\text{olefin}}{\text{ethylene}}\right)^C}{\left(\frac{\alpha-\text{olefin}}{\text{ethylene}}\right)^C}\right\}$$

$$\%\ \text{Reduced}\left[\frac{\alpha-\text{olefin}}{\text{ethylene}}\right]=100\times\left\{\frac{0.17-1.05}{1.05}\right\}=-83.8\%$$

where the superscript$^A$ represents catalyst Component A (Formula (I)) and the superscript C represents catalyst Component C (Formula (II)). In addition, the bridged metallocene catalyst formulation produced a '% Improved $M_w$'. Elaborating, the weight average molecular weight of Example 10 ($M_w^A$) was 73.6% higher (improved), relative to the weight average molecular weight of Comparative 10s ($M_w^C$), i.e.:

$$\%\ \text{Improved}\ M_w=100\times(M_w^A-M_w^C)/M_w^C$$

$$\%\ \text{Improved}\ M_w=100\times(82720-47655)/47655=73.6\%\%.$$

Similarly, Table 8 also compares the solution polymerization conditions of Example 11 manufactured using the bridged metallocene catalyst formulation (CpF-2) with simulated Comparative 10s using the unbridged single site catalyst formulation (PIC-1). Example 11 and Comparative 11s were manufactured or simulated, respectively, using the same reactor configuration, same reactor temperature (165° C.), same hydrogen concentration (6 ppm), same ethylene conversion (85% ($Q^T$)) and the respective [α-olefin/ethylene] ratio was adjusted to produce ethylene interpolymer products having about the same branch frequency (about 21.5 C6/1000C). The [α-olefin/ethylene]$^A$ weight ratio of Example 11 was 72.7% lower (improved) relative to the [α-olefin/ethylene]$^C$ of Comparative 11s. In addition, the weight average molecular weight of Example 11 ($M_w^A$) was 199% higher (improved), relative to the weight average molecular weight of Comparative 11s ($M_w^C$), as shown in Table 8.

Table 9 summarizes solution polymerization process data at higher and lower reactor temperatures, relative to Table 8. For example, at 190° C. reactor temperature, Example 12 can be compared with simulated Comparative 12s. The [α-olefin/ethylene]$^A$ weight ratio of Example 12 was 90.8% lower (improved) relative to the [α-olefin/ethylene]$^C$ weight ratio of Comparative 12s. In addition, the weight average molecular weight of Example 12 ($M_w^A$) was 70.4% higher (improved), relative to the weight average molecular weight of Comparative 12s ($M_w^C$), as shown in Table 9.

In Table 9, Example 13 can be compared with simulated Comparative 13s, both at reactor temperatures of 143° C. The [α-olefin/ethylene]$^A$ weight ratio of Example 13 was 88.9% lower (improved) relative to the [α-olefin/ethylene]$^C$ of Comparative 13s and the weight average molecular weight of Example 13 ($M_w^A$) was 182% higher (improved) relative to the weight average molecular weight of Comparative 13s ($M_w^C$).

Tables 10A and 10B compare dual reactor solution polymerization conditions of Example 14 and Comparative 14. Table 10A discloses reactor 1 process conditions and Table 10B discloses reactor 2 process conditions. Example 14 was a dual reactor ethylene interpolymer product containing a first ethylene interpolymer synthesized using a bridged metallocene catalyst formulation and a second ethylene interpolymer synthesized using an unbridged single site catalyst.

Comparative 14 was a comparative dual reactor ethylene interpolymer product where both the first and second ethylene interpolymers were synthesized using an unbridged single site catalyst. Table 10A shows reactor temperatures (118.7° C.±0.7%) and ethylene conversions (80.0%) were the same for Example 14 and Comparative 14; however, in the case of the bridged metallocene catalyst formulation an 87.3% lower (α-olefin/ethylene) weight fraction was employed in the first reactor, i.e. a 0.35 weight fraction, relative to the unbridged single site catalyst formulation, i.e. 2.76 weight fraction. In addition, the amount of hydrogen employed in reactor 1 was 3-fold higher when using the bridged metallocene catalyst formulation relative to the unbridged single site catalyst formulation. Those of ordinary experience are cognizant of the fact that hydrogen is used to control $M_W$ (or melt index) in olefin polymerization, i.e. hydrogen is very effective in terminating propagating macromolecules and reducing the molecular weight of an ethylene interpolymer.

Table 11 summarizes SEC deconvolution results, i.e. dual reactor Example 14 and Comparative 14 were deconvoluted into first and second ethylene interpolymers. Table 11 shows the weight average molecular weights ($M_w$) of the first ethylene interpolymers were similar for Example 14 and Comparative 14, i.e. 249,902 $M_w$ Example 14 and 275,490 $M_w$ Comparative 14; this similarity in $M_w$ resulted even though 3 ppm of hydrogen was used to produce the former and no hydrogen was used to produce the latter. In other words, given Table 11 data it was evident that the bridged metallocene catalyst formulation produced higher molecular weight ethylene interpolymers, relative to the unbridged single site catalyst formulation, at constant polymerization temperature, ethylene conversion and hydrogen concentration.

Table 11 also shows the bridged metallocene catalyst formulation incorporated more α-olefin into the first ethylene interpolymer, i.e. 27.8 BrF (C6/1 000C) Example 14, relative to the unbridged single site catalyst formulation, i.e. 22.9 BrF (C6/1 000C); note that this difference in branch frequency occurred even though much less α-olefin was employed to produce the former relative to the latter, as shown in Table 10A. In other words, the bridged metallocene catalyst formulation is much more efficient at incorporating α-olefin into the propagating macromolecule, relative to the unbridged single site catalyst formulation.

FIG. 8 compares the SEC determined molecular weight distribution of Example 14 and Comparative 14, as well as the GPC-FTIR determined branching frequencies as a function of molecular weight. Example 14's branching distribution curve (BrF) shows a large difference in the α-olefin content of the first ethylene interpolymer, i.e. 27.8 C6/1 000C (a first ethylene interpolymer density of 0.8965 g/cc) and the second ethylene interpolymer, i.e. 0.924 C6/1 000C (0.9575 g/cc). This large difference in interpolymer density, i.e. $\Delta\rho$=0.0610 g/cc=($\rho^2$−$\rho^1$), where $\rho^2$ is the density of the second ethylene interpolymer and $\rho^1$ is the density of the first ethylene interpolymer, reflects the fact that Example 14 was produced in parallel reactor mode as well as the different catalyst used in reactors 1 and 2. Higher Δρ's are advantageous in several end-use applications, one non-limiting example includes higher film stiffness while maintaining or improving film toughness. In contrast, as shown in Table 11 the Δρ of Comparative 14 was an order of magnitude lower, i.e. 0.0062 g/cc.

FIG. 9 illustrates the deconvolution of Example 4's experimentally measured SEC chromatogram into three components, i.e. a first ethylene interpolymer, a second ethylene interpolymer and a third ethylene interpolymer. Example 4 is characterized in Table 12. Example 4 was produced in the solution pilot plant (described above) employing the bridged metallocene catalyst formulation (CpF-2) where the volume of the third reactor was 2.2 liters. To be more clear, as produced the ethylene interpolymer product Example 4 had the following overall values: an 12 of 0.87 dg/min, a density of 0.9112 g/cc and 105449 $M_w$ (7.53 $M_w/M_n$) as measured by SEC. As shown in FIG. 9 and Table 12, Example 4 contained: 37 wt. % of a first ethylene interpolymer having a $M_w$ of 230042 and a branch content of 16.3 C6/1 000C, 57 wt. % of a second ethylene interpolymer having a $M_w$ of 22418 and a branch content of 21.3 C6/1 000C; and 6 wt. % of a third ethylene interpolymer having a $M_w$ of 22418 and a branch content of 21.3 C6/1000C (branch content was determined by deconvoluting GPC-FTIR data). The molecular weight distribution of the first, second and third ethylene interpolymers were characterized by Flory distributions, i.e. $M_w/M_n$=2.0. Table 12 discloses two additional samples, Examples 5 and 6, also produced in the solution pilot plant employing the bridged metallocene catalyst formulation. The SEC and GPC-FTIR curves of Examples 5 and 6 were also deconvoluted into a 1$^{st}$, 2$^{nd}$ and 3$^{rd}$ ethylene interpolymer, as shown in Table 12.

Continuous Polymerization Unit (CPU)

Small scale continuous solution polymerizations were conducted on a Continuous Polymerization Unit, hereinafter CPU. These experiments compare the performance of the bridged metallocene catalyst formulation (containing component A, CpF-1) with the unbridged single site catalyst formulation (containing component C, PIC-1) in one reactor.

The single reactor of the CPU was a 71.5 mL continuously stirred CSTR, polymerizations were conducted at 160° C. and the reactor pressure was about 10.5 MPa. The CPU included a 20 mL upstream mixing chamber that was operated at a temperature that was 5° C. lower than the downstream polymerization reactor. The upstream mixing chamber was used to pre-heat the ethylene, optional α-olefin and a portion of the process solvent. Catalyst feeds and the remaining solvent were added directly to the polymerization reactor as a continuous process. The total flow rate to the polymerization reactor was held constant at 27 mL/minute. The components of the bridged metallocene catalyst formulation (component A, component M, component B and component P) were added directly to the polymerization reactor to maintain the continuous polymerization process. More specifically: component A and component B were premixed in xylene and injected directly into the reactor; and component M and optionally component P were premixed in process solvent and injected directly into the reactor. In the comparative experiments, the components of the unbridged single site catalyst formulation (component C, component M, component B and component P) were added directly to the polymerization reactor to maintain the continuous polymerization process. More specifically: component C and component B were premixed in xylene and injected directly into the reactor; and component M and optionally component P were premixed in process solvent and injected directly into the reactor. In the examples, the component A employed was CpF-1 [(2,7-$tBu_2$Flu)$Ph_2$C(Cp)$HfCl_2$]. In the comparatives, the component C employed was PIC-1 ([Cp [$(t\text{-}Bu)_3$PN]$TiCl_2$]). Components M, B and P were methylaluminoxane (MMAO-07), trityl tetrakis(pentafluoro-phenyl)borate, and 2,6-di-tert-butyl-4-ethylphenol, respectively. Upon injection, the catalyst was activated in situ (in the polymerization reactor) in the presence of ethylene and optional α-olefin comonomer. Component M was added such that the mole ratio of ([M]/[A]) or ([M]/[C]) was about 80; component B was added such that the mole ratio of ([M]/[A]) or ([M]/[C]) was about 1.0; and component P was added such that the mole ratio of ([P]/[M]) was about 0.4.

Ethylene was supplied to the reactor by a calibrated thermal mass flow meter and was dissolved in the reaction solvent prior to the polymerization reactor. Optional α-olefin (comonomer, i.e. 1-octene) was premixed with ethylene before entering the polymerization reactor, the (1-octene)/(ethylene) weight ratio varied from 0 to about 6.0. Ethylene was fed to the reactor such that the ethylene concentration in the reactor varied from about 7 to about 15 weight %; where weight % is the weight of ethylene divided by the total weight of the reactor contents. The internal reaction temperature was monitored by a thermocouple in the polymerization medium and was controlled at the target set point to ±0.5° C. Solvent, monomer, and comonomer streams were all purified by the CPU systems prior to entering the reactor.

The ethylene conversion, $Q^{CPU}$, i.e. the fraction of ethylene converted was determined by an online gas chromatograph (GC) and polymerization activity, $K_p^{CPU}$, having dimensions of [L/(mmol-min)] was defined as:

$$K_p^{CPU} = Q^{CPU}\left(\frac{1 - Q^{CPU}}{[\text{catalyst}] \times HUT^{CPU}}\right)$$

where $HUT^{CPU}$ was a reciprocal space velocity (Hold Up Time) in the polymerization reactor having dimensions of minutes (min), and, [catalyst] was the concentration of catalyst in the polymerization reactor expressed in mmol/L of titanium or hafnium. In CPU experiments, $Q^{CPU}$ was held constant at about 90% and the $HUT^{CPU}$ was held constant at about 2.5 minutes. Downstream of the reactor the pressure was reduced to atmospheric pressure. The ethylene interpolymer product was recovered as a slurry in the process solvent and subsequently dried by evaporation in a vacuum oven prior to characterization.

CPU conditions were adjusted to synthesize ethylene interpolymer products at approximately constant melt index and density; more specifically, an ethylene interpolymer product was synthesized using the bridged metallocene catalyst formulation and a comparative ethylene interpolymer product was synthesized using the unbridged single site catalyst formulation. As shown by each row in Table 13, the '% Improved $M_W$' was at least 10% when one compares the $M_W^A$ of the ethylene interpolymer product produced with the bridged metallocene catalyst formulation and the $M_w^C$ of the comparative ethylene interpolymer product produced with the unbridged single site catalyst formulation.

As shown in Table 14, the reactor's (α-olefin/ethylene) weight ratio had to be adjusted such that ethylene interpolymer products were produced at target density. To be more clear, using the bridged metallocene catalyst formulation an $(\alpha\text{-olefin/ethylene})^A$ was required to synthesize an ethylene interpolymer product at target density; and using the unbridged single site catalyst formulation an $(\alpha\text{-olefin/ethylene})^C$ was required to synthesize a comparative ethylene interpolymer product at target density. As shown by each row in Table 14 the bridged metallocene catalyst formulation allows the operation of the continuous solution polymerization process at an improved (reduced) (α-olefin/ethylene) weight ratio relative to the control unbridged single site catalyst formulation, i.e. the % Reduced [α-olefin/ethylene] weight ratio was at least −70%.

Ethylene interpolymer product Example 20 was also produced on the CPU described above. Example 20 demonstrates the ability of the bridged metallocene catalyst formulation containing CpF-2 ((2,7-$tBu_2$Flu)$Ph_2$C(Cp) $HfMe_2$) to produce a low density product that was elastomeric in nature, i.e. Example 20 was characterized as follows: 0.8567 g/cc, 72.9 BrF C6/1000C, 14.6 mole percent 1-octene and 40.6 weight percent 1-octene.

Monolayer Films

Monolayer blown film samples of ethylene interpolymer product Examples 1 and 2 and Comparatives 15 and 16 were prepared as disclosed in Table 15. Examples 1 and 2 have been described earlier; Comparatives 15 and 16 were pilot plant samples produced by injecting the unbridged single site catalyst formulation (PIC-1) into R1 and R2 (series mode). Monolayer blown film was produced on a Gloucester extruder, 2.5 inch (6.45 cm) barrel diameter, 24/1 L/D (barrel Length/barrel Diameter) equipped with: a barrier screw; a low pressure 4 inch (10.16 cm) diameter die with a 35 mil (0.089 cm) die gap, and; a Western Polymer Air ring. The extruder was equipped with the following screen pack: 20/40/60/80/20 mesh. Blown film, of about 1.0 mil (25.4 μm) thick, was produced at a constant output rate of about 100 lb/hr (45.4 kg/hr) by adjusting extruder screw speed; and the frost line height (FLH) was maintained from 16 to 18 inch (40.64 to 45.72 cm) by adjusting the cooling air. Additional blown film processing conditions are disclosed in Table 15.

Given Table 15, it is evident that the blown film extruder pressure of Examples 1 and 2 were from −16% to −29% lower, relative to Comparatives 15 and 16. Lower blown film extruder pressure was an advantage because the output (lb/hr) of a blown film line may be limited by extruder pressure. In addition, the extruder amps of Example 1 and 2 were from −10% to −26% lower, relative to Comparative 15 and 16. Lower blown film extruder amps was an advantage because the electrical power consumption of a blown film line can be reduced if the ethylene interpolymer products disclosed herein are use.

Monolayer film physical properties are disclosed in Table 16 along with selected physical properties of the Examples 1 and 2 and Comparatives 15 and 16. An ethylene interpolymer product having high melt strength was advantageous in the blown film conversion process, i.e. blown film output is frequently limited by blown film bubble instability and the bubble stability improves as resin melt strength increases. The melt strengths (measured in centi-Newtons (cN)) of Examples 1 and 2 were from 25% to 65% higher, relative to Comparatives 15 and 16. Flow activation energies (kJ/mol) of Examples 1 and 2 were from 42% to 66% higher, relative to Comparatives 15 and 16. Higher flow activation energies are desirable because such resins are more responsive to changes in extrusion temperature, e.g. given a higher flow activation energy resin viscosity decreases more rapidly (decreasing extruder pressure and amps) with a given increase in extrusion temperature.

Desirable film physical properties include film optical properties, e.g. low film haze and high film Gloss 45°. Optical properties are important when a consumer purchases an item packaged in a polyethylene film. Elaborating, a package having better contact and/or see-through clarity will have lower internal film haze and higher film gloss or sparkle. A film's optical properties correlate with the consumer's perception of product quality. Given Table 16, it was evident that the haze of Examples 1 and 2 were −40% to −45% lower (improved), relative to Comparatives 15 and 16; and film Gloss 45° of Examples 1 and 2 were 16% to 21% higher (improved), relative to Comparatives 15 and 16. Additional blown film physical properties are summarized in Table 16.

Multilayer Films

Multilayer films were produced on a 9-layer line commercially available from Brampton Engineering (Brampton ON, Canada). The structure of the 9-layer films produced is shown in Table 17. Layer 1 contained the sealant resin under test. More specifically, layer 1 contained 91.5 wt % of the sealant resin, 2.5 wt. % of an antiblock masterbatch, 3 wt. % of a slip masterbatch and 3 wt. % of a processing aid masterbatch, such that layer 1 contained 6250 ppm of antiblock (silica (diatomaceous earth)), 1500 ppm of slip (eurcamide) and 1500 ppm of processing aid (fluoropolymer compound); additive masterbatch carrier resins were LLDPE, about 2 melt index ($I_2$) and about 0.918 g/cc. Layer 1 was the insider layer, i.e. inside the bubble as the multilayer film was produced on the blown film line. The total thickness of the 9 layer film was held constant at 3.5-mil; the thickness of layer 1 was 0.385 mil (9.8 μm), i.e. 11% of 3.5 mil (Table 17). Layers 1-4 and 6-8 contained SURPASS FPs016-C an ethylene/1-octene copolymer available from NOVA Chemicals Corporation having a density of about 0.917 g/cc and a melt index ($I_2$) of about 0.60 dg/min. Layers 4, 6 and 8 also contained 20 wt. % BYNEL® 41E710a maleic anhydride grafted LLDPE available from DuPont Packaging & Industrial Polymers having a density of 0.912 g/cc and a melt index ($I_2$) of 2.7 dg/min. Layers 5 and 9 contained ULTRAMID® C40 L a nylon (polyamide 6/66) available from BASF Corporation having a melt index ($I_2$) of 1.1 dg/min. The multilayer die technology consisted of a pancake die, FLEX-STACK Co-extrusion die (SCD), with flow paths machined onto both sides of a plate, the die tooling diameter was 6.3-inches, in this disclosure a die gap of 85-mil was used consistently, film was produced at a Blow-Up-Ratio (BUR) of 2.5 and the output rate of the line was held constant at 250 lb/hr. The specifications of the nine extruders follow: screws 1.5-in diameter, 30/1 length to diameter ratio, 7-polyethylene screws with single flights and Maddox mixers, 2-Nylon screws, extruders were air cooled, equipped with 20-H.P. motors and all extruders were equipped with gravimetric blenders. The nip and collapsing frame included a Decatex horizontal oscillating haul-off and pearl cooling slats just below the nips. The line was equipped with a turret winder and oscillating slitter knives. Table 18 summarizes the temperature settings used. All die temperatures were maintained at a constant 480° F., i.e. layer sections, mandrel bottom, mandrel, inner lip and outer lip.

End users often desire improvements and/or a specific balance of several film properties. Non-limiting examples include optical properties, melting point for a given density, heat seal and hot tack properties, and others. Elaborating, within the packaging industry there is a need to improve the heat seal and hot tack properties of films. For example, it is particularly desirable to lower the seal initiation temperature (SIT) and broaden the hot tack window while maintaining, or improving, other film physical properties such as stiffness, toughness and optical properties.

Table 19 discloses cold seal data and seal initiation temperatures (SIT) of four 9-layer films coded (i) through (iv). Layer 1 of film (i), the sealant layer, contained the following binary blend: 70 wt. % of Example 1 and 30 wt. % of Comparative 5; the latter was SCLAIR FP120 (0.920 g/cc and 1.0 $I_2$); layer 1 also contained additives as described above. Layer 1 of film (i) had a blended density of about 0.909 g/cc. Surprisingly, as shown in FIG. 10, the cold seal curves of film (i) and Comparative film (ii) were essentially equivalent; surprising because film (ii)'s layer 1 was 0.906 g/cc. Further, as shown in Table 19, the SIT's of films (i) and (ii) were essentially equivalent, i.e. 92.4 and 92.2° C., respectively, again surprising given the difference in layer 1 densities, i.e. 0.909 g/cc versus 0.906 g/cc, respectively. To be more clear, the polyethylene film art is replete with examples disclosing that seal initiation temperature (SIT) increases as film (i.e. the sealant layer) density increases; FIG. 10 evidences this trend, i.e. the cold seal curve of film (iv) having a layer 1 density of 0.914 g/cc was shifted to higher temperatures resulting in an SIT of 102.5° C. SIT (Table 19).

FIG. 10 and Table 19 demonstrate at least two advantages of the ethylene interpolymer products disclosed herein, specifically: (a) at constant SIT, a film (or layer) having a higher density is desired (film (i)) because the film is stiffer and more easily processed through packaging equipment, relative to a lower density comparative film; and (b) the ethylene interpolymer products disclosed herein can be diluted with higher density LLDPE's, i.e. the overall cost of the sealant resin formulation can be reduced.

Specific hot tack properties are desired in high speed vertical and horizontal form-fill-seal processes where a product (liquid, solid, paste, part, etc.) is loaded and sealed inside a pouch-like package. For example, the packaging industry requires sealant resins that have broad hot tack windows, i.e. such resins consistently produce leak-proof packages as various parameters are changed on the packaging equipment. Further, it is desirable that the Hot Tack Onset temperature HTO (in ° C.) occurs at the lowest possible temperature. Also desirable is high temperature hot tack such that the seal strength remains sufficient at elevated temperatures. Poor hot tack properties frequently limit packaging line product rate.

Table 20 discloses hot tack data, the Hot Tack Onset (HTO) temperature as well as comments on the manner in which the 9-layer films failed. Surprisingly, the HTO temperatures of films (iii) and (ii) were similar, i.e. 86.3 and 86.8° C., respectively; surprising given the difference in layer 1 densities, i.e. 0.913 and 0.906 g/cc respectively. This is surprising because the polyethylene film art discloses that the HTO temperature of a film (or layer) increases as film (or layer) density increases. Hot tack curves for film (iii) comprising Example 5 and film (ii) comprising Comparative 15 are shown in FIG. 11. Even though the density of Example 5 (film (iii)) was higher, the breadth of Example 5's hot tack window was TABLE 2-continued Molecular and Rheological Features of Linear and LCB Examples Displayed in FIG. 5 of this Disclosure

| | | | | | | |
|---|---|---|---|---|---|---|
| Comp. Q3 | 5 | 16.1 | 1.58E+03 | 6.82E+04 | 1.87 | 0.16 |
| Comp. Q4 | 3.8 | 15.6 | 1.41E+03 | 8.12E+04 | 1.86 | 0.27 |
| Comp. R1 | 4.7 | 16.0 | 1.54E+03 | 8.45E+04 | 1.64 | 0.22 |
| Comp. R2 | 3.6 | 15.5 | 1.39E+03 | 7.93E+04 | 1.62 | 0.29 |
| Comp. R3 | 4.1 | 15.7 | 1.45E+03 | 6.43E+04 | 1.65 | 0.14 |
| Comp. S1 | 2.3 | 14.8 | 1.18E+03 | 9.38E+04 | 1.95 | 0.44 |
| Comp. S2 | 1.4 | 14.5 | 1.09E+03 | 1.09E+05 | 2.06 | 0.60 |

TABLE 1

FTIR Unsaturation in Ethylene Interpolymer Products Examples 1-6, Relative to Comparatives and the Unsaturation Ratio UR

| Sample | Internal Unsat/100 C | Side Chain Unsat/100 C | Term Unsat/100 C | Total Unsat/100 C | UR = $(SC^U - T^U)/T^U$ |
|---|---|---|---|---|---|
| Example 1 | 0.011 | 0.006 | 0.008 | 0.025 | −0.25 |
| Example 2 | 0.011 | 0.006 | 0.007 | 0.024 | −0.14 |
| Example 3 | 0.014 | 0.009 | 0.009 | 0.032 | 0.00 |
| Example 4 | 0.025 | 0.018 | 0.019 | 0.062 | −0.05 |
| Example 5 | 0.026 | 0.018 | 0.020 | 0.064 | −0.10 |
| Example 6 | 0.027 | 0.017 | 0.020 | 0.064 | −0.15 |
| Example 8 | 0.016 | 0.003 | 0.008 | 0.027 | −0.63 |
| Comp Q1 | 0.014 | 0.012 | 0.011 | 0.037 | 0.091 |
| Comp Q2 | 0.017 | 0.016 | 0.015 | 0.048 | 0.067 |
| Comp Q3 | 0.015 | 0.013 | 0.012 | 0.040 | 0.083 |
| Comp Q4 | 0.013 | 0.011 | 0.010 | 0.034 | 0.100 |
| Comp R[a] | 0.0133 ± 0.0055 | 0.0140 ± 0.0077 | 0.0057 ± 0.0010 | 0.0330 ± 0.0046 | 1.349 ± 0.907 |
| Comp S[b] | 0.0056 ± 0.0024 | 0.0034 ± 0.0023 | 0.0028 ± 0.0015 | 0.0118 ± 0.0026 | 0.1833 ± 0.0550 |
| Comp. 1[c] | 0.0209 ± 0.0037 | 0.0031 ± 0.0010 | 0.0056 ± 0.0006 | 0.0296 ± 0.0041 | −0.4374 ± 0.1698 |
| Comp 2[d] | 0.0133 ± 0.0023 | 0.0027 ± 0.0006 | 0.0053 ± 0.006 | 0.0213 ± 0.0032 | −0.5000 ± 0.1000 |
| Comp T[e] | 0.0029 ± 0.0024 | 0.0031 ± 0.0014 | 0.0091 ± 0.0037 | 0.0152 ± 0.0052 | −0.6600 ± 0.1306 |
| Comp U | 0.003 | 0.002 | 0.006 | 0.011 | −0.667 |
| Comp 3[f] | 0.0050 ± 0.0008 | 0.0045 ± 0.0006 | 0.0333 ± 0.0107 | 0.0428 ± 0.0099 | −0.8548 ± 0.0427 |
| Comp 4[g] | 0.0071 ± 0.0008 | 0.0043 ± 0.0015 | 0.0320 ± 0.0068 | 0.0434 ± 0.0080 | −0.8633 ± 0.0470 |
| Comp 5[h] | 0.0050 ± 0.0016 | 0.0065 ± 0.0015 | 0.0492 ± 0.0025 | 0.0607 ± 0.0034 | −0.8687 ± 0.0296 |
| Comp V[i] | 0.0046 ± 0.0029 | 0.0032 ± 0.0015 | 0.0254 ± 0.0039 | 0.0332 ± 0.0044 | −0.8737 ± 0.0663 |

[a]Average of 7 samples of Comparative R (AFFINITY)
[b]Average of 9 samples of Comparative S (ENABLE)
[c]Average of 61 samples of Comparative 1
[d]Average of 3 samples of Comparative 2
[e]Average of 48 samples of Comparative T (EXCEED)
[f]Average of 4 samples of Comparative 3
[g]Average of 21 samples of Comparative 4
[h]Average of 137 samples of Comparative 5
[i]Average of 25 samples of Comparative V (ELITE)

TABLE 2

Molecular and Rheological Features of Linear and LCB Examples Displayed in FIG. 5 of this Disclosure

| Sample ID | $n_c$ mol % | $m_b$ g/mol | $M_e$ g/mol | $M_w$ g/mol | $\frac{M_z}{M_w}$ — | $\cos\delta_{aM\omega}$ — |
|---|---|---|---|---|---|---|
| Comp. V2a | 2.8 | 15.2 | 1.28E+03 | 1.03E+05 | 2.39 | 0.20 |
| Comp. V3 | 3.4 | 15.4 | 1.36E+03 | 8.78E+04 | 2.2 | 0.11 |
| Comp. V4 | 3 | 15.3 | 1.31E+03 | 9.83E+04 | 2.13 | 0.20 |
| Comp. U1 | 3.2 | 15.3 | 1.33E+03 | 9.44E+04 | 1.86 | 0.21 |
| Comp. T2 | 3.2 | 15.1 | 1.27E+03 | 1.04E+05 | 1.63 | 0.02 |
| Comp. Q1 | 5 | 16.1 | 1.58E+03 | 8.33E+04 | 1.7 | 0.24 |
| Comp. Q2 | 8 | 17.4 | 2.05E+03 | 9.41E+04 | 1.76 | 0.23 |

TABLE 2-continued

Molecular and Rheological Features of Linear and LCB Examples Displayed in FIG. 5 of this Disclosure

| | | | | | | |
|---|---|---|---|---|---|---|
| Com. S3 | 0.9 | 14.3 | 1.05E+03 | 1.00E+05 | 2.24 | 0.54 |
| Com. S4 | 2 | 14.7 | 1.15E+03 | 1.02E+05 | 2.18 | 0.49 |
| Comp. 3a | 3.3 | 15.4 | 1.35E+03 | 1.06E+05 | 2.05 | 0.26 |
| Com. 5a | 2.6 | 15.1 | 1.27E+03 | 1.15E+05 | 2.99 | 0.09 |
| Resin 34 | 0.2 | 14.1 | 9.88E+02 | 1.01E+05 | 3.41 | 0.16 |
| Example 1 | 4.7 | 16.0 | 1.54E+03 | 9.15E+04 | 2.69 | 0.36 |
| Example 2 | 4.2 | 15.8 | 1.47E+03 | 9.04E+04 | 2.44 | 0.30 |
| Example 8 | 3.9 | 15.6 | 1.43E+03 | 8.96E+04 | 1.96 | 0.24 |
| Sample ID | a* — | C* — | a — | C — | $\Delta_{int.}$ — | Z — |

TABLE 2-continued

Molecular and Rheological Features of Linear and LCB Examples Displayed in FIG. 5 of this Disclosure

| | | | | | | |
|---|---|---|---|---|---|---|
| Comp. V2a | 0.4654 | 0.1364 | 0.5376 | 0.7884 | 0.0435 | 80.6 |
| Comp. V3 | 0.4854 | 0.0000 | 0.4776 | 0.4142 | 0.0260 | 64.6 |
| Comp. V4 | 0.4248 | 0.0000 | 0.4619 | 0.7964 | 0.0517 | 75.1 |
| Comp. U1 | 0.1914 | 0.0000 | 0.6113 | 0.7096 | 0.0591 | 70.8 |
| Comp. T2 | 0.0000 | 0.0000 | 0.0000 | 0.0000 | 0.0000 | 82.1 |
| Comp. Q1 | 0.0531 | 0.0000 | 0.2439 | 0.8948 | 0.0648 | 52.8 |
| Comp. Q2 | 0.1050 | 0.0000 | 0.3746 | 0.8268 | 0.0629 | 45.8 |
| Comp. Q3 | 0.2001 | 0.0000 | 0.1060 | 0.8518 | 0.0501 | 43.2 |
| Comp. Q4 | 0.1914 | 0.0000 | 0.1941 | 0.9709 | 0.0617 | 57.5 |
| Comp. R1 | 0.0000 | 0.0000 | 0.2931 | 0.8266 | 0.0648 | 55.0 |
| Comp. R2 | 0.0000 | 0.0000 | 0.2127 | 0.9739 | 0.0711 | 57.2 |
| Comp. R3 | 0.0099 | 0.0000 | 0.0798 | 0.8522 | 0.0573 | 44.3 |
| Comp. S1 | 0.2692 | 0.0000 | 0.3061 | 1.1695 | 0.0755 | 79.8 |
| Comp. S2 | 0.3643 | 0.0000 | 0.3416 | 1.2500 | 0.0785 | 99.8 |
| Com. S3 | 0.4972 | 0.0267 | 0.5318 | 1.1950 | 0.0751 | 95.8 |
| Com. S4 | 0.4681 | 0.0000 | 0.3302 | 1.1783 | 0.0701 | 88.9 |
| Comp. 3a | 0.3557 | 0.0000 | 0.6417 | 0.8665 | 0.0637 | 78.9 |
| Com. 5a | 0.6051 | 0.4427 | 0.6240 | 0.5196 | 0.0054 | 90.5 |
| Resin 34 | 0.9574 | 0.5903 | 0.3703 | 0.7634 | −0.0049 | 102.2 |
| Example 1 | 0.4818 | 0.3091 | 0.2994 | 1.0801 | 0.0427 | 59.6 |
| Example 2 | 0.4607 | 0.1689 | 0.3430 | 0.9686 | 0.0468 | 61.7 |
| Example 8 | 0.2779 | 0.0000 | 0.1764 | 0.9229 | 0.0545 | 62.9 |

TABLE 3

Neutron Activation Analysis (NAA), Catalyst Residues in Ethylene Interpolymer Product Examples 1-9, Relative to Comparatives

| Sample | Hf (ppm) | Ti (ppm) |
|---|---|---|
| Example 1 | 1.76 | n.d. |
| Example 2 | 1.98 | n.d. |
| Example 3 | 2.20 | n.d. |
| Example 4 | 1.71 | n.d. |
| Example 5 | 1.51 | n.d. |
| Example 6 | 1.38 | n.d. |
| Example 8 | 0.58† | 0.17† |
| Comparative Q1 | 0.28 | n.d. |
| Comparative Q2 | 0.34 | n.d. |
| Comparative Q3 | 0.24 | n.d. |
| Comparative Q4 | 0.24 | n.d. |
| Comparative R[a] | n.d. | 0.33 ± 0.01 |
| Comparative S[b] | n.d. | 0.14 |
| Comparative U[e] | n.d. | 0.73 |
| Comparative V[i] | n.d. | 1.5 ± 0.06 |
| Comparative 1[c] | n.d. | 0.30 ± 0.06 |
| Comparative 2[d] | 0.58 ± 0.07 | 0.17 ± 0.06 |
| Comparative 3[f] | 0.52 ± 0.03 | 6.34 ± 2.98 |
| Comparative 4[g] | n.d. | 6.78 ± 1.26 |
| Comparative 5[h] | n.d. | 7.14 ± 1.22 |

[a]Comparative R, averages of Affinity;
[b]Comparative S (ENABLE B120);
[c]Comparative 1, NOVA Chemicals database average;
[d]Comparative 2, NOVA Chemicals database average;
[e]Comparative U (ELITE AT 6202;)
[f]Comparative 3, NOVA Chemicals database average;
[g]Comparative 4, NOVA Chemicals database average;
[h]Comparative 5, NOVA Chemicals database average;
[i]Comparative V, average (Elite);
†Example 8, average of catalytic residues in representative products made in the solution pilot plant employing a bridged metallocene catalyst formulation in the first reactor and an unbridged metallocene catalyst formulation in the second reactor

TABLE 4A

Continuous Solution Process Parameters for Examples 1-3

| Sample | Example 1 | Example 2 | Example 3 |
|---|---|---|---|
| Reactor Mode | Series | Series | Single |
| R1 Catalyst[a] | CpF-2 | CpF-2 | CpF-2 |
| R2 Catalyst | CpF-2 | CpF-2 | — |
| R1 catalyst (ppm) | 0.85 | 1.02 | 1.47 |

TABLE 4A-continued

Continuous Solution Process Parameters for Examples 1-3

| Sample | Example 1 | Example 2 | Example 3 |
|---|---|---|---|
| R1 ($[M^b]/[A]$) mole ratio | 50 | 50 | 31 |
| R1 ($[P^c]/[M]$) mole ratio | 0.4 | 0.4 | 0.4 |
| R1 ($[B^d]/[A]$) mole ratio | 1.2 | 1.2 | 1.2 |
| R2 catalyst (ppm) | 0.60 | 0.57 | n/a |
| R2 ([M]/[A]) mole ratio | 31 | 31 | n/a |
| R2 ([P]/[M]) mole ratio | 0.4 | 0.4 | n/a |
| R2 ([B]/[A]) mole ratio | 1.2 | 1.2 | n/a |
| R3 volume (L) | 2.1 | 2.1 | 2.1 |
| $ES^{R1}$ (%) | 38 | 38 | 100 |
| $ES^{R2}$ (%) | 62 | 62 | 0 |
| $ES^{R3}$ (%) | 0 | 0 | 0 |
| R1 ethylene concentration (wt %) | 9.9 | 10.8 | 14.3 |
| R2 ethylene concentration (wt %) | 12.6 | 12.3 | n/a |
| R3 ethylene concentration (wt %) | 12.6 | 12.3 | n/a |
| $((1\text{-octene})/(\text{ethylene}))^{R1}$ (wt. fraction) | 0.30 | 0.37 | 0.410 |
| $((1\text{-octene})/(\text{ethylene}))^{R2}$ (wt. fraction) | 0.46 | 0.37 | n/a |
| (1-octene/ethylene) (wt. fraction, total) | 0.324 | 0.263 | n/a |
| Prod. Rate (kg/h) | 72 | 70 | 56 |

[a]$[(2,7\text{-}tBu_2Flu)Ph_2C(Cp)HfMe_2]$
[b]methylaluminoxane (MMAO-7)
[c]2,6-di-tert-butyl-4-ethylphenol
[d]trityl tetrakis(pentafluoro-phenyl)borate

TABLE 4B

Continuous Solution Process Parameters for Examples 1-3

| Sample | Example 1 | Example 2 | Example 3 |
|---|---|---|---|
| Reactor Mode | Series | Series | Single |
| R1 total solution rate (kg/h) | 266 | 238 | 400 |
| R2 total solution rate (kg/h) | 284 | 312 | 250 |
| R3 solution rate (kg/h) | 15 | 15 | 15 |
| Total solution rate (kg/h)[a] | 550 | 550 | 650 |
| $OS^{R1}$ (%) | 74.8 | 71.3 | 100 |
| $OS^{R2}$ (%) | 25.2 | 28.7 | n/a |
| $OS^{R3}$ (%) | 0 | 0 | n/a |
| $H2^{R1}$ (ppm) | 2.75 | 2.75 | 5.5 |
| $H2^{R2}$ (ppm) | 16.0 | 12.0 | n/a |
| $H2^{R3}$ (ppm) | 0 | 0 | n/a |
| R1 feed inlet temp (° C.) | 30 | 30 | 30 |
| R2 feed inlet temp (° C.) | 30 | 30 | n/a |
| R3 feed inlet temp(° C.) | 130 | 130 | 130 |
| R1 catalyst inlet temp (° C.) | 21 | 25 | 30 |
| R2 catalyst inlet temp (° C.) | 36 | 39 | n/a |
| R1 Mean temp (° C.) | 140 | 150 | 185 |
| R2 Mean temp (° C.) | 180 | 180 | n/a |
| R3 exit temp (° C.) | 182 | 183 | 201 |
| $Q^{R1}$ (%) | 80 | 80 | 80 |
| $Q^{R2}$ (%) | 80 | 80 | n/a |
| $Q^T$ (%) | n/a | n/a | n/a |

[a]Total solution rate (kg/h) = (R1 total solution rate (kg/h)) + (R2 total solution rate (kg/h))

TABLE 5A

Characterization of Ethylene Interpolymer Product, Examples 1-6, 8, 14 and 15

| Sample | Ex. 1 | Ex. 2 | Ex. 3 | Ex. 4 | Ex. 5 | Ex. 6 | Ex. 8 | Ex. 14 | Ex. 15 |
|---|---|---|---|---|---|---|---|---|---|
| Density (g/cc) | 0.9045 | 0.9069 | 0.9028 | 0.9112 | 0.9134 | 0.9174 | 0.9167 | 0.9327 | 0.9144 |
| $I_2$ (dg/min) | 0.93 | 1.1 | 0.91 | 0.87 | 0.89 | 0.86 | 1.16 | 1.11 | 0.86 |
| S. Ex. | 1.58 | 1.52 | 1.44 | 1.73 | 1.75 | 1.74 | 1.37 | 1.66 | 1.54 |
| $I_{21}/I_2$ | 57 | 43.5 | 31.1 | 106 | 111 | 106 | 32.6 | 127 | 42.4 |
| $M_w$ | 91509 | 90425 | 84299 | 105449 | 99451 | 105774 | 89630 | 93038 | 80547 |
| $M_w/M_n$ | 3.32 | 2.51 | 1.87 | 7.53 | 6.49 | 7.39 | 3.10 | 8.73 | 2.21 |
| $M_z/M_w$ | 2.69 | 2.44 | 1.63 | 4.12 | 3.44 | 4.74 | 1.96 | 3.36 | 1.90 |
| BrF $C_6$/1000 C. | 23.4 | 20.9 | 22.3 | 18.1 | 15.5 | 14.1 | 17.9 | 13.5 | 16.0 |
| Mol % α-olefin[1] | 4.7 | 4.2 | 4.5 | 4.4 | 4.1 | 3.7 | 3.6 | 2.7 | 3.2 |
| $CDBI_{50}$ | 89.3 | 92.4 | 92.5 | 75.2 | 74.7 | 74.1 | 55.1 | n/a | 89.9 |
| FAE (kJ/mol) | 48.34 | 54.38 | 59.03 | 44.30 | 44.51 | 45.98 | 45.7 | n/a | n/a |
| MS (cN) | 4.56 | 3.82 | 3.89 | 4.63 | 4.63 | 4.76 | 3.20 | n/a | 4.33 |
| τ ($s^{-1}$) | 0.245 | 0.387 | 0.705 | 0.127 | 0.116 | 0.083 | 0.838 | 1.26 | n/a |

[1]the mole fraction of comonomer, $n_c$, was equivalent to ((Mol % α-olefin)/100).

TABLE 5B

Characterization of Comparative Ethylene Interpolymer Products, Comparative 1a-5a and 14-16

| Sample | Comp 1a | Comp 2a | Comp 3a | Comp 4a | Comp 5a | Comp 14 | Comp 15 | Comp 16 |
|---|---|---|---|---|---|---|---|---|
| Density (g/cc) | 0.9162 | 0.9172 | 0.917 | 0.9124 | 0.9188 | 0.9059 | 0.9064 | 0.9064 |
| $I_2$ (dg/min) | 0.99 | 1.06 | 0.7 | 0.92 | 0.96 | 0.89 | 0.97 | 0.94 |
| S. Ex. | 1.27 | 1.45 | 1.4 | 1.24 | 1.34 | 1.66 | 1.24 | 1.42 |
| $I_{21}/I_2$ | 30.8 | 41.9 | 34.8 | 23.3 | 32.4 | 90.8 | 26 | 44.3 |
| $M_w$ | 102603 | 96238 | 106261 | 107517 | 110365 | 113541 | 107600 | 113161 |
| $M_w/M_n$ | 3.08 | 2.65 | 2.99 | 2.51 | 3.65 | 5.52 | 2.96 | 3.42 |
| $M_z/M_w$ | 2.32 | 2.14 | 2.05 | 2.14 | 3.16 | 3.55 | 2.30 | 2.93 |
| BrF $C_6$/1000 C. | 14.6 | 15.8 | 16.7 | 18.1 | 12.9 | 23.4 | 21.2 | 21.2 |
| Mol % α-olefin | 2.9 | 3.2 | 3.3 | 3.6 | 2.6 | 4.7 | 4.2 | 4.2 |
| $CDBI_{50}$ | 77.5 | 6.6 | 49.8 | 59.7 | 56.1 | 84.7 | 81.8 | 90.6 |
| FAE (J/mol) | 32.85 | n/a | n/a | 32.46 | 30.46 | n/a | 32.85 | 33.93 |
| MS (cN) | 2.78 | 3.29 | 5.26 | 7.7 | 6.46 | n/a | 6.7 | 6.9 |
| τ ($s^{-1}$) | 12.9 | n/a | 0.467 | 8.37 | 3.09 | n/a | 12.9 | 3.27 |

TABLE 5C

Characterization of Comparative Ethylene Interpolymer Products, Comparative Q1-Q4, R1-V1

| Sample | Comp Q1 | Comp Q2 | Comp Q3 | Comp Q4 | Comp R1 | Comp S1 | Comp T1 | Comp U1 | Comp V1 |
|---|---|---|---|---|---|---|---|---|---|
| Density (g/cc) | 0.9006 | 0.8827 | 0.9013 | 0.9093 | 0.9012 | 0.9205 | 0.9187 | 0.9081 | 0.9179 |
| $I_2$ (dg/min) | 1.12 | 1.13 | 3.04 | 1.14 | 1.03 | 0.52 | 0.94 | 0.86 | 1.02 |
| S. Ex. | 1.45 | 1.47 | 1.4 | 1.48 | 1.41 | 1.56 | 1.11 | 1.34 | 1.33 |
| $I_{21}/I_2$ | 33.4 | 37.5 | 31.4 | 36.1 | 30 | 39.6 | 15.8 | 30 | 30.2 |
| $M_w$ | 83303 | 93355 | 68628 | 82272 | 83474 | 93531 | 110641 | 94385 | 98469 |
| $M_w/M_n$ | 2 | 1.93 | 2.13 | 2.16 | 1.79 | 2.74 | 2.18 | 2.18 | 2.74 |
| $M_z/M_w$ | 1.71 | 1.7 | 1.77 | 1.82 | 1.63 | 1.91 | 1.71 | 1.86 | 2.17 |
| BrF $C_6$/1000 C. | 24.3 | 38.5 | 24.6 | 18.6 | 23.3 | 10.9 | 13.4 | 16.1 | 14.2 |
| Mol % α-olefin | 4.9 | 7.7 | 4.9 | 3.7 | 4.7 | 2.2 | 2.7 | 3.2 | 2.8 |
| $CDBI_{50}$ | 92.1 | 97.6 | 89.4 | 86.7 | 89.2 | 88 | 70.8 | 86.5 | 57.1 |
| FAE (J/mol) | 57.12 | 54.68 | 50.67 | 60.64 | 56.60 | 56.82 | 29.59 | n/a | 39.50 |
| MS (cN) | 3.64 | 3.69 | 1.75 | 3.71 | n/a | n/a | 2.04 | n/a | 7.06 |
| τ ($s^{-1}$) | 0.745 | 0.714 | 6.89 | 0.565 | 0.340 | 0.020 | 42.5 | n/a | 1.10 |

TABLE 6A

Continuous Solution Process Parameters for Example 6 and Comparative 8, at About 1 $I_2$ and 0.9175 g/cc.

| Sample | Example 6 | Comparative 8 |
|---|---|---|
| Reactor Mode | Series | Series |
| R1 Catalyst (i) | CpF-2 | PIC-1 |
| R2 Catalyst (ii) | CpF-2 | PIC-1 |

TABLE 6A-continued

Continuous Solution Process Parameters for Example 6 and Comparative 8, at About 1 $I_2$ and 0.9175 g/cc.

| Sample | Example 6 | Comparative 8 |
|---|---|---|
| Density (g/cc) | 0.9180 | 0.9170 |
| Melt Index, $I_2$ (dg/min) | 0.92 | 1.00 |
| Stress Exponent, S. Ex. | 1.75 | 1.29 |

TABLE 6A-continued

Continuous Solution Process Parameters for Example 6 and Comparative 8, at About 1 $I_2$ and 0.9175 g/cc.

| Sample | Example 6 | Comparative 8 |
|---|---|---|
| MFR, $I_{21}/I_2$ | 107 | 31.3 |
| Branch Freq. ($C_6$/1000 C) | 18.3 | 14.4 |
| R1 Catalyst, (i) (ppm) | 0.36 | 0.10 |
| R1 ([M]/[(i)]) (mole ratio) | 31 | 100 |
| R1 ([P]/[M]) (mole ratio) | 0.40 | 0.30 |
| R1 ([B]/[(i)]) (mole ratio) | 1.20 | 1.20 |
| R2 Catalyst, (ii) (ppm) | 0.76 | 0.22 |
| R2 ([M]/[(ii)]) (mole ratio) | 31 | 25 |
| R2 ([P]/[M]) (mole ratio) | 0.4 | 0.30 |
| R2 ([B]/[(ii)]) (mole ratio) | 1.2 | 1.30 |
| $ES^{R1}$ (%) | 45 | 50 |
| $ES^{R2}$ (%) | 55 | 50 |
| $ES^{R3}$ (%) | 0 | 0 |
| R1 ethylene concentration (wt. fr.) | 10.5 | 9.8 |
| R2 ethylene concentration (wt. fr.) | 13.8 | 12.6 |
| R3 ethylene concentration (wt. fr.) | 13.8 | 12.6 |
| $((1\text{-octene})/(\text{ethylene}))^{R1}$ (wt. fr.) | 0.19 | 1.40 |
| $((1\text{-octene})/(\text{ethylene}))^{R2}$ (wt. fr.) | 0.30 | 0.0 |
| ((1-octene)/(ethylene)) Overall (wt. fr.) | 0.25 | 0.71 |
| $OS^{R1}$ (%) | 33.5 | 100 |
| $OS^{R2}$ (%) | 66.5 | 0 |
| $OS^{R3}$ (%) | 0.0 | 0 |
| $H_2^{R1}$ (ppm) | 2.75 | 0.4 |
| $H_2^{R2}$ (ppm) | 10.0 | 0.8 |
| $H_2^{R3}$ (ppm) | 0.0 | 0.0 |
| Prod. Rate (kg/h) | 93.0 | 81.3 |

TABLE 6B

Continuous Solution Process Parameters for Example 6 and Comparative 8, at About 1 $I_2$ and 0.9175 g/cc.

| Sample | Example 6 | Comparative 8 |
|---|---|---|
| Reactor Mode | Series | Series |
| R1 Catalyst (i) | CpF-2 | PIC-1 |
| R2 Catalyst (ii) | CpF-2 | PIC-1 |
| Density (g/cc) | 0.9180 | 0.9170 |
| Melt Index, $I_2$ (dg/min) | 0.92 | 1.00 |
| Stress Exponent, S. Ex. | 1.75 | 1.29 |
| MFR, $I_{21}/I_2$ | 107 | 31.3 |
| Branch Freq. ($C_6$/1000 C) | 18.3 | 14.4 |
| R3 volume (L) | 2.2 | 2.2 |
| R1 total solution rate (kg/h) | 354.0 | 387.2 |
| R2 total solution rate (kg/h) | 246.0 | 212.8 |
| R3 solution rate (kg/h) | 0.0 | 0 |
| Total solution rate (kg/h) | 600.0 | 600.0 |
| R1 inlet temp (° C.) | 35 | 30 |
| R1 catalyst inlet temp (° C.) | 27.7 | 30.3 |
| R1 Mean temp (° C.) | 148.2 | 140.1 |
| R2 inlet temp (° C.) | 45 | 30 |
| R2 catalyst inlet temp (° C.) | 27.9 | 30.6 |
| R2 Mean temp (° C.) | 209.0 | 189.1 |
| R3 exit temp (° C.) | 210.2 | 191.6 |
| $Q^{R1}$ (%) | 80.3 | 81.6 |
| $Q^{R2}$ (%) | 85.0 | 83.9 |
| $Q^{R3}$ (%) | 70.3 | 53.6 |
| $Q^{T}$ (%) | 97.1 | 95.6 |
| Prod. Rate (kg/h) | 93.0 | 81.3 |

TABLE 7A

Continuous Solution Process Parameters for Example 5 and Comparative 9, at About 0.8 $I_2$ and 0.9145 g/cc.

| Sample | Example 5 | Comparative 9 |
|---|---|---|
| Reactor Mode | Series | Series |
| R1 Catalyst (i) | CpF-2 | PIC-1 |
| R2 Catalyst (ii) | CpF-2 | PIC-1 |
| Density (g/cc) | 0.9153 | 0.9142 |
| Melt Index, $I_2$ (dg/min) | 0.84 | 0.86 |
| Stress Exponent, S. Ex. | 1.76 | 1.32 |
| MFR, $I_{21}/I_2$ | 114 | 35.7 |
| Branch Freq. ($C_6$/1000 C) | 20.5 | 16.8 |
| R1 Catalyst, (i) (ppm) | 31 | 0.11 |
| R1 ([M]/[(i)]) (mole ratio) | 0.40 | 100 |
| R1 ([P]/[M]) (mole ratio) | 1.20 | 0.30 |
| R1 ([B]/[(i)]) (mole ratio) | 31.8 | 1.20 |
| R2 Catalyst, (ii) (ppm) | 0.78 | 0.14 |
| R2 ([M]/[(ii)]) (mole ratio) | 31 | 35 |
| R2 ([P]/[M]) (mole ratio) | 0.40 | 0.30 |
| R2 ([B]/[(ii)]) (mole ratio) | 1.20 | 1.50 |
| $ES^{R1}$ (%) | 45 | 48 |
| $ES^{R2}$ (%) | 55 | 37 |
| $ES^{R3}$ (%) | 0 | 15 |
| R1 ethylene concentration (wt. fr.) | 10.2 | 8.5 |
| R2 ethylene concentration (wt. fr.) | 13.7 | 10.8 |
| R3 ethylene concentration (wt. fr.) | 13.7 | 12.0 |
| $((1\text{-octene})/(\text{ethylene}))^{R1}$ (wt. fr.) | 0.2 | 1.72 |
| $((1\text{-octene})/(\text{ethylene}))^{R2}$ (wt. fr.) | 0.34 | 0.00 |
| ((1-octene)/(ethylene)) Overall (wt. fr.) | 0.277 | 0.826 |
| $OS^{R1}$ (%) | 32 | 100 |
| $OS^{R2}$ (%) | 68 | 0 |
| $OS^{R3}$ (%) | 0 | 0 |
| $H_2^{R1}$ (ppm) | 2.75 | 0.4 |
| $H_2^{R2}$ (ppm) | 10 | 0.8 |
| $H_2^{R3}$ (ppm) | 0 | 0 |
| Prod. Rate (kg/h) | 93.9 | 79.4 |

TABLE 7B

Continuous Solution Process Parameters for Example 5 and Comparative 9, at About 0.8 $I_2$ and 0.9145 g/cc.

| Sample | Example 5 | Comparative 9 |
|---|---|---|
| Reactor Mode | Series | Series |
| R1 Catalyst (i) | CpF-2 | PIC-1 |
| R2 Catalyst (ii) | CpF-2 | PIC-1 |
| Density (g/cc) | 0.9153 | 0.9142 |
| Melt Index, $I_2$ (dg/min) | 0.84 | 0.86 |
| Stress Exponent, S. Ex. | 1.76 | 1.32 |
| MFR, $I_{21}/I_2$ | 114 | 35.7 |
| Branch Freq. ($C_6$/1000 C) | 20.5 | 16.8 |
| R3 Volume (L) | 2.2 | 2.2 |
| R1 Total Solution Rate (kg/h) | 364 | 410 |
| R2 Total Solution Rate (kg/h) | 236 | 160 |
| R3 Solution Rate (kg/h) | 0 | 30 |
| Total Solution Rate (kg/h) | 600 | 600 |
| R1 Inlet Temp (° C.) | 35 | 35 |
| R1 Catalyst Inlet Temp (° C.) | 27.7 | 30.3 |
| R1 Mean temp (° C.) | 146 | 130 |
| R2 Inlet Temp (° C.) | 45 | 55 |
| R2 Catalyst Inlet Temp (° C.) | 27.9 | 30.6 |
| R2 Mean Temp (° C.) | 209 | 177 |
| R3 Exit Temp (° C.) | 210 | 198.5 |
| $Q^{R1}$ (%) | 80 | 81 |
| $Q^{R2}$ (%) | 85 | 87.9 |
| $Q^{R3}$ (%) | 70.2 | 78 |
| $Q^{T}$ (%) | 97.1 | 95 |
| Prod. Rate (kg/h) | 93.9 | 79.4 |

TABLE 8

Comparison of Bridged Metallocene and Unbridged Single Site Catalyst Formulations in a Single Reactor Continuous Solution Polymerization Process at 165° C., Examples 10-11 and Comparatives 10s-11s, Respectively.

| Sample | Example 10 | Comparative 10s | Example 11 | Comparative 11s |
|---|---|---|---|---|
| Reactor Mode | Single | Single | Single | Single |
| R1 Catalyst[a] | CpF-2 | PIC-1 | CpF-2 | PIC-1 |
| α-olefin | 1-octene | 1-octene | 1-octene | 1-octene |
| R1 Mean temp (° C.) | 165.0 | 165.4 | 165.0 | 165.1 |
| $H_2^{R1}$ (ppm) | 4 | 4 | 6 | 6 |
| $((1\text{-octene})/(\text{ethylene}))^{R1}$ (wt. fraction) | 0.17 [b] | 1.05 [c] | 0.30 [b] | 1.10 [c] |
| $Q^T$ (%) | 90.0 | 90.1 | 85.0 | 85.2 |
| SEC $M_n$ | 43,397 | 23,238 | 42,776 | 14,285 |
| SEC $M_w$ | 82,720 [d] | 47,655 [e] | 86,239 [d] | 28,838 [e] |
| SEC $M_z$ | 133,489 | 72,326 | 142,459 | 43,496 |
| SEC $M_w/M_n$ | 1.91 | 2.05 | 2.02 | 2.02 |
| BrF (#$C_6$/1000 C) | 15.9 | 16.1 | 21.6 | 21.4 |
| % Reduced [α-olefin/ethylene] [f] | −83.8 | | −72.7 | |
| % Improved $M_w$ [g] | 73.6 | | 199 | |

[a] CpF-2 = $[(2,7\text{-}tBu_2Flu)Ph_2C(Cp)HfMe_2]$; PIC-1 = $[Cp[(t\text{-}Bu)_3PN]TiCl_2]$
[b] $(\alpha\text{-olefin/ethylene})^A$, bridged metallocene catalyst formulation
[c] $(\alpha\text{-olefin/ethylene})^C$, unbridged single site catalyst formulation
[d] $M_w^A$, bridged metallocene catalyst formulation
[e] $M_w^C$, unbridged single site catalyst formulation
[f] % Reduced (α-olefin/ethylene) = $100 \times (((\alpha\text{-olefin/ethylene})^A - (\alpha\text{-olefin/ethylene})^C)/(\alpha\text{-olefin/ethylene})^C)$
[g] % Improved $M_w = 100 \times ((M_w^A - M_w^C)/M_w^C)$

TABLE 9

Comparison of Bridged Metallocene and Unbridged Single Site Catalyst Formulations in a Single Reactor Continuous Solution Polymerization Process at 190° C. and at 143° C., Examples 12-13 and Comparatives 12s-13s, Respectively.

| Sample | Example 12 | Comparative 12s | Example 13 | Comparative 13s |
|---|---|---|---|---|
| Reactor Mode | Single | Single | Single | Single |
| R1 Catalyst[a] (Component A, or Component C) | CpF-2 | PIC-1 | CpF-2 | PIC-1 |
| α-olefin | 1-octene | 1-octene | 1-octene | 1-octene |
| R1 Mean temp (° C.) | 190.0 | 190.1 | 143.0 | 143.0 |
| $H_2^{R1}$ (ppm) | 2 | 2 | 18 | 18 |
| $((1\text{-octene})/(\text{ethylene}))^{R1}$ (wt. fraction) | 0.17 [b] | 1.85 [c] | 0.05 [b] | 0.45 [c] |
| $Q^T$ (%) | 85.0 | 85.2 | 80.0 | 80.2 |
| SEC $M_n$ | 40618 | 23106 | 44718 | 13612 |
| SEC $M_w$ | 79790 [d] | 46836 [e] | 77190 [d] | 27341 [e] |
| SEC $M_z$ | 129396 | 70817 | 115557 | 41142 |
| SEC $M_w/M_n$ | 1.96 | 2.03 | 1.73 | 2.01 |
| BrF (#$C_6$/1000 C) | 13.0 | 13.0 | 4.8 | 4.5 |
| % Reduced [α-olefin/ethylene] [f] | −90.8 | | −88.9 | |
| % Improved $M_w$ [g] | 70.4 | | 182 | |

[a] CpF-2 = $[(2,7\text{-}tBu_2Flu)Ph_2C(Cp)HfMe_2]$; PIC-1 = $[Cp[(t\text{-}Bu)_3PN]TiCl_2]$
[b] $(\alpha\text{-olefin/ethylene})^A$, bridged metallocene catalyst formulation
[c] $(\alpha\text{-olefin/ethylene})^C$, unbridged single site catalyst formulation
[d] $M_w^A$, bridged metallocene catalyst formulation
[e] $M_w^C$, unbridged single site catalyst formulation
[f] % Reduced (α-olefin/ethylene) = $100 \times (((\alpha\text{-olefin/ethylene})^A - (\alpha\text{-olefin/ethylene})^C)/(\alpha\text{-olefin/ethylene})^C)$
[g] % Improved $M_w = 100 \times ((M_w^A - M_w^C)/M_w^C)$

TABLE 10A

Physical Properties of Dual Reactor Example 14 and Comparative 14 and Solution Process Conditions in Reactor 1 (R1) using the Bridged Metallocene Catalyst Formulation (Example 14) or the Unbridged Single Site Catalyst Formulation (Comparative 14).

| Sample | Example 14 | Comparative 14 |
|---|---|---|
| Melt Index, $I_2$, dg/min | 1.11 | 0.89 |

TABLE 10A-continued

Physical Properties of Dual Reactor Example 14 and Comparative 14 and Solution Process Conditions in Reactor 1 (R1) using the Bridged Metallocene Catalyst Formulation (Example 14) or the Unbridged Single Site Catalyst Formulation (Comparative 14).

| Sample | Example 14 | Comparative 14 |
|---|---|---|
| Density, g/cc | 0.9327 | 0.9059 |

TABLE 10A-continued

Physical Properties of Dual Reactor Example 14 and Comparative 14 and Solution Process Conditions in Reactor 1 (R1) using the Bridged Metallocene Catalyst Formulation (Example 14) or the Unbridged Single Site Catalyst Formulation (Comparative 14).

| Sample | Example 14 | Comparative 14 |
|---|---|---|
| MFR, $I_{21}/I_2$ | 127 | 90.6 |
| BrF ($C_6$/1000 C) | 13.5 | 23.4 |
| $M_w$ | 93038 | 113541 |
| $M_w/M_n$ | 8.73 | 5.25 |
| Reactor Mode | Parallel | Series |
| R1 Catalyst | CpF-2 | PIC-1 |
| R1 Catalyst (i) (ppm) | 0.43 | 0.13 |
| R1 ([M]/[(i)]) Mole Ratio | 31 | 122 |
| R1 ([P]/[M]) Mole Ratio | 0.40 | 0.40 |
| R1 ([B])/[(i)]) Mole Ratio | 1.20 | 1.47 |
| $ES^{R1}$ (%) | 40 | 38 |
| R1 Ethylene Concentration (wt. %) | 7.8 | 7.3 |
| ((1-octene)/(ethylene))$^{R1}$ (wt. fraction) | 0.35 | 2.76 |
| % Reduced [α-olefin/ethylene] [a] | −87.3 | |
| (1-octene)/(ethylene) (wt. fraction, total) | 0.14 | 1.05 |
| $OS^{R1}$ (%) | 100 | 100 |
| $H_2^{R1}$ (ppm) | 3.0 | 0.0 |
| R1 Inlet Temp (° C.) | 30 | 30 |
| R1 Mean Temp (° C.) | 118.1 | 119.3 |
| $Q^{R1}$ (%) | 80.0 | 80.0 |

[a] % Reduced [α-olefin/ethylene] = 100 × ((0.35 − 2.76)/2.76)

TABLE 10B

Dual Reactor Example 14 and Comparative 14 Solution Process Conditions in Reactor 2 (R2) Using the Unbridged Single Site Catalyst Formulation.

| Sample | Example 14 | Comparative 14 |
|---|---|---|
| R2 Catalyst | PIC-1 | PIC-1 |
| R2 Catalyst (i) (ppm) | 9.0 | 0.45 |
| R2 ([M]/[(i)]) Mole Ratio | 65 | 25 |
| R2 ([P]/[M]) Mole Ratio | 0.3 | 0.30 |
| R2 ([B])/[(i)]) Mole Ratio | 1.5 | 1.50 |
| R3 Volume (L) | 2.2 | 2.2 |
| $ES^{R2}$ (%) | 60 | 62 |
| $ES^{R3}$ (%) | 0 | 0 |
| R2 Ethylene Concentration (wt %) | 12.6 | 10.8 |
| R3 Ethylene Concentration (wt %) | 10.1 | 10.8 |
| ((1-octene)/(ethylene))$^{R2}$ (wt. fraction) | 0.0 | 0.0 |
| $OS^{R2}$ (%) | 0 | 0 |
| $OS^{R3}$ (%) | 0 | 0 |
| $H_2^{R2}$ (ppm) | 40.0 | 1.0 |
| $H_2^{R3}$ (ppm) | 0.0 | 0.0 |
| R1 Total Solution Rate (kg/h) | 249.0 | 309.2 |
| R2 Total Solution Rate (kg/h) | 233.3 | 240.8 |
| R3 Solution Rate (kg/h) | 0 | 0 |
| Total sSolution Rate (kg/h) | 450.0 | 550.0 |
| R2 Inlet Temp (° C.) | 50 | 30 |
| R3 Inlet Temp(° C.) | 131 | 130 |
| R2 Mean Temp (° C.) | 199.9 | 175.5 |
| R3 Exit Temp (actual) (° C.) | 170.0 | 174.5 |
| $Q^{R2}$ (%) | 92 | 89.7 |
| $Q^{R3}$ (%) | 4.7 | 12.4 |
| $Q^{T}$ (%) | 93.7 | 93.7 |

TABLE 11

Deconvolution of Dual Reactor Ethylene Interpolymer Product Example 14 into a First and a Second Ethylene Interpolymer and Comparison with Dual Reactor Comparative 14.

Below, Ethylene Interpolymer Product Properties (Overall)

| Sample | Example 14 | Comparative 14 |
|---|---|---|
| $I_2$ (CPA/Model) | 1.11 | 0.89 |
| Density (CPA/Model) | 0.9327 | 0.9059 |
| MFR, $I_{21}/I_2$ | 127 | 90.6 |
| BrF ($C_6$/1000 C) | 13.5 | 23.4 |
| $M_w$ | 93038 | 113541 |
| $M_w/M_n$ | 8.73 | 5.25 |
| $\Delta_{int.}$ | 0.017 | <0.01 |

Below, SEC Deconvolution Into R1 and R2 Components

| | SEC Deconvoluted Ethylene Interpolymers | | SEC Deconvoluted Ethylene Interpolymers | |
|---|---|---|---|---|
| | $1^{st}$ | $2^{nd}$ | $1^{st}$ | $2^{nd}$ |
| Weight Percent (%) | 40.7 | 59.3 | 30.9 | 69.1 |
| $M_n$ | 126115 | 8678 | 137745 | 15352 |
| $M_w$ | 249802 | 15238 | 275490 | 30704 |
| Polydispersity ($M_w/M_n$) | 2.0 | 2.0 | 2.0 | 2.0 |
| BrF ($C_6$/1000 C) | 27.8 | 0.924 | 22.9 | 22.7 |
| $I_2$ | 0.04 | 1445 | 0.016 | 81.70 |
| Density (g/cc) | 0.8965[a] | 0.9575[a] | 0.9016[a] | 0.9078[b] |

[a] $\rho^1 = (-a_1 - (a_1^2 - 4*a_0*(a_2 - (BrF(C6/1000\ C)))^{0.5}))/(2*a_0)$; where $a_0$ = 9341.81, $a_1$ = −17765.91 and $a_2$ = 8446.849

[b] $\rho^2 = (\rho^f - wt^1*\rho^1)/(wt^2)$; where $\rho^1$, $\rho^2$ and $\rho^f$ are the densities of the $1^{st}$ and $2^{nd}$ interpolymer and the overall (blend) density, and $wt^1$ and $wt^2$ represent the respective weight fractions

TABLE 12

Deconvolution of Ethylene Interpolymer Products Examples 4-6 into a First, a Second and a Third Ethylene Interpolymer

| Sample | Example 4 | Example 5 | Example 6 |
|---|---|---|---|
| R3 vol. (L) | 2.2 | 2.2 | 2.2 |
| $I_2$ (dg/min) | 0.87 | 0.89 | 0.86 |
| Density (g/cc) | 0.9112 | 0.9134 | 0.9174 |
| MFR, $I_{21}/I_2$ | 105 | 110 | 106 |
| $M_w$ | 105449 | 99451 | 105774 |
| $M_w/M_n$ | 7.53 | 6.49 | 7.39 |
| BrF $C_6$/1000 C. | 18.1 | 15.49 | 14.05 |
| $CDBI_{50}$ | 75.2 | 74.7 | 74.1 |
| UR | −0.053 | −0.100 | −0.150 |

Below, SEC Deconvolution Into R1, R2 and R3 Components

| | SEC Deconvoluted Ethylene Interpolymers | | | SEC Deconvoluted Ethylene Interpolymers | | | SEC Deconvoluted Ethylene Interpolymers | | |
|---|---|---|---|---|---|---|---|---|---|
| | $1^{st}$ | $2^{nd}$ | $3^{rd}$ | $1^{st}$ | $2^{nd}$ | $3^{rd}$ | $1^{st}$ | $2^{nd}$ | $3^{rd}$ |
| Wt. Frac. | 0.37 | 0.57 | 0.06 | 0.38 | 0.58 | 0.04 | 0.37 | 0.57 | 0.06 |
| $M_n$ | 115000 | 11209 | 11209 | 119880 | 10332 | 8762 | 114689 | 10629 | 8852 |
| $M_w$ | 230042 | 22418 | 22418 | 239761 | 20664 | 17524 | 229378 | 21259 | 17704 |
| $M_w/M_n$) | 2.00 | 2.00 | 2.00 | 2.00 | 2.00 | 2.00 | 2.00 | 2.00 | 2.00 |
| BrF ($C_6$/1000 C.) | 16.3 | 21.3 | 21.3 | 14.2 | 19.8 | 20.0 | 11.6 | 18.2 | 18.2 |

TABLE 13

Percent (%) Improved SEC Weight Average Molecular Weight ($M_w$) When Using the Bridged Metallocene Catalyst Formulation Relative to the Unbridged Single Site Catalyst Formulation (CPU at 160° C. Reactor Temperature and about 90% Ethylene Conversion).

| Weight % 1-Octene in Ethylene Interpolymers | Bridged Metallocene Catalyst Formulation Component A | $M_w^A$ (see[1]) | Unbridged Single Site Catalyst Formulation Component C | $M_w^C$ (see[2]) | % Improved $M_w$ (see[3]) |
|---|---|---|---|---|---|
| 0.1 | CpF-1 | 293273 | PIC-1 | 248166 | 18 |
| 2.5 | CpF-1 | 130734 | PIC-1 | 91198 | 43 |
| 5.0 | CpF-1 | 109858 | PIC-1 | 73513 | 49 |
| 7.5 | CpF-1 | 99227 | PIC-1 | 64804 | 53 |
| 10.0 | CpF-1 | 92315 | PIC-1 | 59257 | 56 |
| 12.5 | CpF-1 | 87287 | PIC-1 | 55285 | 58 |
| 15.0 | CpF-1 | 83382 | PIC-1 | 52237 | 60 |
| 17.5 | CpF-1 | 80217 | PIC-1 | 49792 | 61 |
| 20.0 | CpF-1 | 77573 | PIC-1 | 47766 | 62 |
| 22.5 | CpF-1 | 75314 | PIC-1 | 46048 | 64 |
| 25.0 | CpF-1 | 73348 | PIC-1 | 44564 | 65 |
| 27.5 | CpF-1 | 71614 | PIC-1 | 43262 | 66 |
| 30.0 | CpF-1 | 70067 | PIC-1 | 42107 | 66 |
| 32.5 | CpF-1 | 68673 | PIC-1 | 41072 | 67 |
| 35.0 | CpF-1 | 67408 | PIC-1 | 40136 | 68 |
| 37.5 | CpF-1 | 66251 | PIC-1 | 39284 | 69 |
| 40.0 | CpF-1 | 65186 | PIC-1 | 38504 | 69 |
| 42.5 | CpF-1 | 64202 | PIC-1 | 37784 | 70 |
| 45.0 | CpF-1 | 63287 | PIC-1 | 37119 | 70 |

[1] $M_w^A = 164540 \times (Octene^{wt\%}) - 0.251$; where ($Octene^{wt\%}$) is the weight % of octene in the ethylene/1-octene interpolymer

[2] $M_w^C = 121267 \times (Octene^{wt\%}) - 0.311$

[3] $100\% \times (M_w^A - M_w^C)/M_w^C$

TABLE 14

Percent (%) Improvement (Teduction) in (α-olefin/ethylene) Weight Ratio in the Reactor Feed When Using the Bridged Metallocene Catalyst Formulation Relative to the Unbridged Single Site Catalyst Formulation (CPU at 160° C. Reactor Temperature and about 90% Ethylene Conversion).

| Weight % | Bridged Metallocene Catalyst Formulation | | Unbridged Single Site Catalyst Formulation | | % Reduced |
|---|---|---|---|---|---|
| 1-octene in Ethylene Interpolymers | Component A | (α-olefin/ethylene)$^A$ (see[1]) | Component C | (α-olefin/ethylene)$^C$ (see[2]) | (α-olefin/ethylene) Ratio (see[3]) |
| 0.0 | CpF-1 | 0.00 | PIC-1 | 0.00 | n/a |
| 2.5 | CpF-1 | 0.0078 | PIC-1 | 0.183 | −96% |
| 5.0 | CpF-1 | 0.031 | PIC-1 | 0.407 | −92% |
| 7.5 | CpF-1 | 0.066 | PIC-1 | 0.653 | −90% |
| 10.0 | CpF-1 | 0.112 | PIC-1 | 0.920 | −88% |
| 12.5 | CpF-1 | 0.170 | PIC-1 | 1.21 | −86% |
| 15.0 | CpF-1 | 0.238 | PIC-1 | 1.52 | −84% |
| 17.5 | CpF-1 | 0.318 | PIC-1 | 1.85 | −83% |
| 20.0 | CpF-1 | 0.409 | PIC-1 | 2.20 | −81% |
| 22.5 | CpF-1 | 0.512 | PIC-1 | 2.57 | −80% |
| 25.0 | CpF-1 | 0.625 | PIC-1 | 2.97 | −79% |
| 27.5 | CpF-1 | 0.750 | PIC-1 | 3.39 | −78% |
| 30.0 | CpF-1 | 0.886 | PIC-1 | 3.82 | −77% |
| 32.5 | CpF-1 | 1.03 | PIC-1 | 4.28 | −76% |
| 35.0 | CpF-1 | 1.19 | PIC-1 | 4.76 | −75% |
| 37.5 | CpF-1 | 1.36 | PIC-1 | 5.26 | −74% |
| 40.0 | CpF-1 | 1.54 | PIC-1 | 5.78 | −73% |
| 42.5 | CpF-1 | 1.74 | PIC-1 | 6.33 | −73% |
| 45.0 | CpF-1 | 1.94 | PIC-1 | 6.89 | −72% |

[1] $(\alpha\text{-olefin/ethylene})^A = 0.0009 \times (\text{Octene}^{wt\,\%})^2 + 0.0027 \times (\text{Octene}^{wt\,\%}) - 0.0046$; where $(\text{Octene}^{wt\,\%})$ is the weight % of octene in the ethylene/1-octene interpolymer;
[2] $(\alpha\text{-olefin/ethylene})^C = 0.0017 \times (\text{Octene}^{wt\,\%})^2 + 0.0771 \times (\text{Octene}^{wt\,\%}) - 0.0208$;
[3] $100\% \times ((\alpha\text{-olefin/ethylene})^1 - (\alpha\text{-olefin/ethylene})^C/(\alpha\text{-olefin/ethylene})^C$

TABLE 15

Monolayer Blown Film Conditions, Gloucester Blown Film Line, 4 inch Die Diameter and 35 mil Die Gap: Examples 1 and 2, Relative to Comparatives 15 and 16.

| Sample | Example 1 | Example 2 | Comparative 15 | Comparative 16 |
|---|---|---|---|---|
| Thickness (mil) | 1 | 1 | 1 | 1 |
| BUR | 2.5:1 | 2.5:1 | 2.5:1 | 2.5:1 |
| Film Layflat (in) | 15.7 | 15.7 | 15.7 | 15.7 |
| Melt Temp (° F.) | 441 | 441 | 431 | 432 |
| Output (lb/hr) | 99.8 | 99.6 | 100 | 100 |
| FLH (in) | 18 | 18 | 18 | 18 |
| Magnehelic (in-$H_2O$) | 13.0 | 11.0 | 10.8 | 10.3 |
| Nip Pressure (psi) | 30 | 30 | 30 | 30 |
| Nip Speed: (ft/min) | 129 | 129 | 132 | 88 |
| Current: (Amps) | 27.8 | 28.7 | 37.7 | 32.1 |
| Voltage: (Volts) | 192 | 183 | 188 | 195 |
| Pressure (psi) | 2882 | 2872 | 4040 | 3442 |
| Screw Speed (rpm) | 41 | 39 | 40 | 41 |

TABLE 16

Monolayer Film Physical Properties: Examples 1 and 2, Relative to Comparatives 15 and 16.

| Sample | Example 1 | Example 2 | Comparative 15 | Comparative 16 |
|---|---|---|---|---|
| Density (g/cc) | 0.905 | 0.907 | 0.906 | 0.906 |
| $I_2$ (dg/min) | 0.93 | 1.12 | 0.97 | 0.94 |
| Melt Flow Ratio ($I_{21}/I_2$) | 57.0 | 43.4 | 26 | 44.3 |
| S. Ex. | 1.58 | 1.52 | 1.24 | 1.42 |

TABLE 16-continued

| Monolayer Film Physical Properties: Examples 1 and 2, Relative to Comparatives 15 and 16. | | | | |
|---|---|---|---|---|
| Sample | Example 1 | Example 2 | Comparative 15 | Comparative 16 |
| Melt Strength (cN) | 4.56 | 3.82 | 2.78 | 3.03 |
| Flow Act. Energy (kJ/mol) | 48.34 | 54.38 | 32.85 | 33.83 |
| Onset shear thinning (1/s) | 0.2454 | 0.3866 | 12.93 | 3.269 |
| Film Haze (%) | 3.8 | 4.0 | 6.7 | 6.9 |
| Film Gloss at 45° | 75.2 | 74.5 | 64.0 | 62.0 |
| Dart Impact (g/mil) | 641 | 653 | 761 | 1100 |
| Lub-Tef Puncture (J/mm$^2$) | 81 | 91 | 124 | 84 |
| MD Tear (g/mil) | 137 | 161 | 201 | 214 |
| TD Tear (g/mil) | 270 | 292 | 330 | 304 |
| MD 1% Sec Mod. (Mpa) | 108.0 | 121.0 | 107.5 | 104.3 |
| TD 1% Sec Mod. (Mpa) | 107.0 | 121.0 | 107.9 | 106.4 |
| MD 2% Sec Mod. (Mpa) | 100 | 113 | 99.3 | 97.7 |
| TD 2% Sec Mod. (Mpa) | 99.0 | 111 | 99.1 | 99.3 |
| MD Ten. Break Str.(MPa) | 43.1 | 40.6 | 50.0 | 43.1 |
| TD Ten. Break Str.(MPa) | 38.8 | 40.8 | 41.8 | 38.8 |
| MD Elong. at Break (%) | 481 | 493 | 516 | 481 |
| TD Elong. at Break (%) | 701 | 737 | 732 | 701 |
| MD Ten. Yield Str (MPa) | 7.6 | 7.1 | 7.8 | 7.6 |
| TD Ten. Yield Str (MPa) | 7.5 | 7.0 | 7.7 | 7.5 |
| MD Elong at Yield (%) | 10 | 10 | 10 | 10 |
| TD Elong at Yield (%) | 10 | 10 | 10 | 10 |

TABLE 17

The Multilayer Film Structure (9-layers) Used to Prepare 3.5 mil Blown Films, the Material (Sealant Resin) Under Test was Placed in Layer 1.

| Layer | % of 9-Layer | Materials and Weight % in Each Layer | | | |
|---|---|---|---|---|---|
| | | Material A | | Material B | |
| Number | Structure | Material | wt. % | Material | wt. % |
| Layer 9 | 11 | C40 L | 100 | | |
| Layer 8 | 11 | FPs016-C | 80 | Bynel 41E710 | 20 |
| Layer 7 | 11 | FPs016-C | 100 | | |
| Layer 6 | 11 | FPs016-C | 80 | Bynel 41E710 | 20 |
| Layer 5 | 12 | C40 L | 100 | | |
| Layer 4 | 11 | FPs016-C | 80 | Bynel 41E710 | 20 |
| Layer 3 | 11 | FPs016-C | 100 | | |
| Layer 2 | 11 | FPs016-C | 100 | | |
| Layer 1 | 11 | Test Material | 91.5 | Additive Masterbatches | 8.5 |

TABLE 18

Multilayer Film Fabrication Conditions

| Extruder/Layer | All Temperatures in ° F. | | | | | | |
|---|---|---|---|---|---|---|---|
| | Feed Throat | Barrel Zone 1 | Barrel Zone 2 | Barrel Zone 3 | Barrel Zone 4 | Screen | Adaptor |
| Layer 9 (outside of bubble) | 100 | 455 | 480 | 480 | 480 | 480 | 480 |
| Layer 8 | 75 | 360 | 420 | 410 | 410 | 410 | 410 |
| Layer 7 | 75 | 360 | 420 | 410 | 410 | 410 | 410 |
| Layer 6 | 75 | 360 | 420 | 410 | 410 | 410 | 410 |
| Layer 5 | 100 | 455 | 480 | 480 | 480 | 480 | 480 |
| Layer 4 | 75 | 360 | 420 | 410 | 410 | 410 | 410 |
| Layer 3 | 75 | 360 | 420 | 410 | 410 | 410 | 410 |
| Layer 2 | 75 | 360 | 420 | 410 | 410 | 410 | 410 |
| Layer 1 (inside of Bubble) | 75 | 360 | 420 | 410 | 410 | 410 | 410 |

TABLE 19

Cold Seal Data and SIT (Seal Initiation Temperature (° C.)) for 9-layer Films (i) Through (iv).

| | 9-Layer Film Code | | | |
|---|---|---|---|---|
| | (i) | (ii) | (iii) | (iv) |
| | Layer 1 Sealant Resin | | | |
| | 70 wt % Example 1 + 30 wt % Comparative 5 | Comparative 15 | Example 5 | Example 15 |
| Layer 1 Density (g/cc) | 0.909[a] | 0.906 | 0.913 | 0.914 |
| Layer 1 $I_2$ (dg/min) | 0.95[a] | 0.97 | 0.89 | 0.86 |
| Seal Temp (° C.) | Force (N) | Force (N) | Force (N) | Force (N) |
| 90 | 2.10 | 1.82 | 0.82 | 0.24 |
| 95 | 15.8 | 17.4 | 5.55 | 0.24 |
| 100 | 32.0 | 27.4 | 33.2 | 1.58 |
| 105 | 35.6 | 35.3 | 37.7 | 16.3 |
| 110 | 41.5 | 39.2 | 42.3 | 27.4 |
| 120 | 44.8 | 45.3 | 48.5 | 49.6 |
| 130 | 50.5 | 50.2 | 54.1 | 55.0 |
| 140 | 52.7 | 51.3 | 55.1 | 57.1 |
| 150 | 55.3 | 53.8 | 55.5 | 56.7 |
| 160 | 53.5 | 54.1 | 55.6 | 55.9 |
| 170 | 55.1 | 54.8 | 57.0 | 55.8 |
| SIT @ 8.8N (° C.) | 92.4 | 92.2 | 95.6 | 102.5 |
| Max. Force (N) | 55.3 | 54.8 | 57.0 | 57.1 |
| Temp. @ Max Force | 150 | 170 | 170 | 140 |

[a]density or melt index of the 70%/30% blend

TABLE 20

Hot Tack Data and HTO (Hot Tack Onset Temperature (° C.)) for 9-layer Films (i) Through Iiv)

| | 9-Layer Film Code | | | | | | | |
|---|---|---|---|---|---|---|---|---|
| | (i) | | (ii) | | (iii) | | (iv) | |
| | Layer 1 Sealant Resin | | | | | | | |
| | 70 wt % Example 1 + 30 wt % Comparative 5 | | Comparative 15 | | Example 5 | | Example 15 | |
| | Layer 1 Density (g/cc) | | | | | | | |
| | 0.909 | | 0.906 | | 0.913 | | 0.914 | |
| | Layer 1 $I_2$ (dg/min) | | | | | | | |
| | 0.95 | | 0.97 | | 0.89 | | 0.86 | |
| Hot Tack Temp (° C.) | Avg. Force (N) | Failure Mode | Avg. Force (N) | Failure Mode | Avg. Force (N) | Failure Mode | Avg. Force (N) | Failure Mode |
| 80 | 0.29 | no seal | 0.20 | no seal | 0.24 | no seal | 0.23 | no seal |
| 85 | 0.31 | no seal | 0.69 | no seal | 0.52 | no seal | 0.24 | no seal |
| 90 | 1.07 | seal | 1.54 | seal | 2.41 | seal | 0.20 | no seal |
| 95 | 1.95 | seal | 3.17 | seal | 3.89 | seal | 0.29 | no seal |
| 100 | 3.22 | seal | 4.81 | seal | 5.16 | seal | 1.40 | seal |
| 105 | 4.44 | seal | 5.37 | seal | 5.34 | seal | 3.91 | seal |
| 110 | 5.23 | seal | 7.52 | seal | 5.13 | seal | 6.40 | seal |

TABLE 20-continued

Hot Tack Data and HTO (Hot Tack Onset Temperature (° C.)) for 9-layer Films (i) Through Iiv)

| | 9-Layer Film Code | | | | | | | |
|---|---|---|---|---|---|---|---|---|
| | (i) | | (ii) | | (iii) | | (iv) | |
| Layer 1 Sealant Resin | 70 wt % Example 1 + 30 wt % Comparative 5 | | Comparative 15 | | Example 5 | | Example 15 | |
| Layer 1 Density (g/cc) | 0.909 | | 0.906 | | 0.913 | | 0.914 | |
| Layer 1 $I_2$ (dg/min) | 0.95 | | 0.97 | | 0.89 | | 0.86 | |
| Hot Tack Temp (° C.) | Avg. Force (N) | Failure Mode | Avg. Force (N) | Failure Mode | Avg. Force (N) | Failure Mode | Avg. Force (N) | Failure Mode |
| 115 | 6.20 | seal | 7.92 | seal | 6.14 | seal | 9.47 | stretch |
| 120 | 6.79 | stretch | 8.26 | seal | 6.59 | seal | 9.21 | stretch |
| 125 | 10.05 | stretch | 11.85 | s/p[a] | 8.37 | seal | 12.86 | stretch |
| 130 | 9.50 | stretch | 11.62 | s/p | 9.55 | seal | 12.47 | stretch |
| 135 | 9.51 | stretch | 10.81 | s/p | 9.42 | seal | 9.56 | stretch |
| 140 | 9.27 | stretch | 11.11 | s/p | 7.51 | seal | 9.12 | stretch |
| 145 | 6.65 | stretch | 9.20 | s/p | 7.74 | seal | 7.92 | stretch |
| 150 | 6.75 | stretch | 8.16 | s/p | 6.62 | seal | 6.58 | stretch |
| 155 | 5.39 | stretch | 7.12 | s/p | 5.28 | seal | 5.54 | stretch |
| 160 | 5.19 | stretch | 6.33 | s/p | 4.49 | seal | 5.68 | stretch |
| 165 | 4.15 | stretch | 5.58 | s/p | 4.44 | seal | 5.49 | stretch |
| 170 | 3.74 | stretch | 4.70 | s/p | 3.37 | seal | 3.50 | stretch |
| 175 | 2.86 | stretch | 4.05 | s/p | 2.93 | seal | 3.27 | stretch |
| 180 | 2.87 | stretch | 3.44 | s/p | 2.68 | stretch | 2.33 | stretch |
| Hot Tack Onset (° C.) | 89.5 | | 86.8 | | 86.3 | | 98.2 | |
| Max. Force (N) | 10.1 | | 11.9 | | 9.6 | | 12.9 | |
| Temp. @ Max Force (N) | 125 | | 125 | | 130 | | 125 | |

[a]s/p = stretch/peel failure mode

INDUSTRIAL APPLICABILITY

The ethylene interpolymer products disclosed herein have industrial applicability in a wide range of manufactured articles; non-limiting examples include flexible packaging films having improved optical properties, lower seal initiation temperature and improved hot tack performance.

The invention claimed is:

1. An ethylene interpolymer product comprising at least one ethylene interpolymer; wherein said ethylene interpolymer product is characterized by:

a network parameter, $\Delta_{int.}$, defined by following inequalities, $$0.01\times(Z-48)^{0.78}\leq\Delta_{int.}\leq 0.01\times(Z-60)^{0.78}$$

$$\Delta_{int}\geq 0.01$$

wherein Z is a normalized molecular weight defined by $$Z=\frac{M_w}{M_e}$$

wherein $M_w$ is a weight average molecular weight of the said ethylene interpolymer product as measured using conventional size exclusion chromatography and $M_e$ is a molecular weight between entanglements of said ethylene interpolymer as defined by $$M_e=\frac{4}{5}\frac{\rho RTm_b^{3.49}}{24820}$$

wherein ρ the melt-state density having a value of 0.780 g/cm$^3$ at absolute temperature T having a value of 463.15 Kelvin, R is the gas constant having a value of 8.314 J/(mol·Kelvin), $m_b$ is the molecular weight per backbone bond calculated in units of g/mol as follows:

$$m_b=\frac{n_cM_{w/c}+28(1-n_c)}{2}$$

where $n_c$ is the comonomer content in mole fraction determined by Fourier transform infrared (FTIR) spectroscopy according to ASTM D6645-01 (2001) and $M_{w/c}$ is the molecular weight of the comonomer;

a residual catalytic metal of from ≥0.03 to ≤5 ppm of hafnium, wherein said residual catalytic metal is measured using neutron activation; and a dimensionless unsaturation ratio, UR, of from ≥−0.40 to ≤0.06, where UR is defined by the following relationship:

$$UR = \frac{SC^U - T^U}{T^U}$$

wherein, $SC^U$ is the amount of a side chain unsaturation per 100 carbons and TU is amount of a terminal unsaturation per 100 carbons, in said ethylene interpolymer product, as determined by ASTM D3124-98 and ASTM D6248-98.

2. The ethylene interpolymer product of claim 1, having a melt index from 0.3 to 500 dg/minute and a density from 0.855 to 0.975 g/cc; wherein melt index is measured according to ASTM D1238 (2.16 kg load and 190° C.) and density is measured according to ASTM D792.

3. The ethylene interpolymer product of claim 1 further comprising from 0 to 25 mole percent of one or more α-olefins.

4. The ethylene interpolymer product of claim 3, wherein said one or more α-olefins are $C_3$ to $C_{10}$ α-olefins.

5. The ethylene interpolymer product of claim 4, wherein said one or more α-olefins are 1-hexene, 1-octene or a mixture of 1-hexene and 1-octene.

6. The ethylene interpolymer product of claim 1, having a polydispersity, $M_w/M_n$, from 1.7 to 25, wherein the weight average molecular weight, $M_w$, and the number average molecular weight, $M_n$, are measured using size exclusion chromatography.

7. The ethylene interpolymer product of claim 1, having a $CDBI_{50}$ from 1% to 98%, wherein $CDBI_{50}$ is measured using CTREF.

8. The ethylene interpolymer product of claim 1, manufactured in a solution polymerization process.

9. The ethylene interpolymer product of claim 1, synthesized using at least one homogeneous catalyst formulation.

10. The ethylene interpolymer product of claim 9, wherein said homogeneous catalyst formulation is a bridged metallocene catalyst formulation comprises a component A defined by Formula (I)

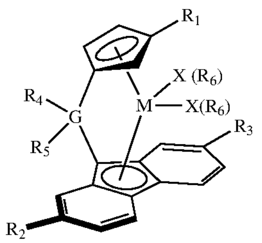

(I)

wherein:

M is a metal selected from titanium, hafnium and zirconium;

G is the element carbon, silicon, germanium, tin or lead;

X represents a halogen atom, $R_6$ groups are independently selected from a hydrogen atom, a $C_{1-20}$ hydrocarbyl radical, a $C_{1-20}$ alkoxy radical or a $C_{6-10}$ aryl oxide radical, these radicals may be linear, branched or cyclic or further substituted with halogen atoms, $C_{1-10}$ alkyl radicals, $C_{1-10}$ alkoxy radicals, $C_{6-10}$ aryl or aryloxy radicals;

$R_1$ represents a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms;

$R_2$ and $R_3$ are independently selected from a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms; and $R_4$ and $R_5$ are independently selected from a hydrogen atom, a $C_{1-20}$ hydrocarbyl radical, a $C_{1-20}$ alkoxy radical a $C_{6-10}$ aryl oxide radical, or alkylsilyl radicals containing at least one silicon atom and $C_{3-30}$ carbon atoms.

* * * * *